(12) United States Patent
Chikovani et al.

(10) Patent No.: US 9,922,303 B2
(45) Date of Patent: Mar. 20, 2018

(54) METHOD AND SYSTEM FOR IMPLEMENTING PRODUCT GROUP MAPPINGS

(71) Applicant: Oracle International Corporation, Redwood Shores, CA (US)

(72) Inventors: Eugene G. Chikovani, Cupertino, CA (US); Vibhor K. Gaur, Foster City, CA (US); Mark David Lewis, Parker, CO (US); Hang Lu, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/015,560

(22) Filed: Aug. 30, 2013

(65) Prior Publication Data

US 2014/0067626 A1  Mar. 6, 2014

Related U.S. Application Data

(60) Provisional application No. 61/694,897, filed on Aug. 30, 2012, provisional application No. 61/780,419, filed on Mar. 13, 2013.

(51) Int. Cl.
*G06Q 10/10* (2012.01)
*G06Q 10/08* (2012.01)

(52) U.S. Cl.
CPC .......... *G06Q 10/087* (2013.01); *G06Q 10/10* (2013.01)

(58) Field of Classification Search
CPC .......... G06F 17/2247; G06F 17/30392; G06Q 10/10; G06Q 30/02
USPC ............................................ 705/28; 717/144
See application file for complete search history.

(56) References Cited

U.S. PATENT DOCUMENTS

| | | | |
|---|---|---|---|
| 6,557,012 B1 | 4/2003 | Arun | |
| 7,712,042 B2 * | 5/2010 | Hernandez-Sherrington | G06F 3/0481 715/713 |
| 7,730,032 B2 | 6/2010 | Idicula | |
| 7,913,161 B2 | 3/2011 | Rivas, Jr. | |
| 8,230,326 B2 | 7/2012 | Albornoz | |
| 8,326,869 B2 * | 12/2012 | Kolluri et al. ................ | 707/776 |
| 8,555,157 B1 * | 10/2013 | Fu ..................... | G06F 17/30893 715/201 |
| 8,862,991 B2 | 10/2014 | Harrington | |

(Continued)

FOREIGN PATENT DOCUMENTS

WO    WO 2006047407 A2 *  5/2006 ............. G06Q 30/02

OTHER PUBLICATIONS

"PeopleSoft Enterprise Catalog Management," Oracle PeopleSoft Enterprise, Dec. 2002 (13 pages).

(Continued)

*Primary Examiner* — Florian M Zeender
*Assistant Examiner* — Milena Racic
(74) *Attorney, Agent, or Firm* — Vista IP Law Group, LLP

(57) ABSTRACT

Disclosed are systems, methods, and computer program products to implement product group mappings. In order for different CRM applications (e.g., sell side and internal side applications) to work in cohesive manner, the disclosed approaches provide mapping functionality that can map product groups captured in one system using one hierarchy to be translated to the other system using the hierarchy that the consuming system understands.

31 Claims, 47 Drawing Sheets

(56) References Cited

U.S. PATENT DOCUMENTS

| | | | |
|---|---|---|---|
| 2001/0032209 A1 | 10/2001 | Duxbury | |
| 2003/0115547 A1 | 6/2003 | Ohwada | |
| 2003/0120579 A1 | 6/2003 | Carter, III | |
| 2005/0125781 A1* | 6/2005 | Swamy et al. | 717/144 |
| 2005/0177436 A1* | 8/2005 | Menninger | G06Q 10/06 705/22 |
| 2006/0122914 A1 | 6/2006 | Moroney | |
| 2007/0050407 A1 | 3/2007 | Chen | |
| 2007/0192362 A1 | 8/2007 | Caballero | |
| 2007/0226196 A1 | 9/2007 | Adya | |
| 2007/0230488 A1* | 10/2007 | Yu | H04L 45/02 370/408 |
| 2007/0239742 A1* | 10/2007 | Saha | G06F 17/30731 |
| 2008/0034282 A1* | 2/2008 | Zernik | G06F 17/2211 715/229 |
| 2008/0082572 A1 | 4/2008 | Ballard | |
| 2008/0097934 A1* | 4/2008 | Carter, III | G06Q 20/201 705/400 |
| 2008/0133618 A1 | 6/2008 | Kawabe | |
| 2008/0134025 A1 | 6/2008 | Harada | |
| 2008/0208714 A1 | 8/2008 | Sundaresan | |
| 2008/0208732 A1 | 8/2008 | Guttman | |
| 2008/0235260 A1* | 9/2008 | Han | G06F 17/2247 |
| 2008/0275907 A1* | 11/2008 | Han | G06F 17/2247 |
| 2010/0095129 A1* | 4/2010 | Wilson | G06F 21/64 713/187 |
| 2010/0100427 A1 | 4/2010 | McKeown | |
| 2010/0275152 A1 | 10/2010 | Atkins | |
| 2010/0293234 A1 | 11/2010 | Schmidt | |
| 2011/0029634 A1 | 2/2011 | Gimson | |
| 2011/0231576 A1 | 9/2011 | Blaszczak | |
| 2013/0018849 A1 | 1/2013 | Johnston | |
| 2013/0036352 A1* | 2/2013 | Hui | G06F 17/227 715/234 |
| 2013/0275363 A1 | 10/2013 | Wu | |
| 2014/0012882 A1* | 1/2014 | Poppitz | G06F 17/30498 707/792 |

OTHER PUBLICATIONS

Non-final Office Action dated Jul. 16, 2015 for related U.S. Appl. No. 14/015,553.

Notice of Allowance and Fee(s) Due dated Feb. 10, 2016 for related U.S. Appl. No. 14/015,553.

Non-final Office Action dated Sep. 1, 2016 for related U.S. Appl. No. 14/015,577.

Non-final Office Action dated May 31, 2016 for related U.S. Appl. No. 14/015,546.

Non-final Office Action dated Jun. 21, 2017 for related U.S. Appl. No. 14/015,546.

Final Office Action dated Dec. 15, 2016 for related U.S. Appl. No. 14/015,546.

Final Office Action dated Mar. 10, 2017 for related U.S. Appl. No. 14/015,577.

Non-final Office Action dated Oct. 24, 2017 for related U.S. Appl. No. 14/015,577.

Notice of Allowance and Fee(s) Due dated Dec. 4, 2017 for related U.S. Appl. No. 14/015,546.

Wong, Eugene. Dynamic Rematerialization: Processing Distributed Queries Using Redundant Data. IEEE Transactions on Software Engineering, vol. SE-9, No. 3, May 1983. pp. 228-232. (Year 1983).

* cited by examiner

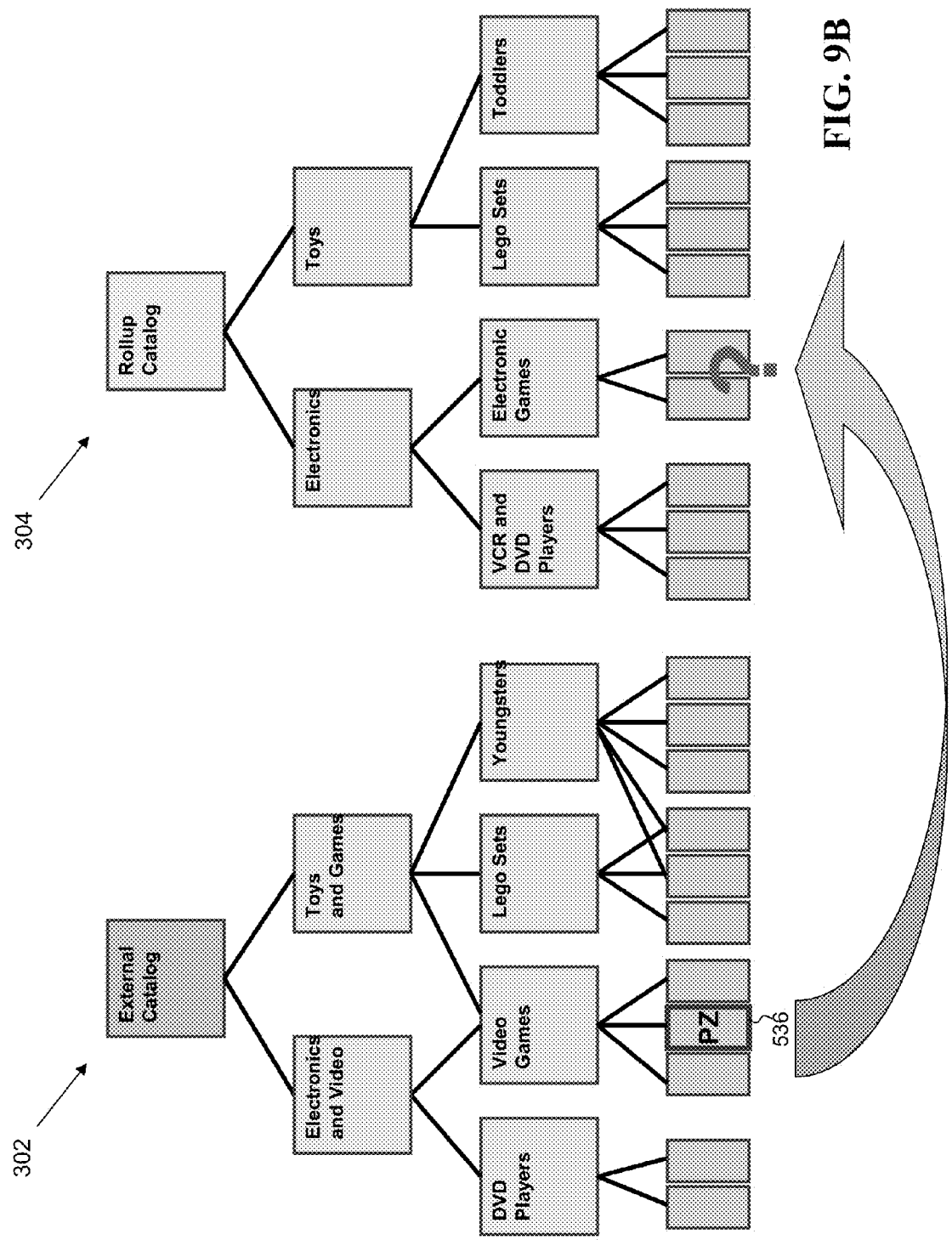

METHOD AND SYSTEM FOR IMPLEMENTING PRODUCT GROUP MAPPINGS

CROSS-REFERENCE TO RELATED APPLICATIONS

The present application claims the benefit of priority to U.S. Provisional Application No. 61/694,897, filed on Aug. 30, 2012, entitled "METHOD AND SYSTEM FOR IMPLEMENTING PRODUCT GROUP MAPPINGS" and U.S. Provisional Application No. 61/780,419, filed on Mar. 13, 2013, entitled "METHOD AND SYSTEM FOR IMPLEMENTING PRODUCT GROUP MAPPINGS", both of which are hereby incorporated by reference in their entirety. The present application is related to U.S. Ser. No. 14/015,577, entitled "METHOD AND SYSTEM FOR IMPLEMENTING A CRM QUOTE AND ORDER CAPTURE CONTEXT SERVICE", U.S. Ser. No. 14/ 015,553, entitled "METHOD AND SYSTEM FOR IMPLEMENTING VERSIONS OF A SALES CATALOG", and U.S. Ser. No. 14/015,546, entitled "METHOD AND SYSTEM FOR IMPLEMENTING AN ARCHITECTURE FOR A SALES CATALOG", all filed on even date herewith and all hereby incorporated by reference in their entirety.

BACKGROUND

The present application relates to software development and more specifically to systems, methods, and patterns for implementing enterprise software applications.

Many types of business logic are implemented by enterprise software applications. For example, CRM (Customer Relationship Management) applications often implement business logic to perform price quotations and order capture for customers. For the price quotation business logic, a pricing engine may be implemented to receive input data (e.g., product name or product ID) and to return output data that includes the price for each product in the input data.

A sales catalog is a set of data commonly accessed by CRM applications. The sales catalog may be accessed, for example, by the business logic that is used to perform price quotations and order capture for customers.

The data within the sales catalog may be consumed by multiple different types and/or categories of users within the enterprise software system. The problem is that the format/organization of the data within the sales catalog may be different or incompatible from the format/organization of that data that is needed or expected by one or more of the consumers of that data.

For example, consider that a typical CRM system organizes its data according to product group hierarchies, e.g., as shown in the product hierarchy 302 in FIG. 3. Based on a customer business model, the hierarchy 302 may be used for various purposes, such as sales/marketing purposes (e.g., to handle opportunities, orders, or partner applications). The problem is that the external catalog hierarchy 302 may differ from the one used for internal processes by an organization. For example, an organization may employ a rollup catalog hierarchy 304 for various internal purposes (e.g., territory, assignment, forecasting), where the rollup catalog 304 has a different hierarchical structure from the external catalog hierarchy 302. These differences between the hierarchies mean that the data organized for the external catalog 302 (e.g., for selling purposes) may not be compatible with the hierarchies 304 used for the internal processes.

As is evident, there is a need for an improved approach for manage incompatible data organizations for enterprise applications.

SUMMARY

According to some embodiments of the invention, provided are systems, methods, and computer program products to implement product group mappings. In order for different CRM applications (e.g., sell side and internal side applications) to work in cohesive manner, embodiments of the invention provide mapping functionality that can map product groups captured in one system using one hierarchy to be translated to the other system using the hierarchy that the consuming system understands.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF FIGURES

FIGS. 9A-G illustrate a scenario where a specific product exists in the external catalog but does not does not exist in the rollup catalog.

DETAILED DESCRIPTION

The embodiments of the invention provide an improved approach for implementing enterprise software systems that addresses the above-described problems with existing systems. From a CRM perspective, Products (Inventory Items) are normally organized in Hierarchical structures, e.g., as Product Group hierarchies. Different parts of CRM applications are operating on different hierarchies, e.g. Sales and Forecasting. There is a need to map product groups captured in one system (using one hierarchy) to be translated to the other hierarchy that the consuming system understands.

Figure 1A:
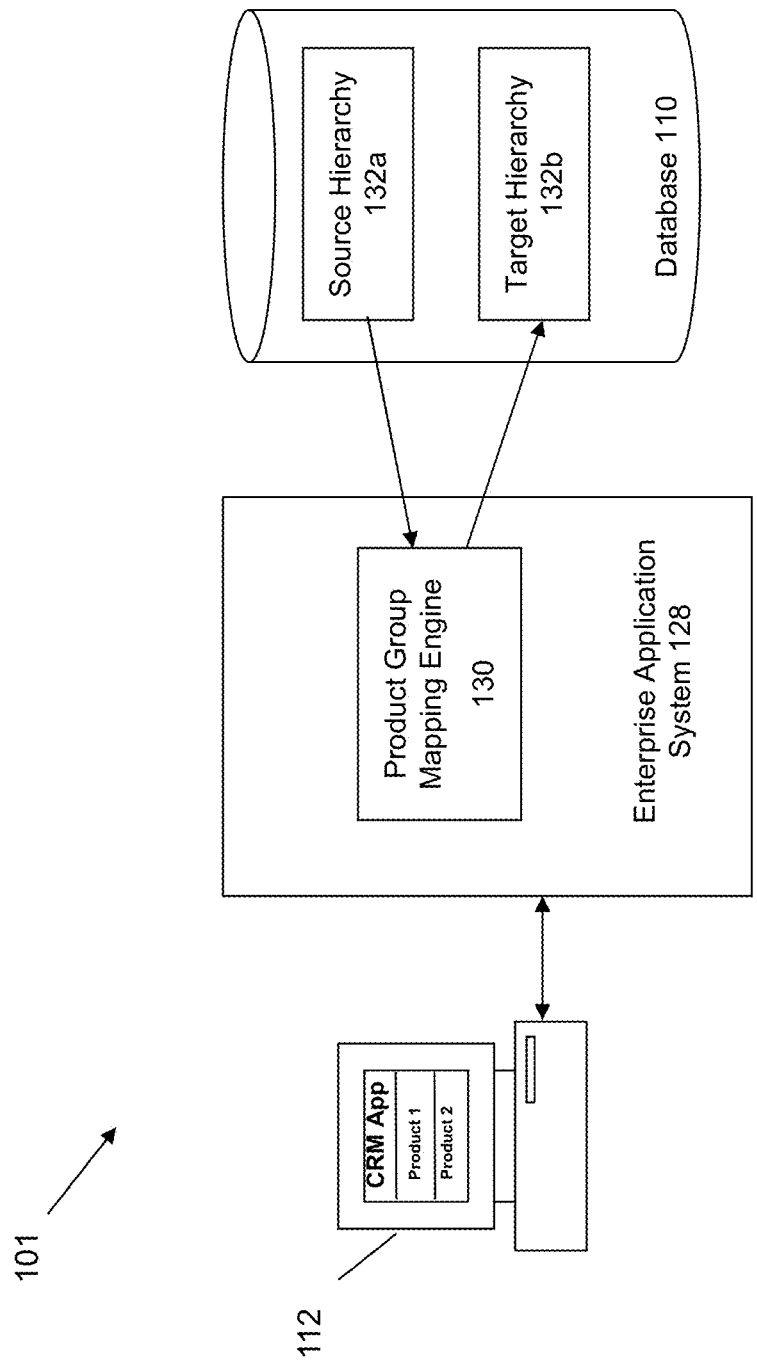
FIG. 1A shows an architecture of a system for implementing product group mappings according to some embodiments of the invention.

FIG. 1A shows an architecture of a system 101 for implementing product group mappings according to some embodiments of the invention. System 101 includes a product group mapping engine 130 to perform product group mappings. In order for different enterprise applications to work in cohesive manner, embodiments of the invention provide mapping functionality that can map a product group hierarchy 132a captured in a source system to be translated to a target hierarchy 132b in another system.

The system 101 may include one or more users at one or more user stations 112. The users operate the system 101 to access and utilize applications on an enterprise application system 128 to perform any activities operable using the system 128, such as implementing the functionality of a CRM enterprise application. In system 101, user station 112 comprises any type of computing station that may be used to operate or interface with a system 128. Examples of such user stations 112 include for example, workstations, personal computers, laptop computers, or remote computing terminals. User stations 112 may also comprise any type of portable tablet device, including for example, tablet computers, portable readers, etc. User stations 112 may also include mobile telephone devices relating to any mobile device that can suitably access an application on application system 128, such as smartphones and programmable mobile handsets. It is noted that the invention is not limited in its application to just these types of devices. The embodiments of the invention are applicable to any computing device that works in conjunction with an enterprise application.

The user station 112 comprises a display device, such as a display monitor or screen, for displaying scheduling data and interface elements to users. The user station 112 may also comprise one or more input devices for the user to provide operational control over the activities of system 100, such as a mouse, touch screen, keypad, or keyboard. The users of user station 112 correspond to any individual, organization, or other entity that uses system 101 to access applications on application system 128, such as a CRM enterprise application. Other examples of enterprise applications can include, e.g., supply chain management ("SCM") applications that manage raw materials, work-in-process and/or finished products, and coordinate with suppliers; relationship management applications that are used to track, store and/or manage customer information; financial applications that track and/or analyze the financial performance of the organization; human resources applications that provide management of the human resources functions of the organization, and other applications. In some cases, these applications are standalone applications; in other cases, a single business application or suite of applications might provide some or all such functionality. Specific, non-limiting examples of enterprise applications include JD Edwards Enterprise One, PeopleSoft Enterprise applications, and the Oracle eBusiness Suite, all available from Oracle Corporation of Redwood Shores, Calif.

The data accessed or created by the enterprise application can be stored in a database 110. The database 110 corresponds to any type of computer readable mediums or storage devices. The computer readable storage devices comprise any combination of hardware and software that allows for ready access to the data within database 110. For example, the computer readable storage device could be implemented as computer memory or disk drives operatively managed by an operating system.

Figure 1B:
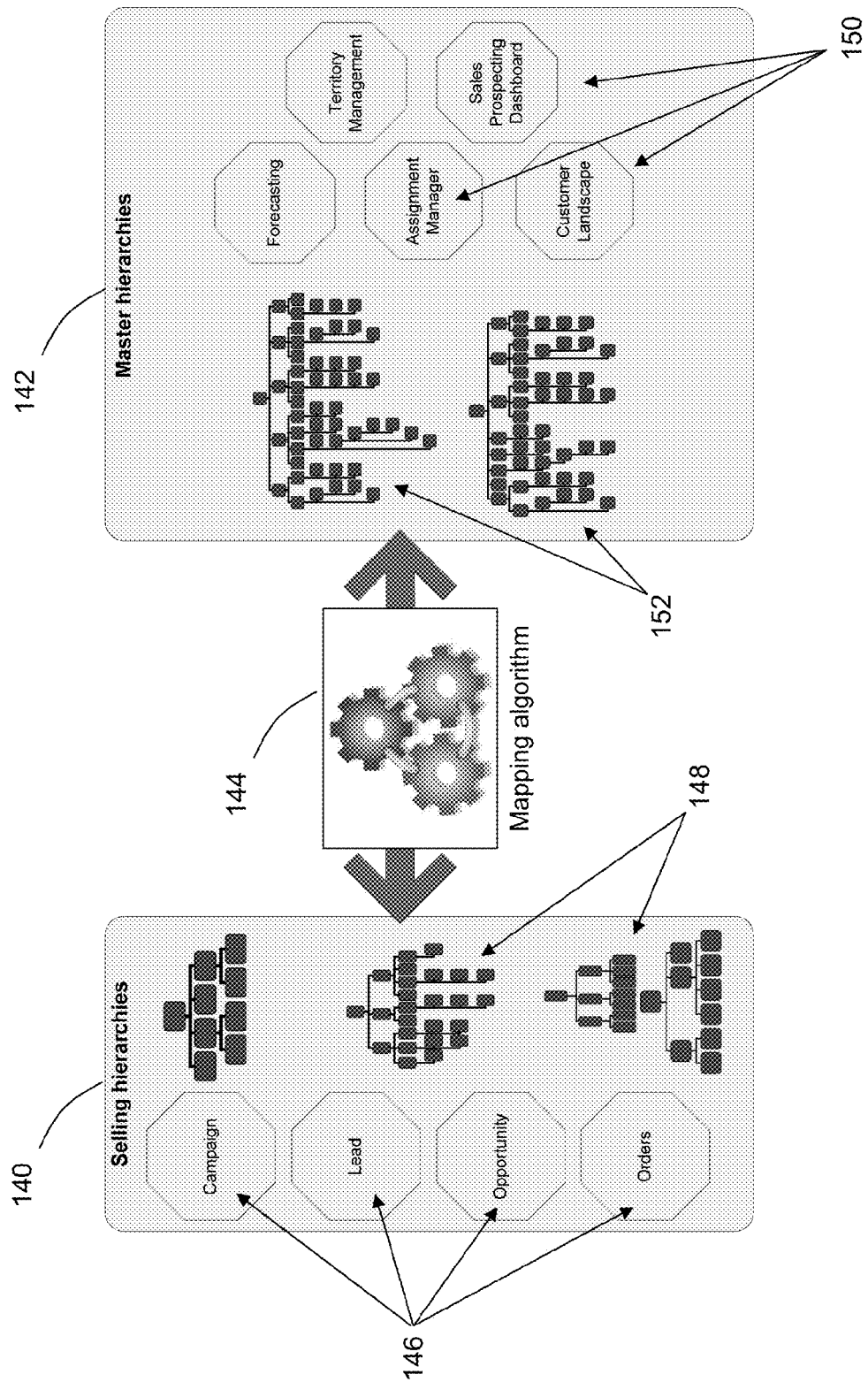
FIG. 1B illustrates that some embodiments of the invention provides systems, methods, and computer program products to implement product group mappings.

As illustrated in FIG. 1B, the invention provides systems, methods, and computer program products to implement product group mappings. The external sell-side hierarchies 140 may correspond to product group hierarchical structures that are specific to certain sell-side enterprise application requirements. For example, the selling hierarchies 140 may correspond to specific hierarchical structures 148 for selling applications 146 such as campaign, lead, opportunity, and/or order activities. In contrast, the internal hierarchies 142 may correspond to product group hierarchical structures 152 that are quite different from the sell-side hierarchies 140. For example, the internal hierarchies 142 may correspond to hierarchal structures 152 that are specific to activities 150 such as forecasting, territory management, assignment manager, sales prospecting dashboard, and/or customer landscape management activities.

In order for different CRM applications (e.g., sell side applications 146 and internal side applications 150) to work in cohesive manner, embodiments of the invention provide a mapping mechanism 144 that can map product groups captured in one system using one hierarchy to be translated to the other system using the hierarchy that the consuming system understands.

Positions of a group in a hierarchy are defined by its paths, consisting from a chain of intermediate product groups, connecting root and descendent product groups ("PG") through parent child relationships. The PG parent-child structure is typically a graph, where a child can have multiple parents and parents can belong to different hierarchies. In general each PG can have multiple paths that can differ from each other by the content of intermediate product group chain. Positions of a product in a hierarchy are also defined by its paths, where a product path is a path from root product group to product's immediate PG appended by "Path" from immediate parent to this product. Parent child relationships are effective time enabled, therefore for any given time moment the graph can look different. In a no-duplication hierarchy in some embodiments, each group or product may have only one path at any given time moment.

Embodiments of the invention provide the ability to identify a product group in a given hierarchy, containing all products, defined by sample product group from another hierarchy, and at the same time as little as possible extra products. The invention is also capable of recording obtained results in the mapping table for fast retrieval and reverse lookups.

Figure 1C:
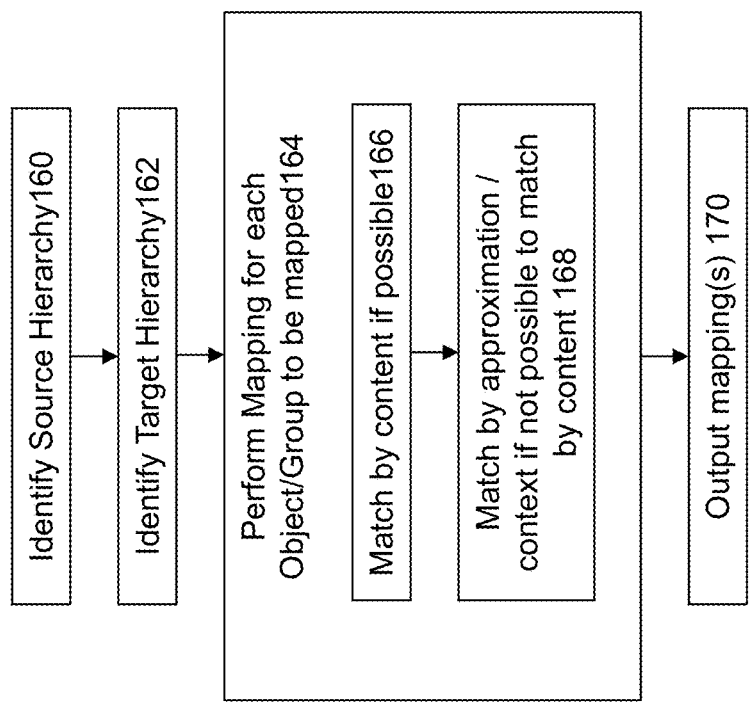
FIG. 1C illustrates the general flow of the inventive solution according to some embodiments of the invention.

FIG. 1C illustrates the general flow of the inventive solution according to some embodiments of the invention. At 160, identification is made of the one or more source hierarch(ies) for which mapping is required. In some embodiments, this action identifies the relevant sell-side product group hierarchy for which roll-up activities need to be applied. At 162, identification is made of the one or more target hierarch(ies) that needs to be mapped to the source hierarchies. In some embodiments, this action identifies the internal product group hierarchies to perform roll-up activities.

At 164, mappings are performed between the source hierarchy and the target hierarchy. The invention is generally implemented in the present embodiment by finding a lowest node in target hierarchy that guarantees access to all products (items) and is covered by sample product structure. There might be a case, for example, when some of products from source PG are not present in the target hierarchy at all; in such cases in some embodiments, those products will be ignored where the remaining products will be used as the basis for determining similarity.

When none of products from sample PG are referred in the target hierarchy, a possible approach is to perform a guess for best match. With that assumption, that immediate parent in particular hierarchy is a best approximation for a sample PG, the mapping of parent group will provide closest matching (e.g., match by "Approximation"). The mapping of a single product converges to PG mapping by treating this product as a virtual PG.

Therefore, several approaches can be implemented for embodiments of the invention to perform mappings:
  a) "Match By Id"—This approach detects the presence of a given sample object, product or a product group by its identifier in a target hierarchy.
  b) "Match By Content"—This approach performing mappings by checking for matched content between the two hierarchies.
  c) "Match By Approximation"—This approach analyzes the context of a source object to identify approximate matches in the target hierarchy.

The "Match By Id" approach pertains to searching (e.g., finding a PG in hierarchy), by looking for exactly matching identifiers between the two hierarchies (e.g., identifiers for object/product/product group). However, in certain circumstances, when used against generic target structure, this approach may produce misleading results. In some embodiments, one option is to not directly use this approach when generating mapping records, but instead to use the "Match By Content" approach, which yields the same results in the case of a no-duplicative target hierarchy.

Therefore, in the current embodiment, the mechanism performs a "Match By Content" analysis at 166 against the objects in the source hierarchy, in an attempt to identify content that matches content is also within the target hierarchy. By matching the content between the two hierarchies, mappings can therefore be performed to identify portions of each hierarchy that correspond to each other.

For any objects that cannot be matched by content, the "Match By Approximation" approach can be taken at 168. This approach looks at the context of the objects being analyzed, to try and approximate the correct mapping to relevant portions of the target hierarchy. Once the mappings have been made, the mappings can be output for downstream usage at 170.

Figure 2:
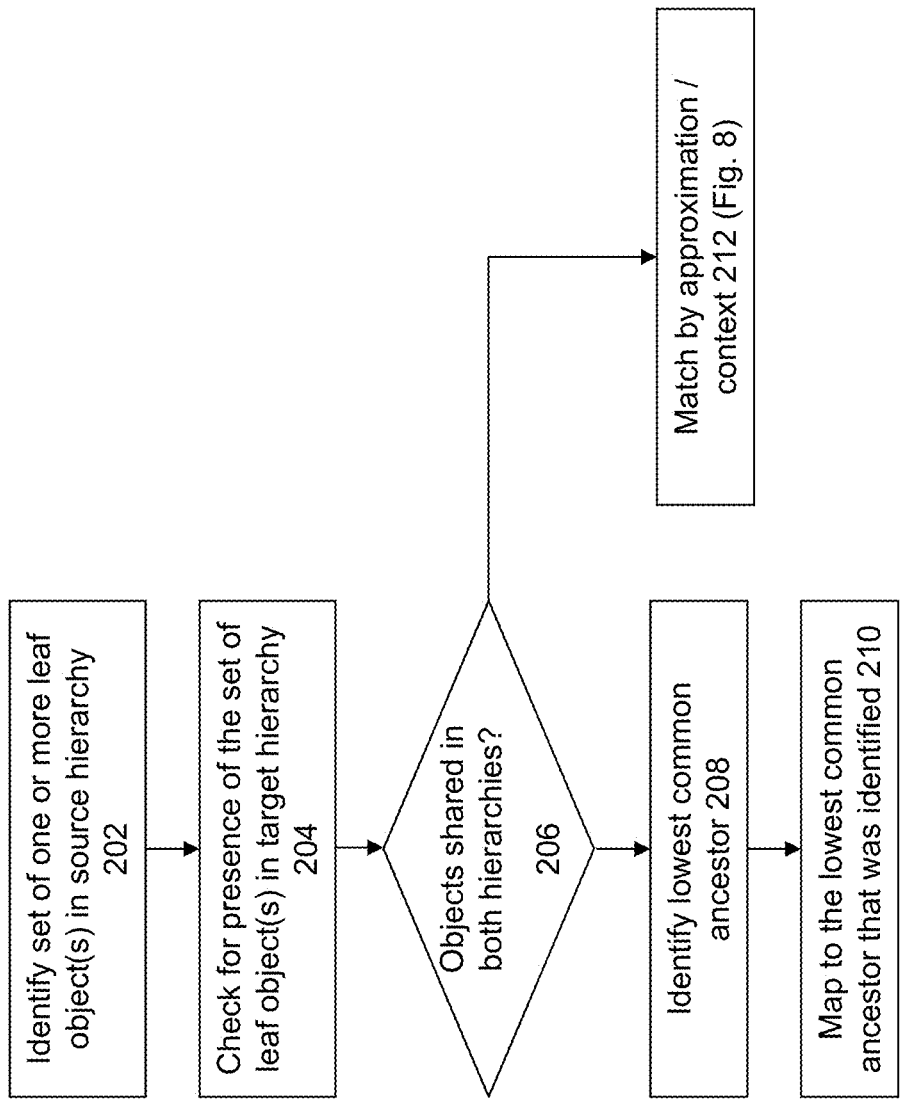
FIG. 2 shows a more detailed flowchart of the "Match By Content" approach.

FIG. 2 shows a more detailed flowchart of the "Match By Content" approach. This approach attempts to determine whether the set of leaf objects (e.g., products) are shared in the two hierarchies. Therefore, at 202, identification is made of a set of one or more leaf objects in the source hierarchy. At 204, a check is made whether that set of leaf objects exists in the target hierarchy. If the determination at 206 is that the objects are not shared between the two hierarchies, then the "Match By Approximation" approach is performed at 212 (as described in conjunction with FIG. 8).

However, if the set of leaf objects exist within both hierarchies, then a determination is made at 208 of the lowest common ancestor for the set of products in the target hierarchy that correspond to the set of leaf objects. At 210, mapping is performed to that lowest common ancestor. This action is performed, for example, by returning the path and identifier of resulting product group.

Figure 3:
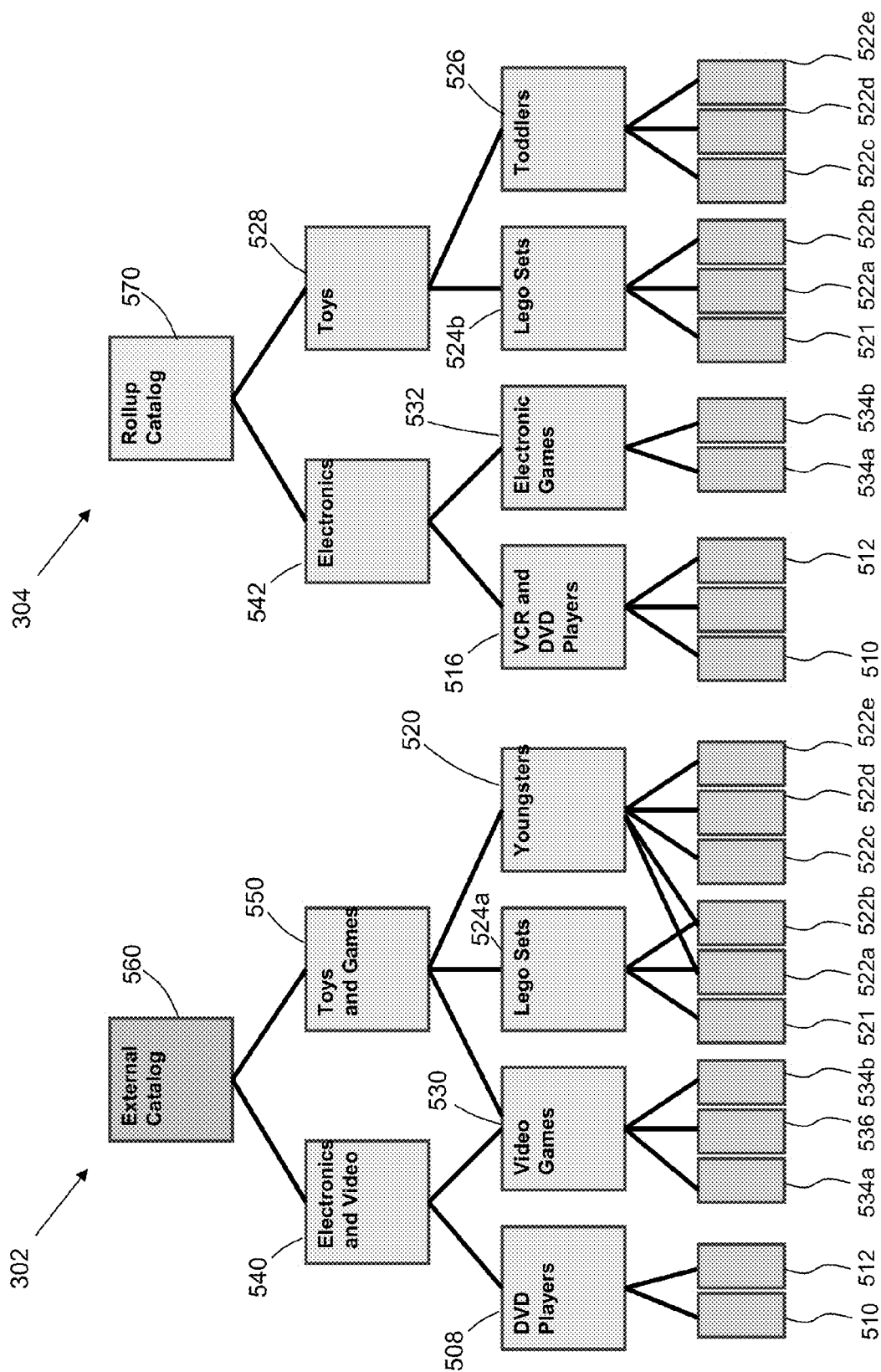
FIG. 3 shows an example product group hierarchy.

To illustrate the "Match By Content" approach, consider again the product hierarchies shown in FIG. 3, which illustrates a source hierarchy 302 (e.g., for an external sales catalog) and a target hierarchy 304 (e.g., for an internal roll-up catalog). In this example, it can clearly be seen that the external catalog hierarchy 302 differs from the internal catalog hierarchy 304 used for internal processes by the organization.

Figure 4A:
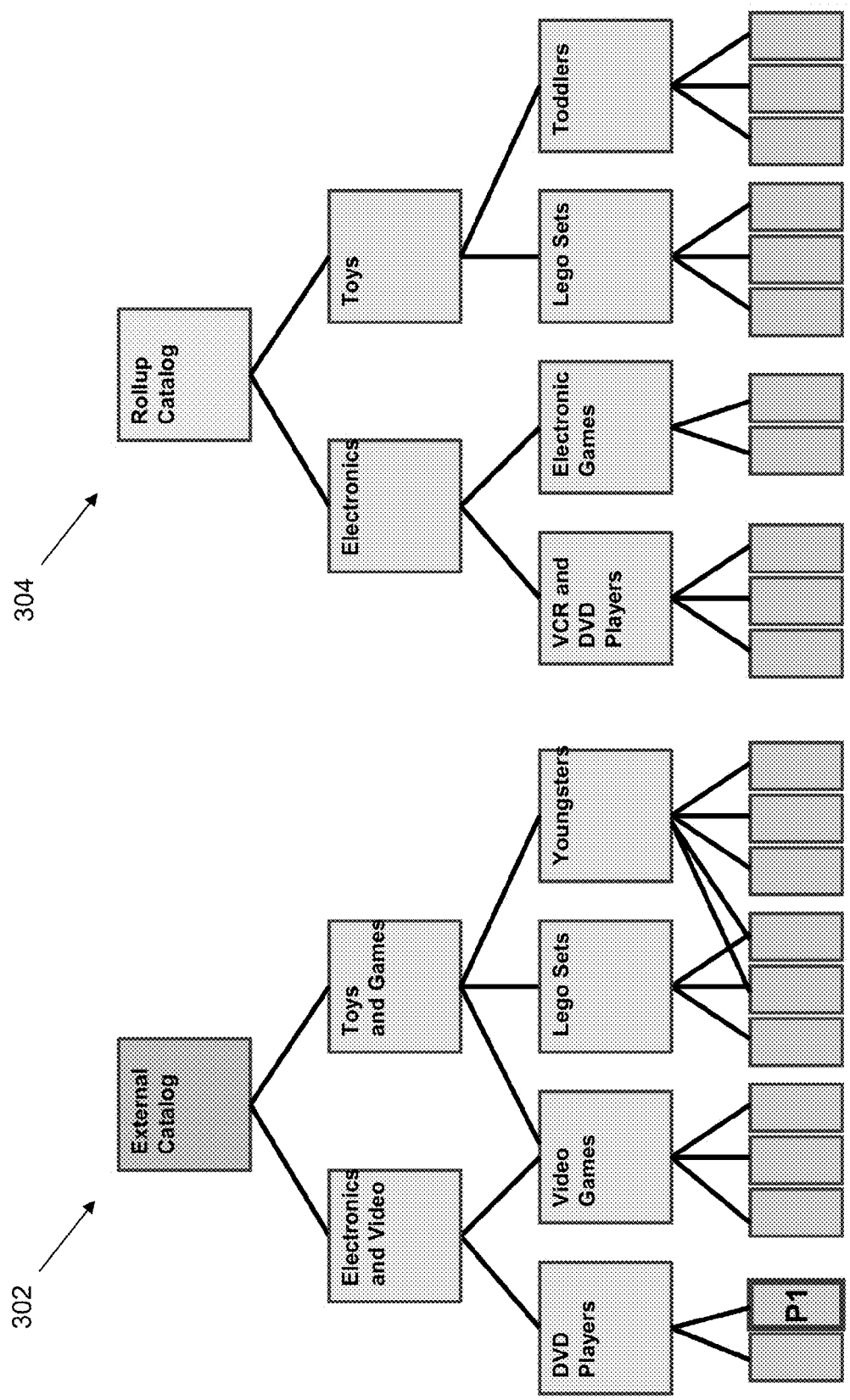
FIGS. 4A-C illustrate a scenario where a specific product exists in both catalogs.
Figure 4B:
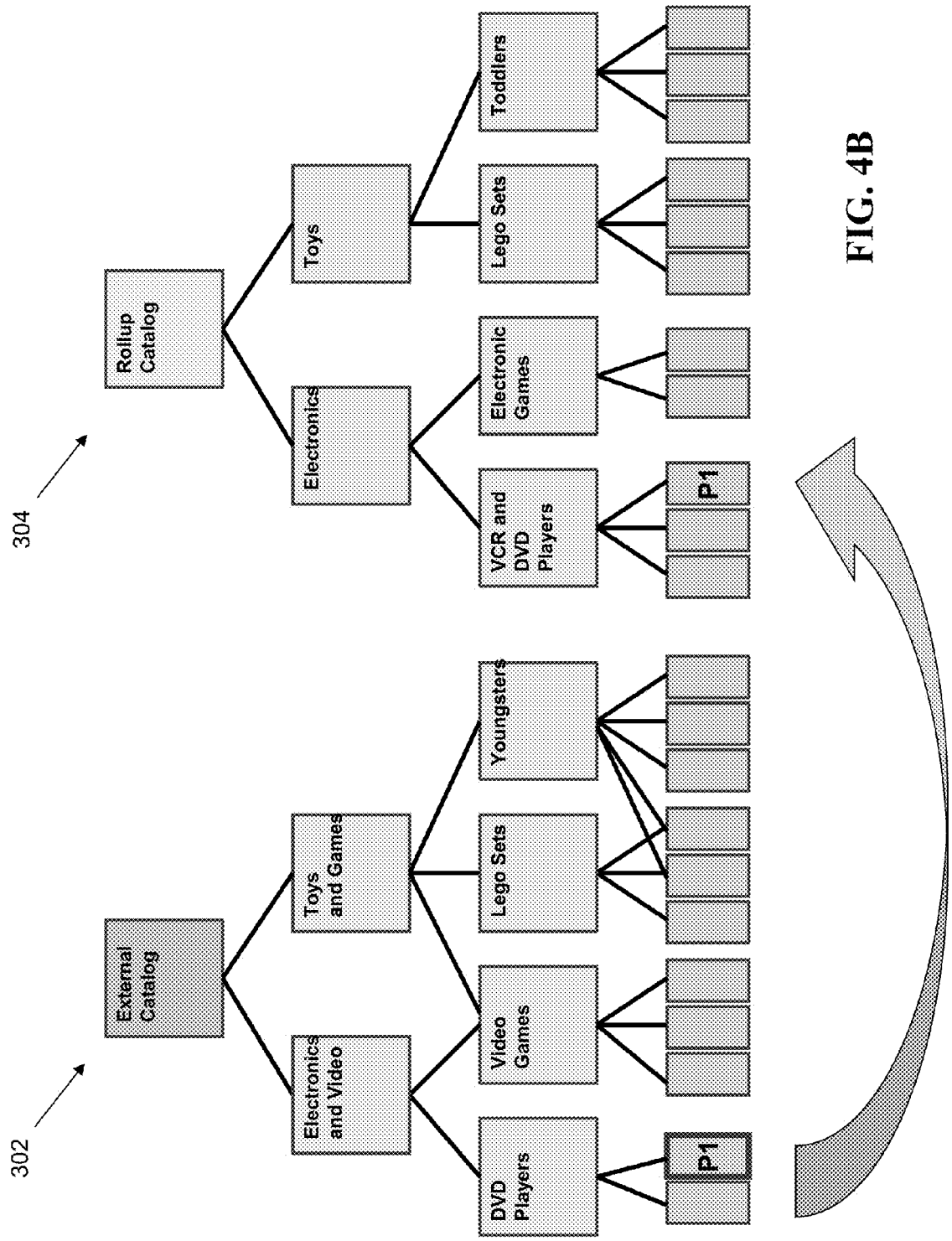
Figure 4C:
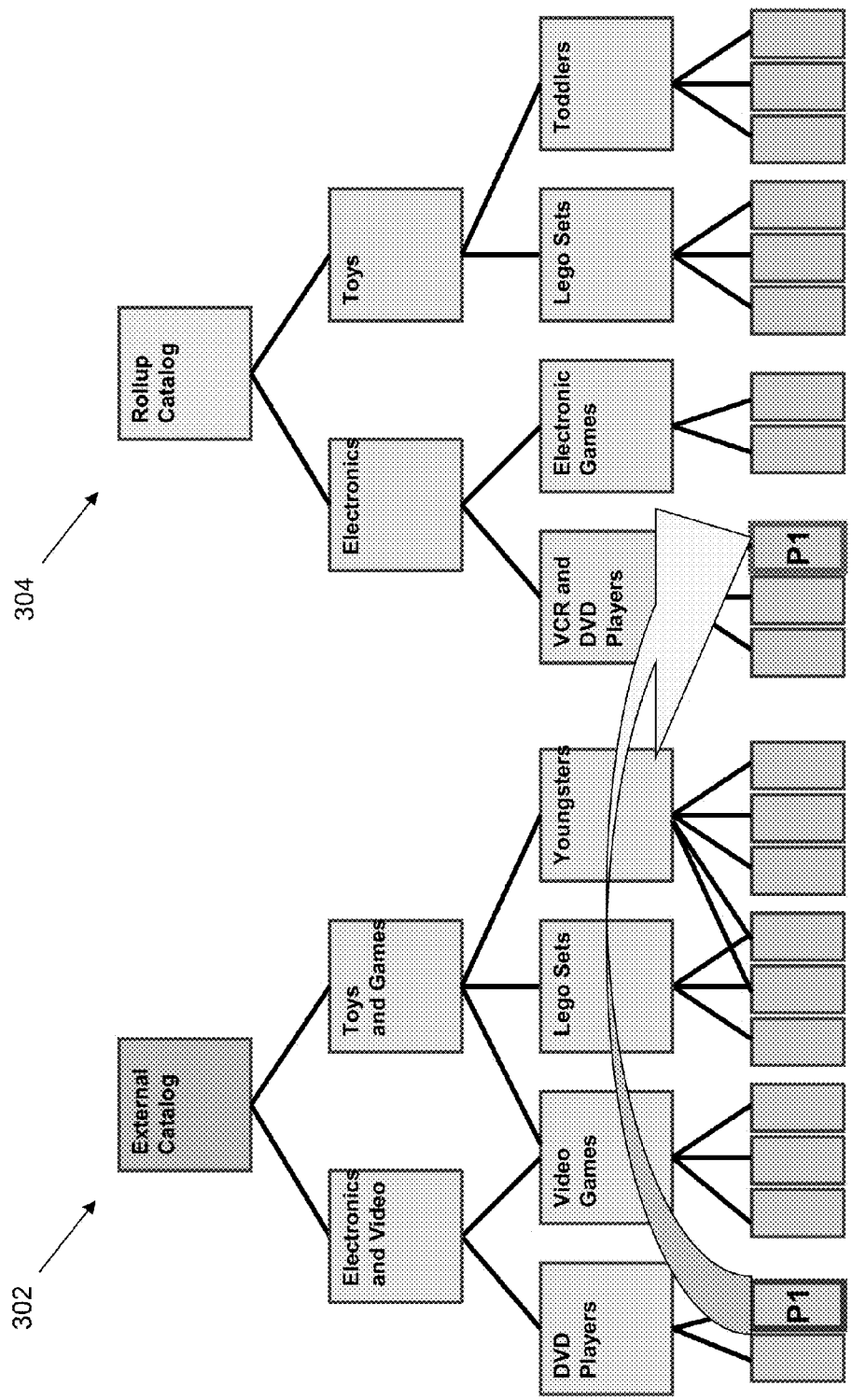

FIGS. 4A-C illustrate a scenario where a specific product exists in both catalogs. As shown in FIG. 4A, a leaf node corresponding to product P1 exists in the source hierarchy 302 (in the product group "DVD Players"). A determination is made whether this same content exists in the target catalog.

As shown in FIG. 4B, it can be seen this same item of content also exists in the target hierarchy 304. Specifically, the same product P1 exists in target hierarchy 304 in the product group "VCR and DVD Players". Therefore, as shown in FIG. 4C, a direct mapping can be made between the product P1 in the source hierarchy 302 and the product P1 in the target hierarchy 304.

Figure 5A:
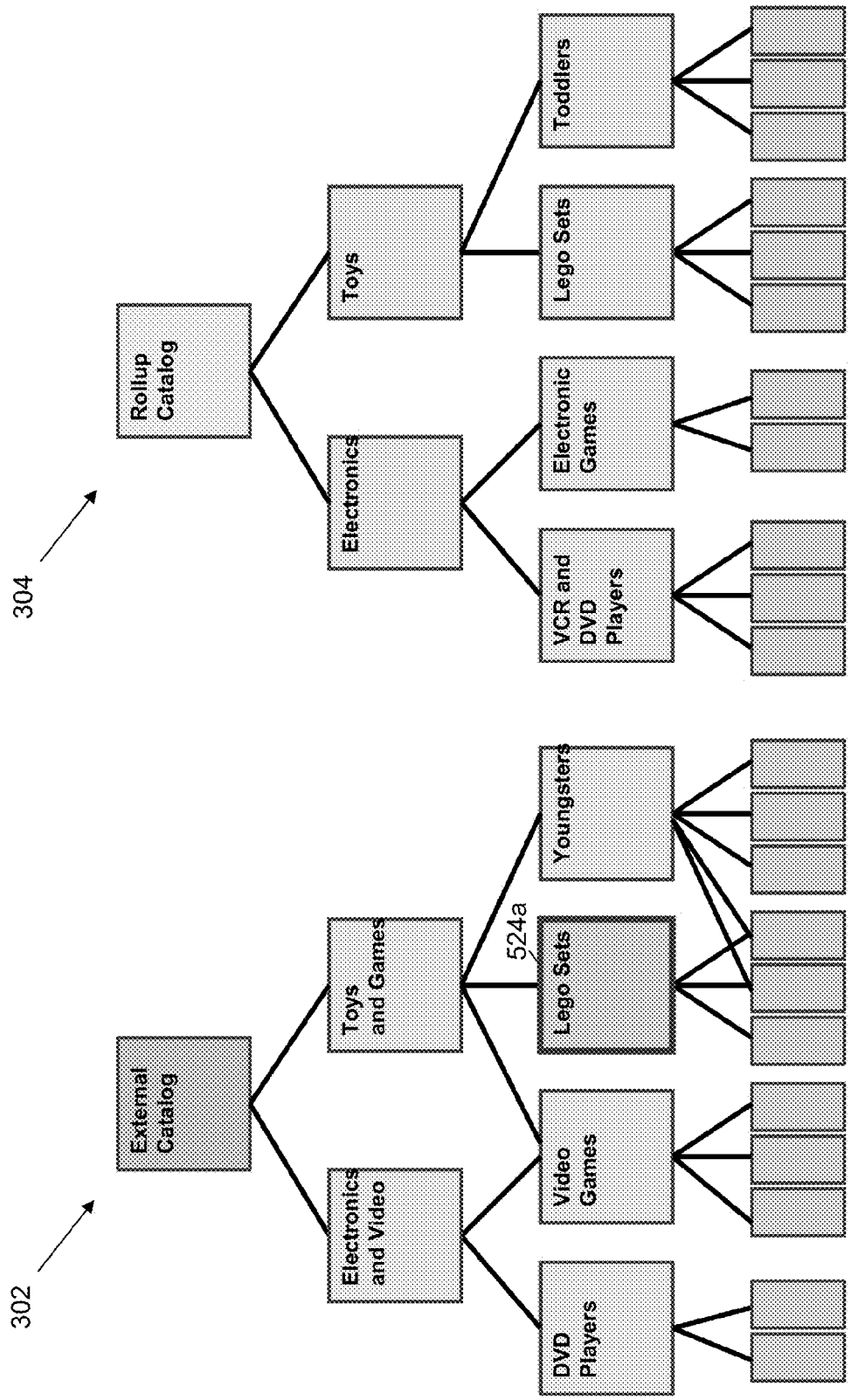
FIGS. 5A-C illustrate a scenario, where a product group exists in both catalogs.
Figure 5B:
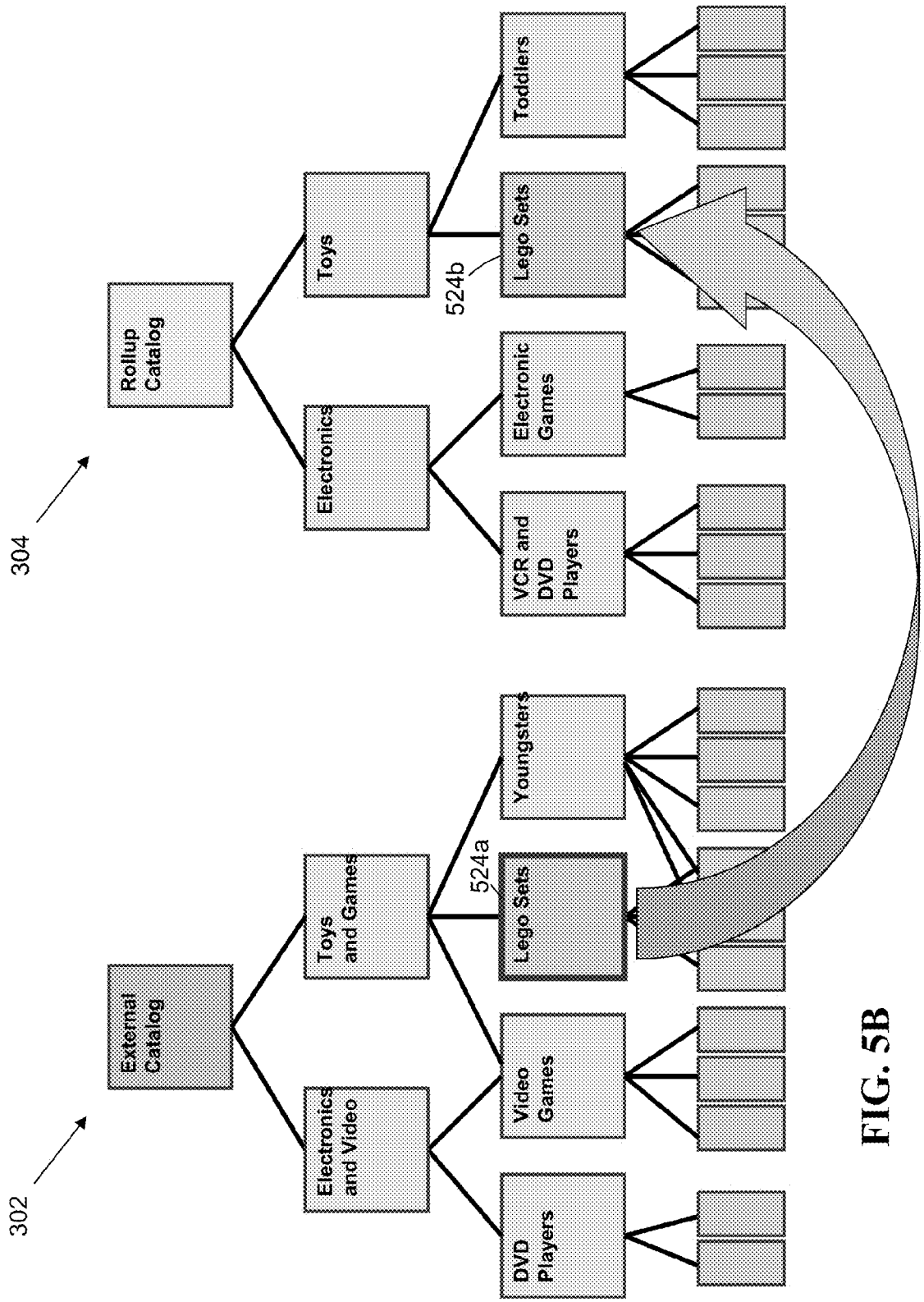
Figure 5C:
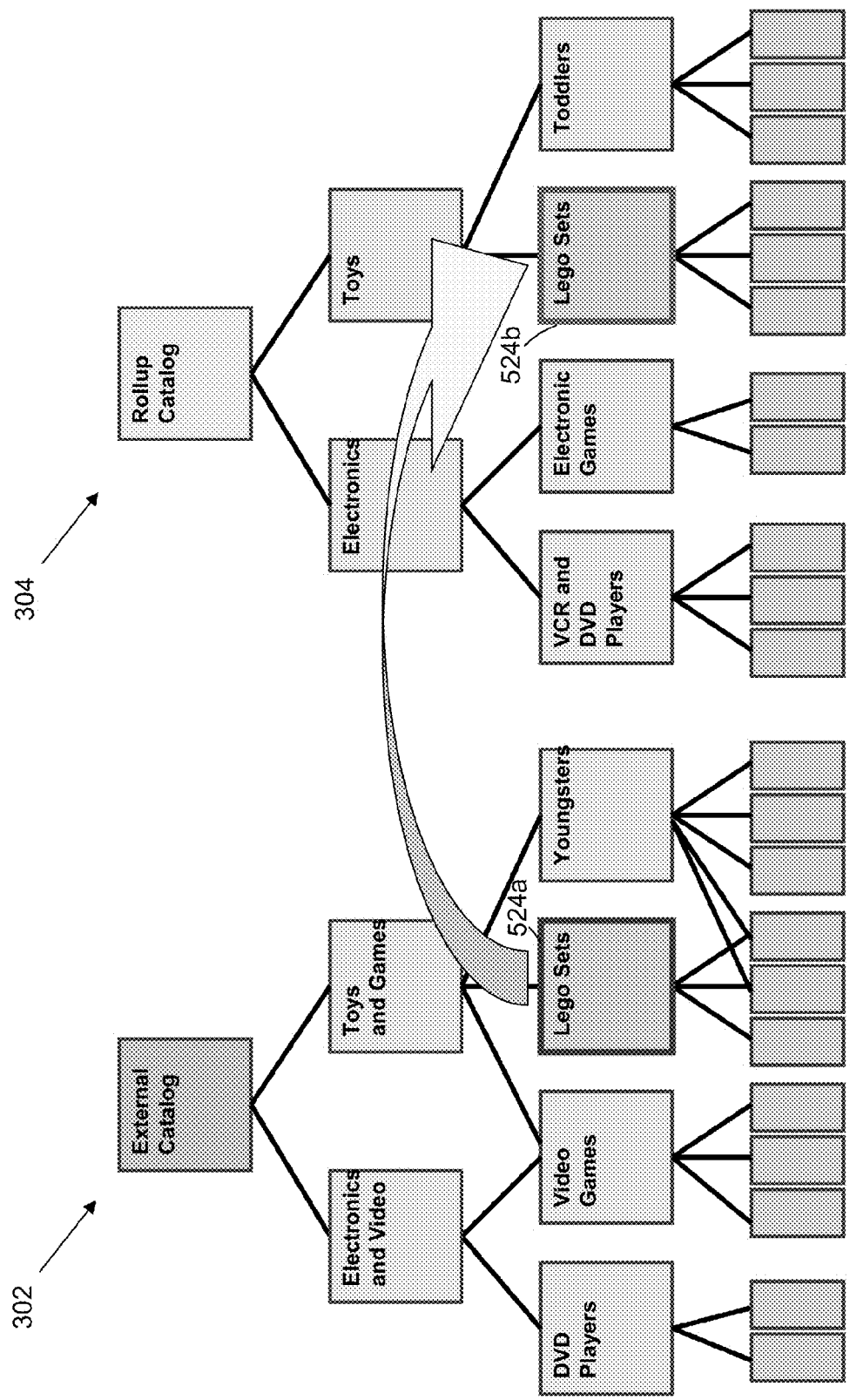

FIGS. 5A-C illustrate another possible scenario, where a product group exists in both catalogs. As shown in FIG. 5A, the node 524a corresponding to the "Lego Sets" product group exists in the source hierarchy 302. A determination is therefore made whether this same content exists in the target catalog 304.

As shown in FIG. 5B, this same product group also exists in the target hierarchy 304. Specifically, the same "Lego Sets" product group also exists in target hierarchy 304 at node 524b. Therefore, as shown in FIG. 5C, a direct mapping can be made between the product group "Lego Sets" in the source hierarchy 302 (at node 524a) and the product group "Lego Sets" in the target hierarchy 304 (at node 524b).

Figure 6A:
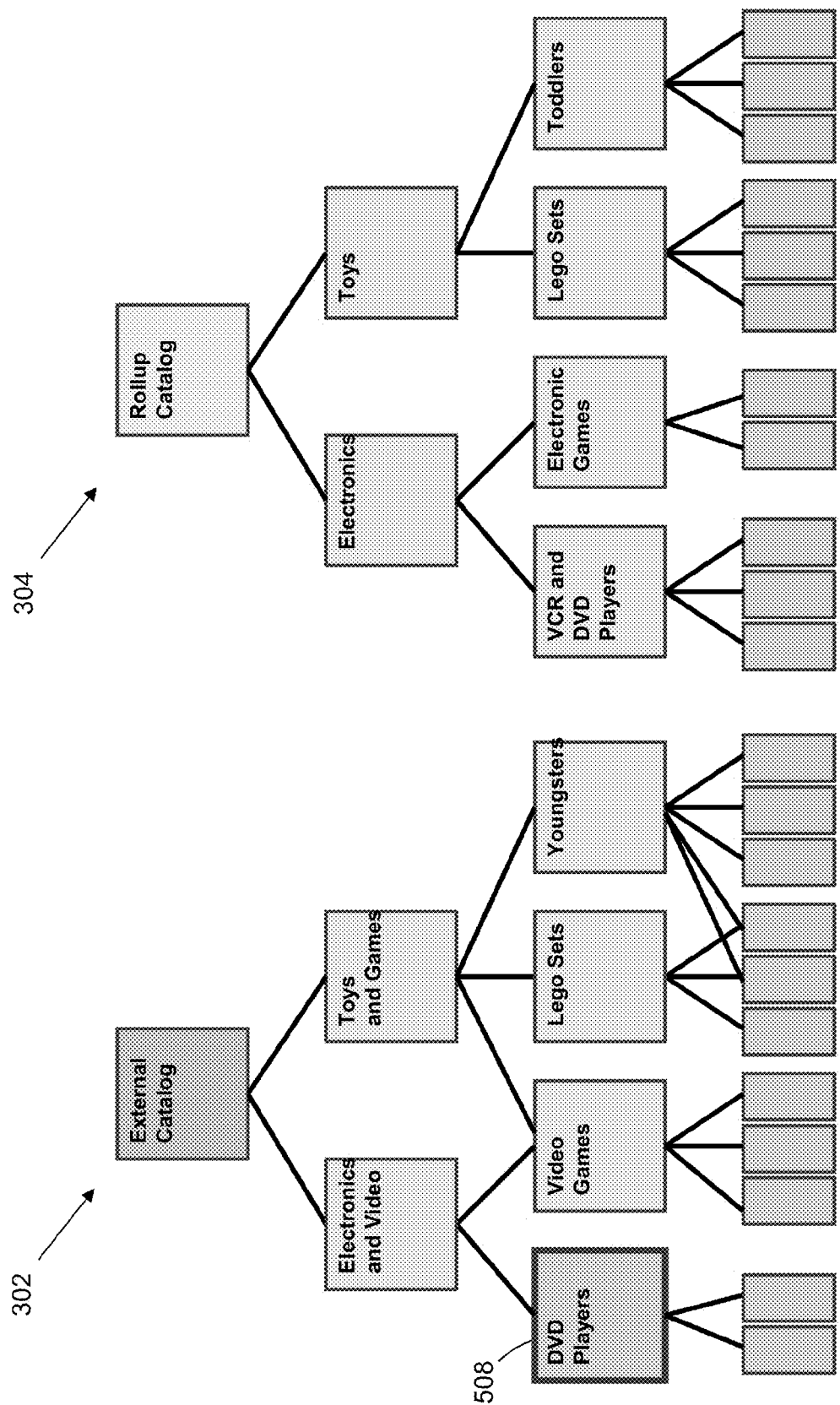
FIGS. 6A-E illustrate a scenario where a given product group does not exist in both catalogs, but the content of the product group at the source hierarchy exists within another product group at the target hierarchy.

FIGS. 6A-E illustrate the scenario where a given product group does not exist in both catalogs, but the content of the product group at the source hierarchy exists within another product group at the target hierarchy. As shown in FIG. 6A, the node 508 corresponding to the "DVD Players" product group exists in the source hierarchy 302. However, that same product group does not exist within the target catalog 304.

Figure 6B:
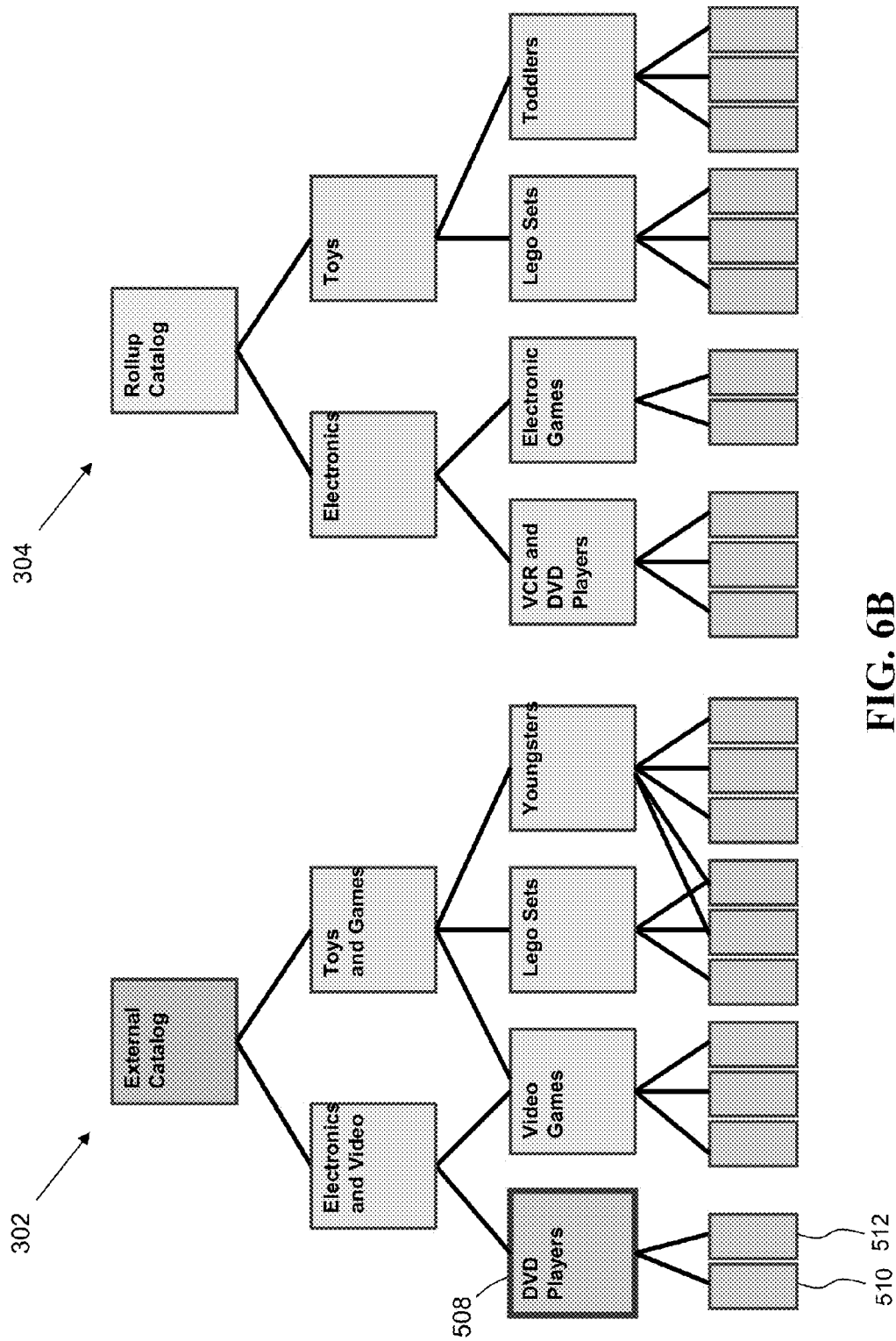

As shown in FIG. 6B, identification is made of the content for the leaf nodes corresponding to node 508 for the "DVD Players" product group in the source hierarchy 302. Here, nodes 510 and 512 are identified as the leaf nodes that correspond to the node 508 for the "DVD Players" product group.

Figure 6C:
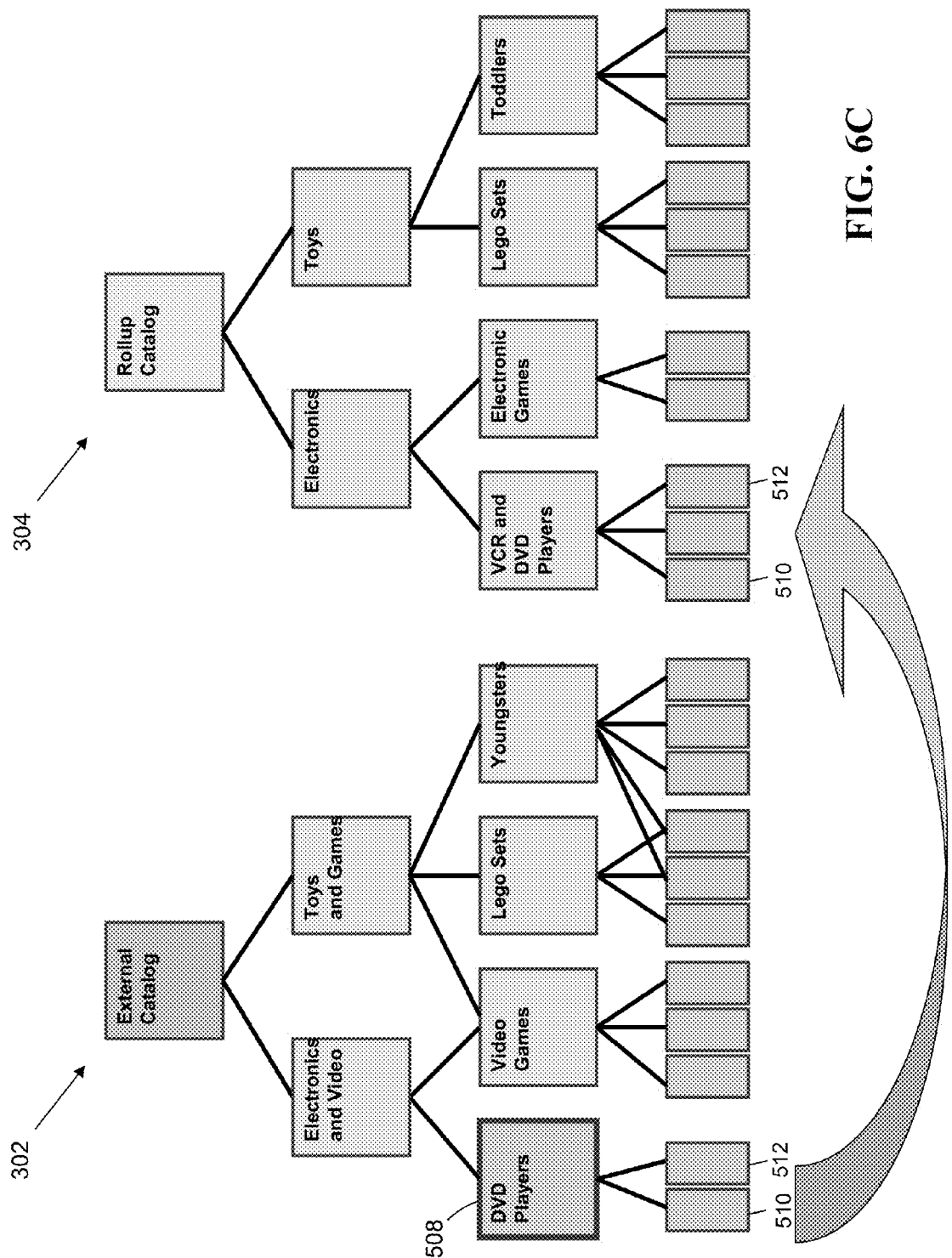

A determination is made whether these same leaf nodes can be found in the target hierarchy 304. As shown in FIG. 6C, the leaf nodes 510 and 512 can also be found in the target hierarchy 304.

Figure 6D:
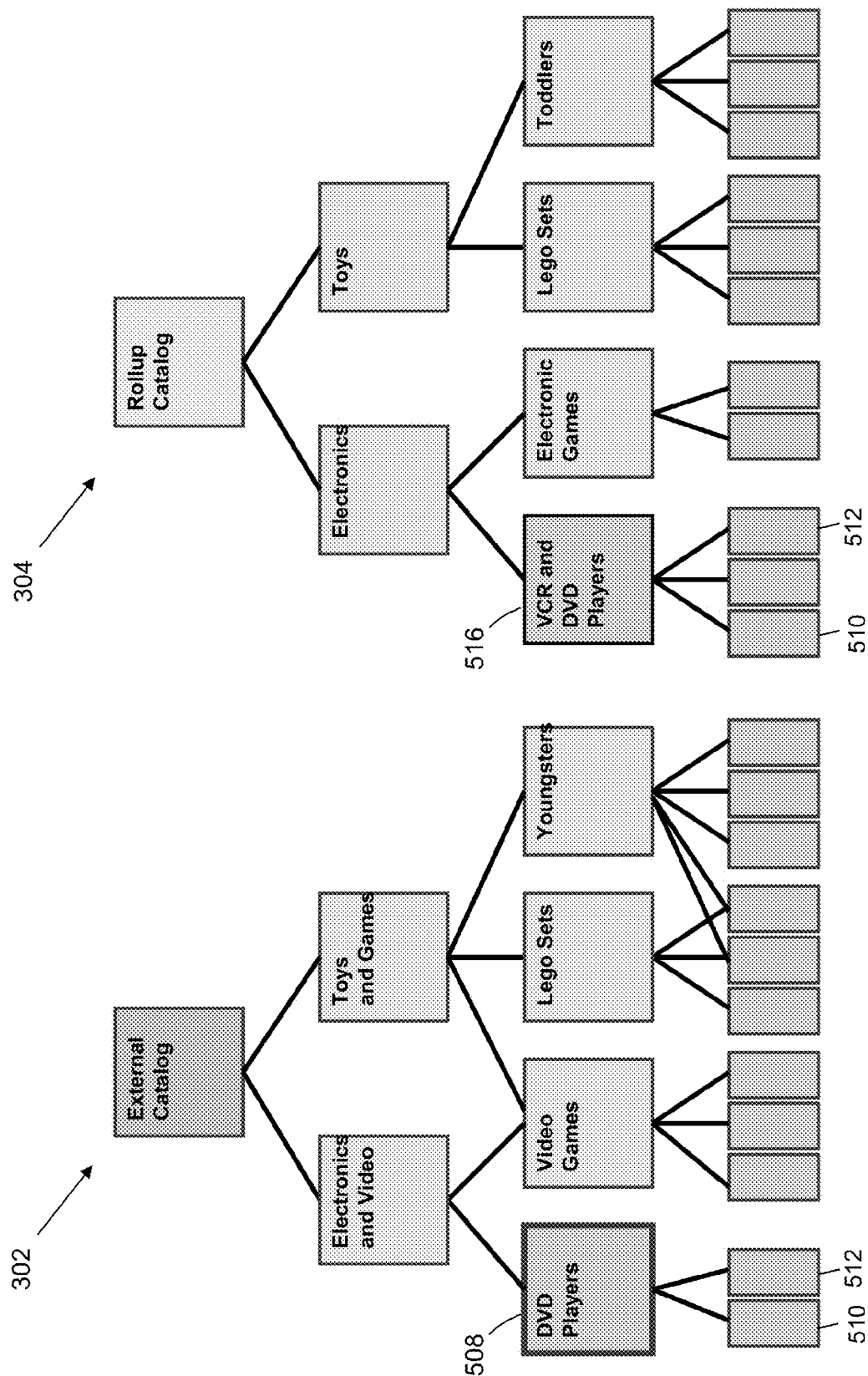

The next action is to identify the lowest common ancestor for these nodes 510 and 512 in the target hierarchy 304. As shown in FIG. 6D, the lowest common ancestor can be identified as node 516 corresponding to the "VCR and DVD Players" product group in the target hierarchy 304.

Figure 6E:
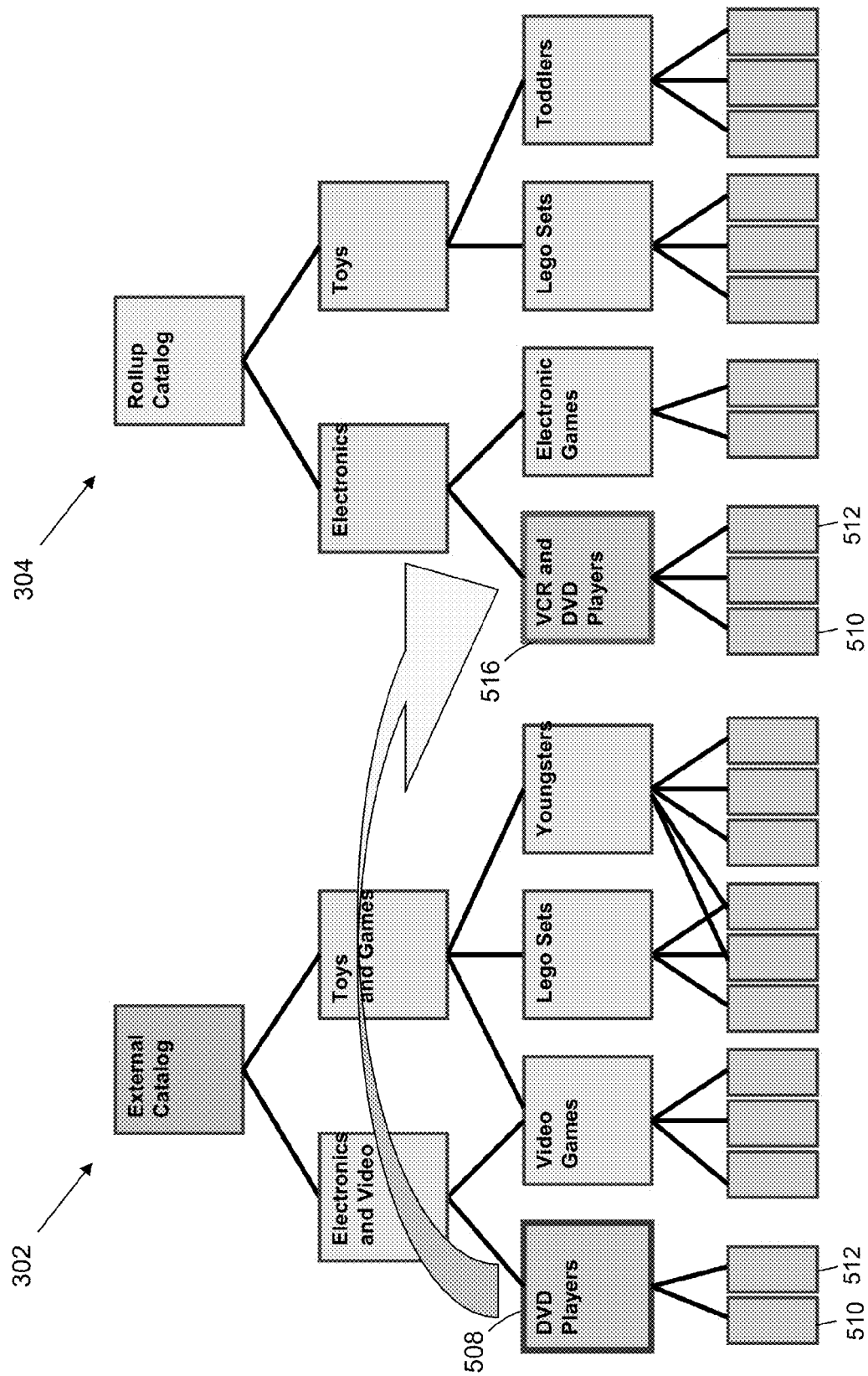

Therefore, as shown in FIG. 6E, a mapping can be performed to map the "DVD Players" product group (node 508) in the source hierarchy 302 to the "VCR and DVD Players" product group (node 516) in the target hierarchy 304. This mapping is performed even though the same product group does not exist in both catalogs.

Figure 7A:
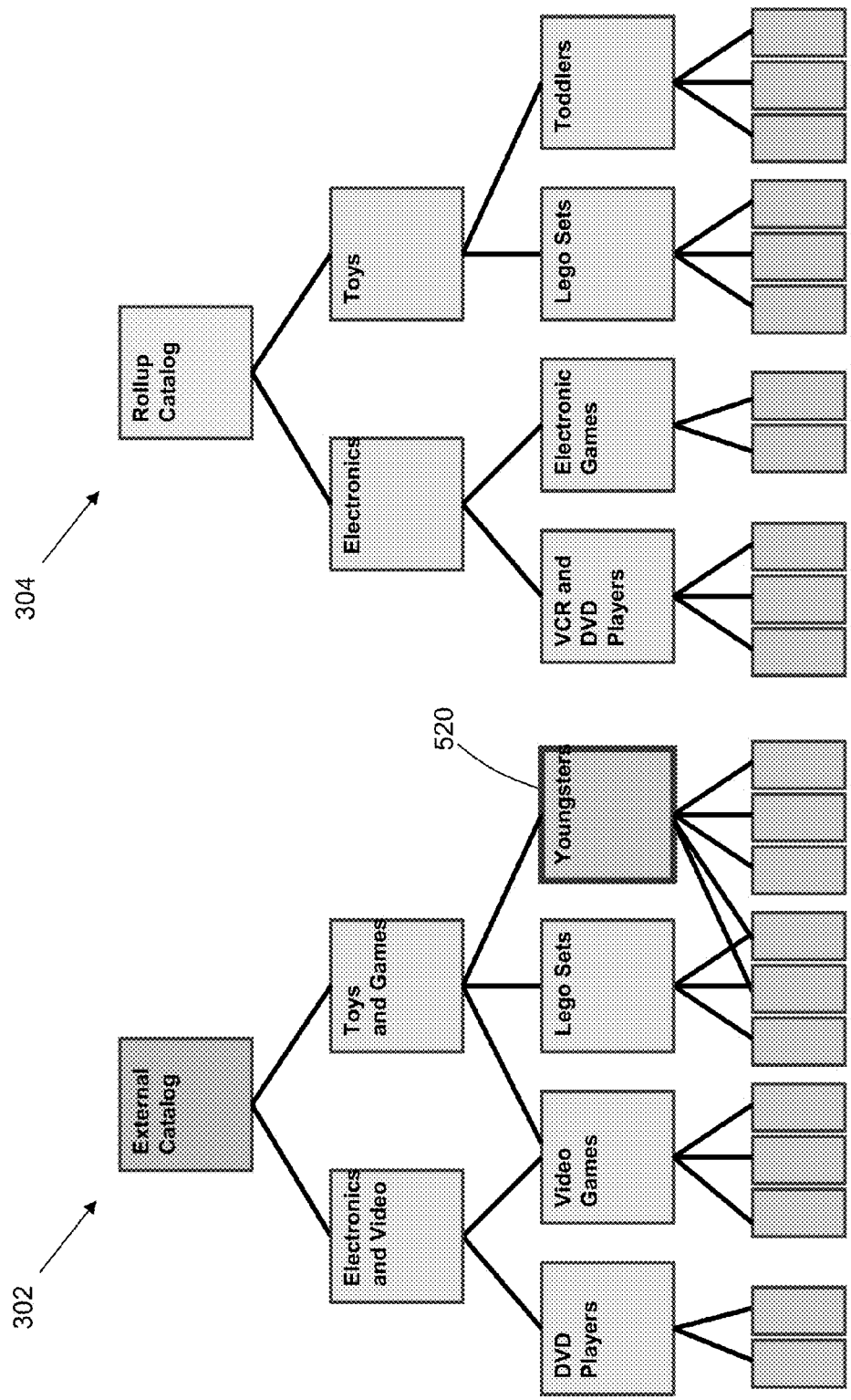
FIGS. 7A-F illustrate a scenario where a given product group does not exist in both catalogs, and where the content at the source hierarchy corresponds to multiple product groups at the source hierarchy.

FIGS. 7A-F illustrate the scenario where a given product group does not exist in both catalogs, and where the content at the source hierarchy corresponds to multiple product groups at the source hierarchy. As shown in FIG. 7A, the node 520 corresponding to the "Youngsters" product group exists in the source hierarchy 302. However, that same product group does not exist within the target catalog 304.

Figure 7B:
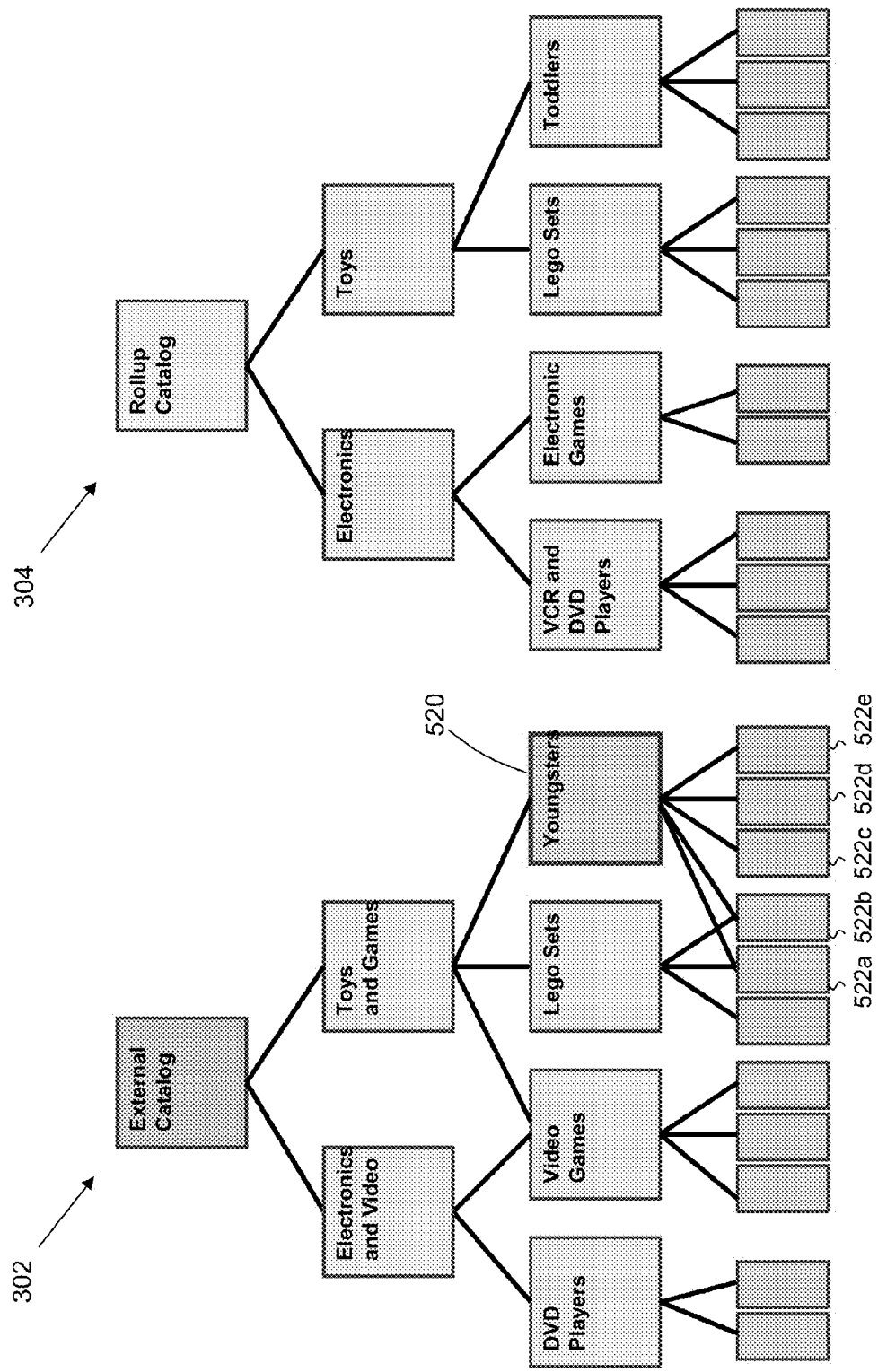

As shown in FIG. 7B, identification is made of the content for the leaf nodes corresponding to node 520 for the "Youngsters" product group in the source hierarchy 302. Here, nodes 522*a*, 522*b*, 522*c*, 522*d*, and 522*e* are identified as the leaf nodes that correspond to the node 520 for the "Youngsters" product group. However, it can be seen that these leaf nodes 522*a*, 522*b*, 522*c*, 522*d*, and 522*e* are not all contained within the single product group "Youngsters". Instead, these leaf nodes 522*a*, 522*b*, 522*c*, 522*d*, and 522*e* are also shared with the "Lego Sets" product group (node 524*a*) at the source hierarchy 302.

Figure 7C:
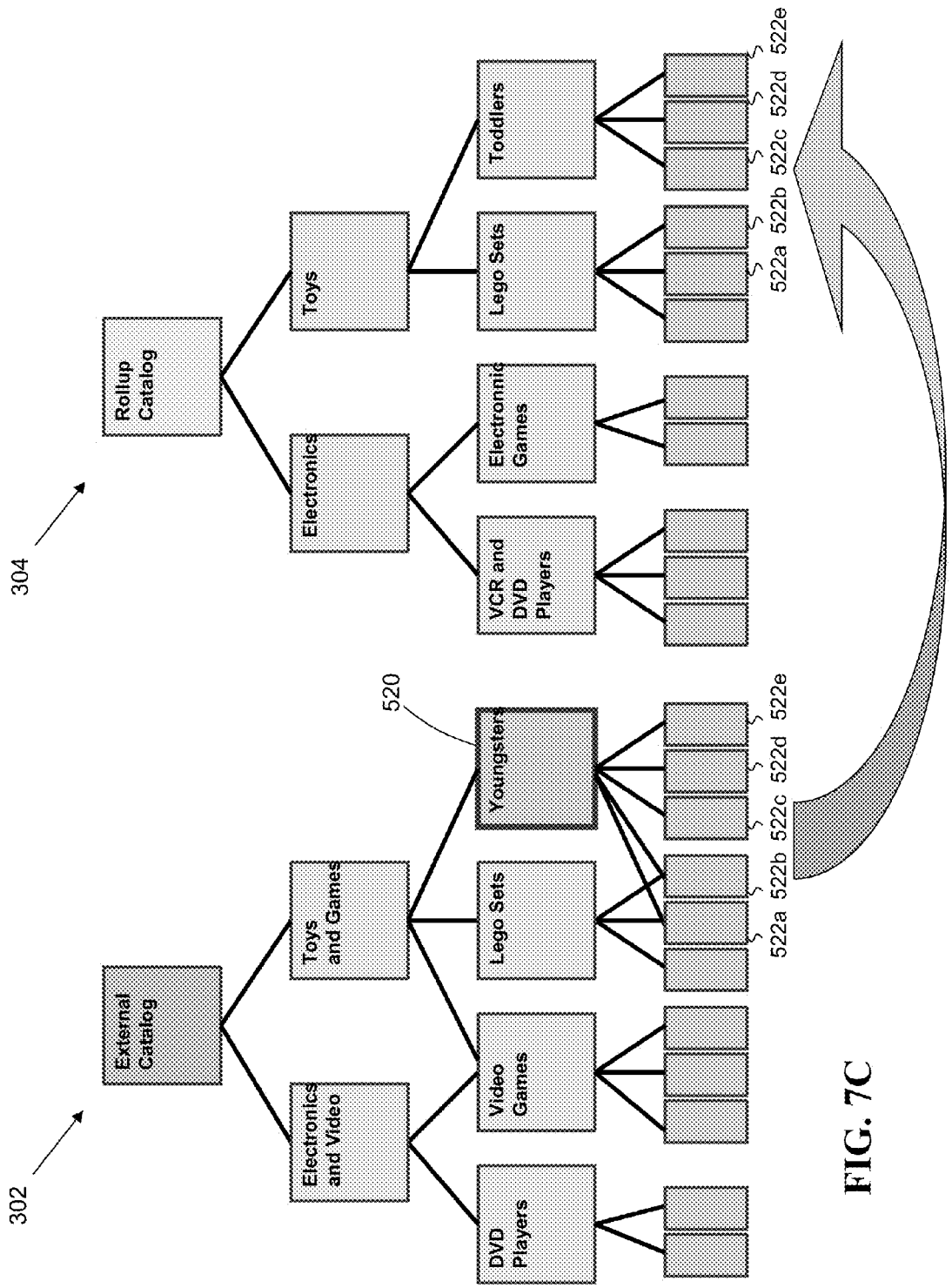
Figure 7D:
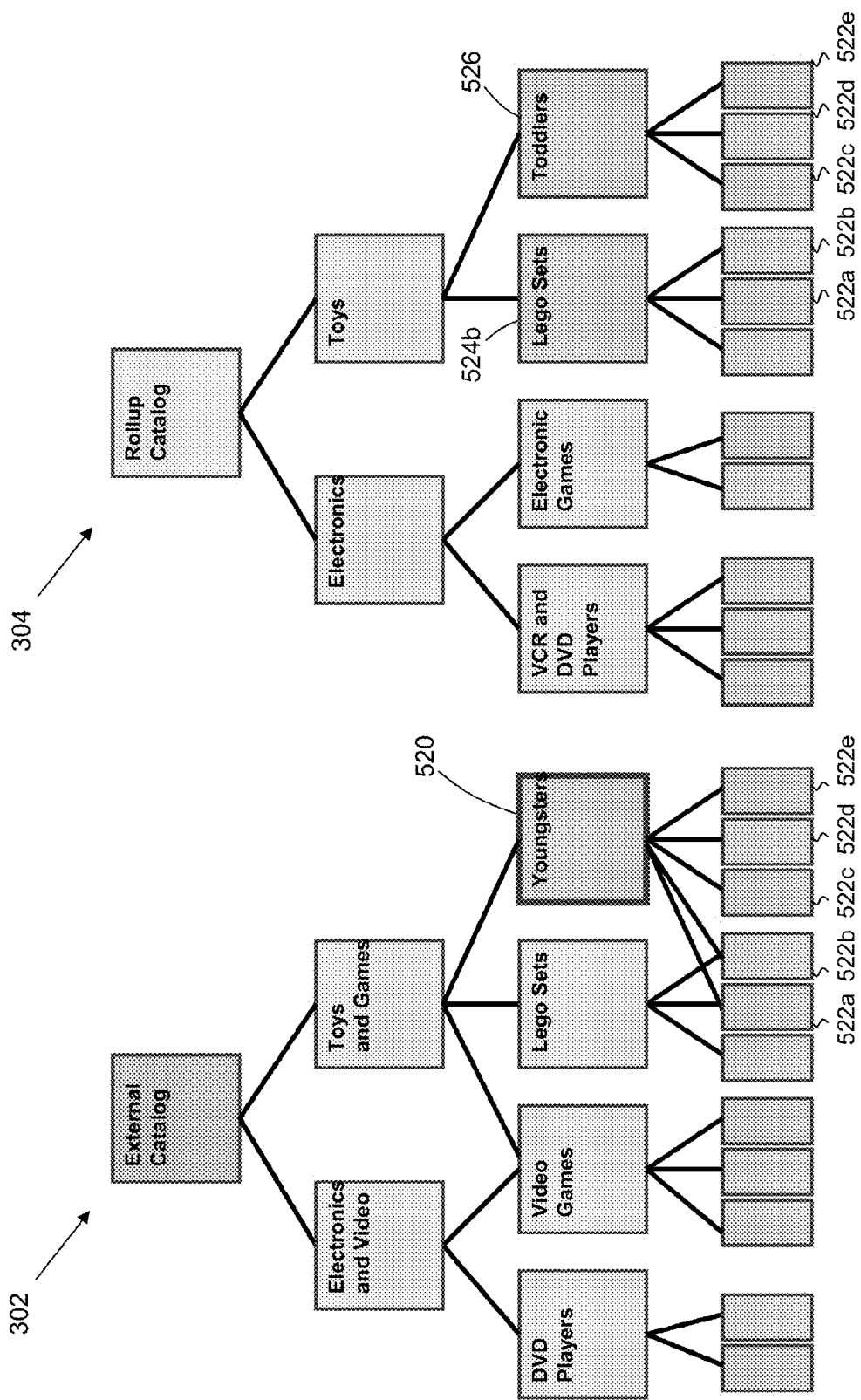

A determination is made whether these same leaf nodes can be found in the target hierarchy 304. As shown in FIG. 7C, the leaf nodes 522*a*, 522*b*, 522*c*, 522*d*, and 522*e* can also be found in the target hierarchy 304. Here, it can be seen that these leaf nodes 522*a*, 522*b*, 522*c*, 522*d*, and 522*e* are not all contained within a single product group at the target hierarchy 304. Instead, as shown in FIG. 7D, these leaf nodes 522*a*, 522*b*, 522*c*, 522*d*, and 522*e* are shared between the "Lego Sets" product group (node 524*b*) and the "Toddlers" product group (nodes 526) at the target hierarchy 304.

Figure 7E:
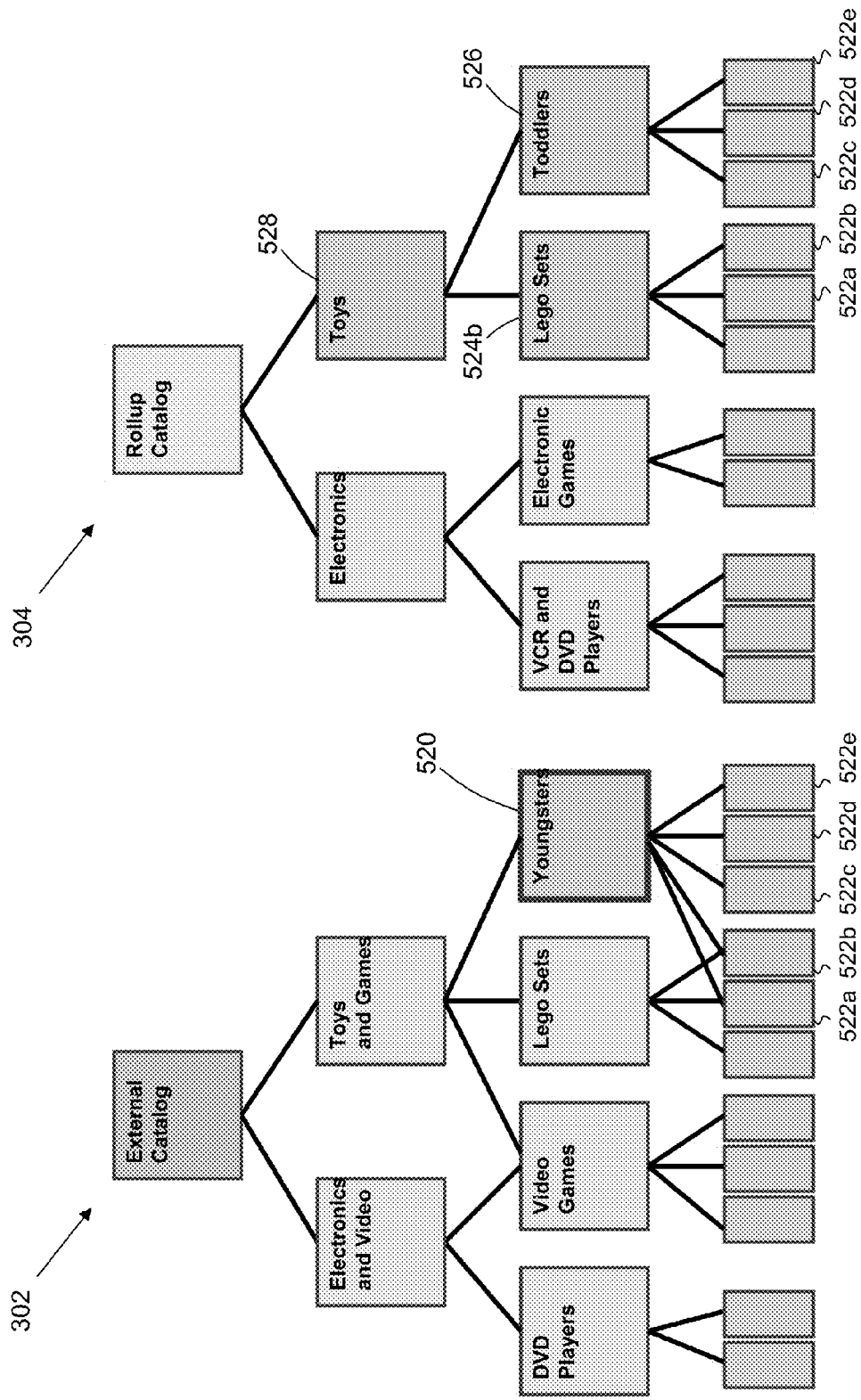

The next action is to identify the lowest common ancestor for the "Lego Sets" product group (node 524*b*) and the "Toddlers" product group (nodes 526) at the target hierarchy 304. As shown in FIG. 7E, the lowest common ancestor can be identified as node 528 corresponding to the "Toys" product group in the target hierarchy 304.

Figure 7F:
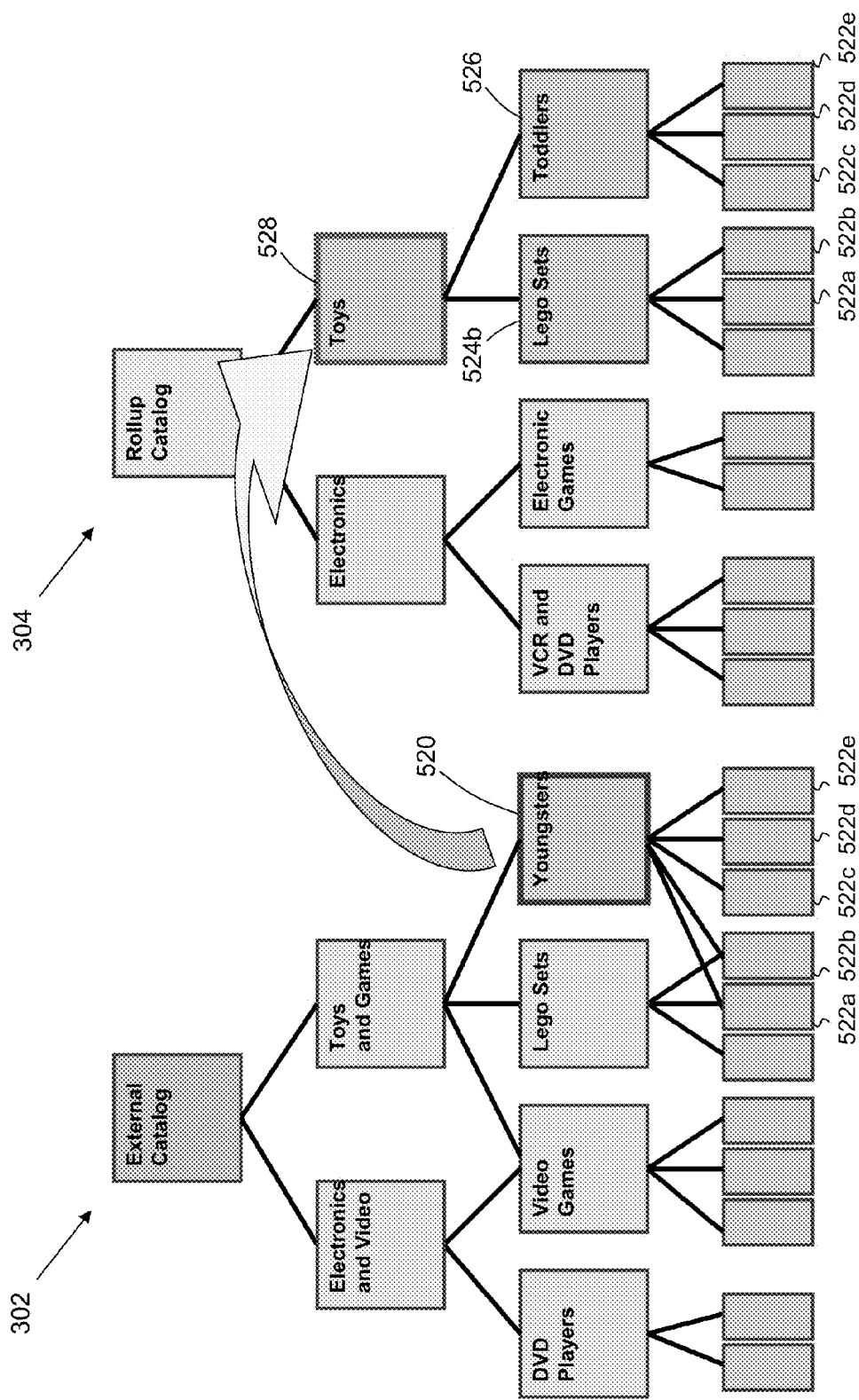

Therefore, as shown in FIG. 7F, a mapping can be performed to map the "Youngsters" product group (node 520) in the source hierarchy 302 to the "Toys" product group (node 528) in the target hierarchy 304. This mapping is performed even though the same product group does not exist in both catalogs and the products in the source product group are shared among multiple product groups.

Figure 8:
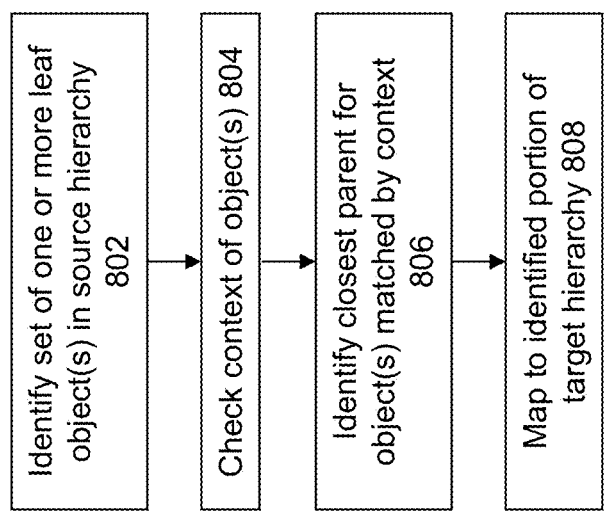
FIG. 8 shows a more detailed flowchart of the "Match By Approximation" approach.

FIG. 8 shows a more detailed flowchart of the "Match By Approximation" approach. This approach performs matching by context to infer the best mapping solution for the different hierarchies. At 802, identification is made of a set of one or more leaf objects in the source hierarchy that needs to be mapped to the target hierarchy As previously noted, this approach is performed if the exact same content does not exist within both of the two hierarchies. Since the exact same content is not shared, the present approach performs analysis to approximate the sample product group with some other, closely related set of objects in the target hierarchy. To perform this approximation, the context of the objects is analyzed. Therefore, at 804, a determination is made of the context for the set of leaf objects that exists in the source hierarchy.

At 806, identification is made of the closest parent of the source object in a context of the given hierarchy, which can be matched by context to the target hierarchy. The approximation is performed by identifying closely related sets of objects in the target hierarchy that correspond to the objects in the source hierarchy. Once the approximation has been analyzed, mapping can be performed at 808 to the identified portions of the target hierarchy. This mapping action can be implemented by returning the path and identifier of the product group that is estimated to be the best match for the source product group.

Figure 9A:
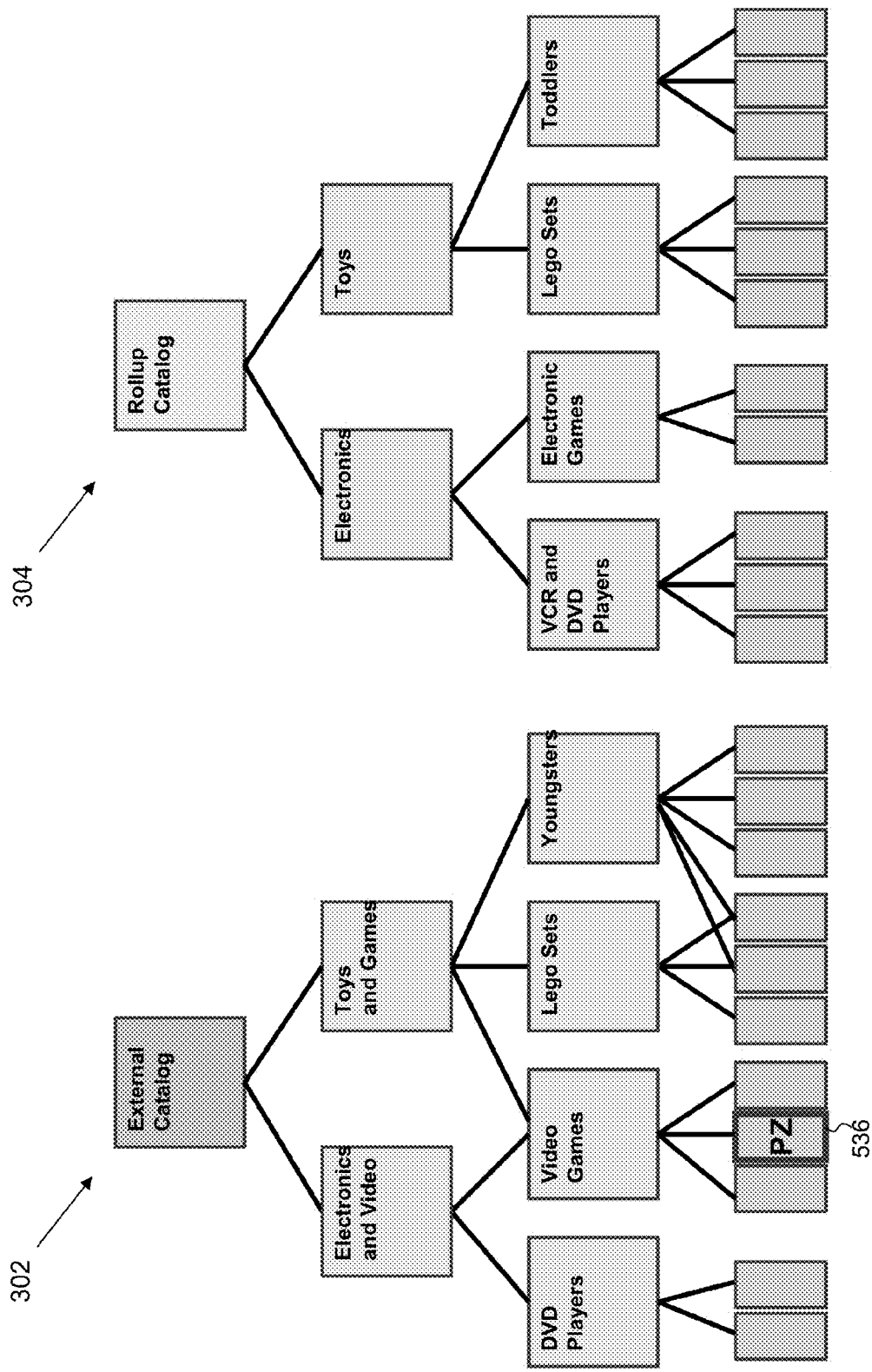
Figure 9C:
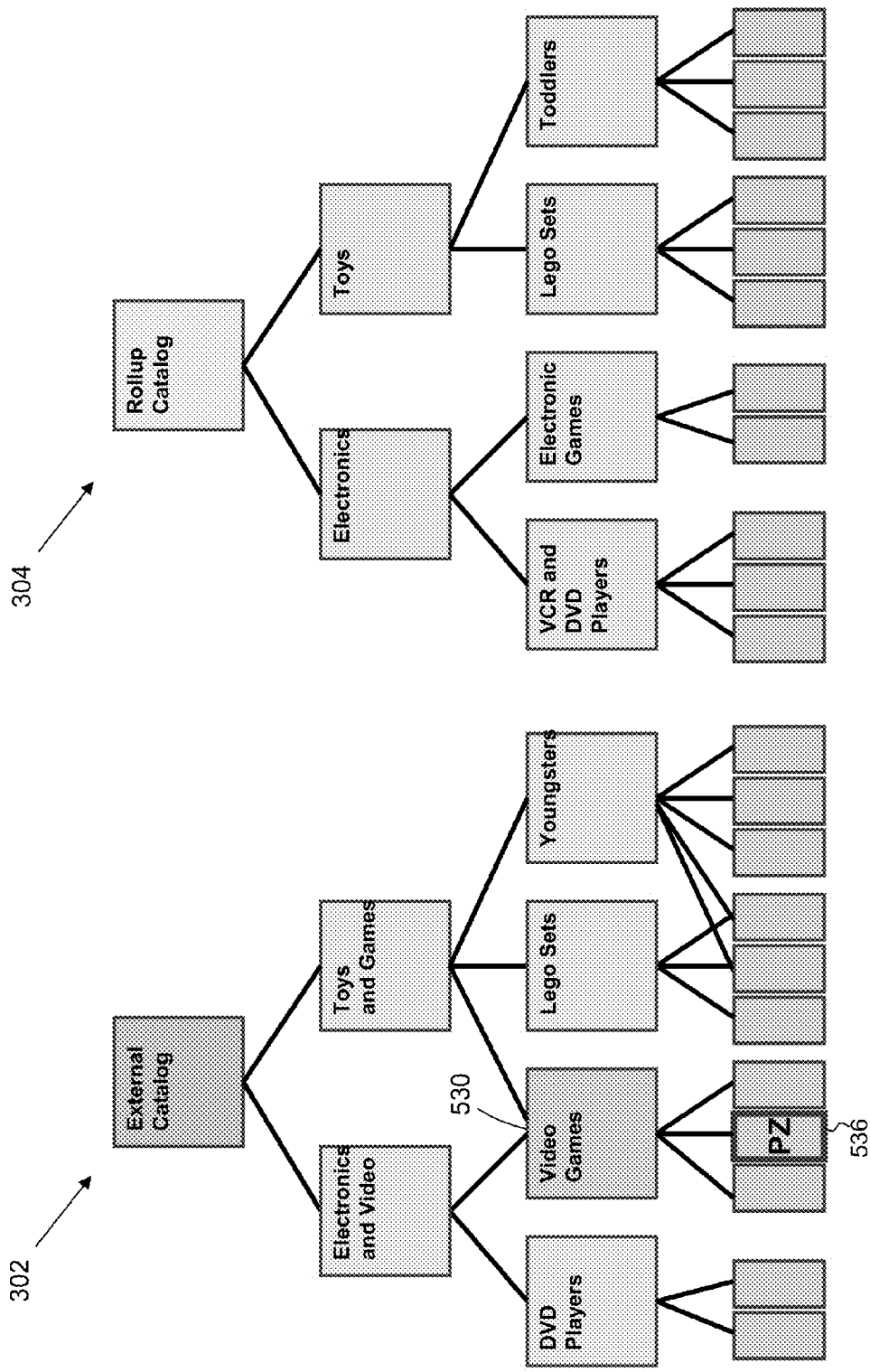
Figure 9D:
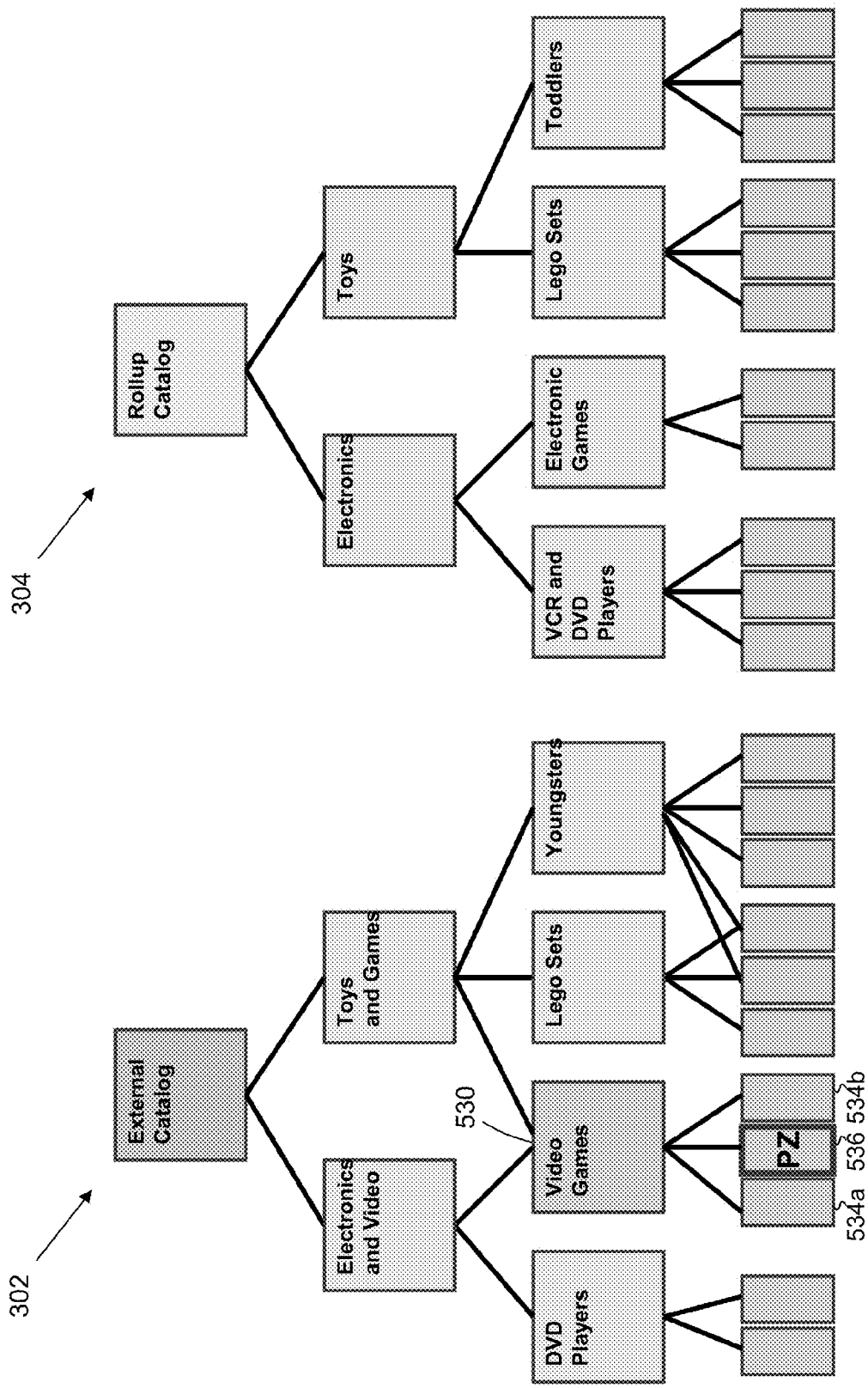

FIGS. 9A-G illustrate a scenario where the "Match By Approximation" approach is employed to address the situation where a specific product exists in the external catalog 302 but does not does not exist in the rollup catalog 304. As shown in FIG. 9A, a product PZ (at node 536) exists in the source hierarchy 302 of the external catalog. For purposes of this example, it is assumed that this product PZ does not exist in the target hierarchy 304 of the external rollup catalog, as illustrated in FIG. 9B.

To address this situation, the context of product PZ is analyzed to implement the "Match By Approximation" approach. Here, it can be seen in FIG. 9C that the node 536 that corresponds to product PZ corresponds to the "Video Games" product group at node 530 of hierarchy 302. As highlighted in FIG. 9D, the other leaf nodes that correspond to the "Video Games" product group are nodes 534*a* and 534*b*. One can infer that a contextual significance exists in this situation, given the close structural relationship between node 536 for product PZ and nodes 534*a* and 534*b* in hierarchy 302, since all of these nodes reside within the context of being common leaf nodes from node 530 for the "Video Games" product group. As such, one can infer that the contextual presence of these related nodes 534*a* and 534*b* in the target hierarchy 304 could provide an approximation of the correct mapping for related node 536 in the target hierarchy 304.

Figure 9E:
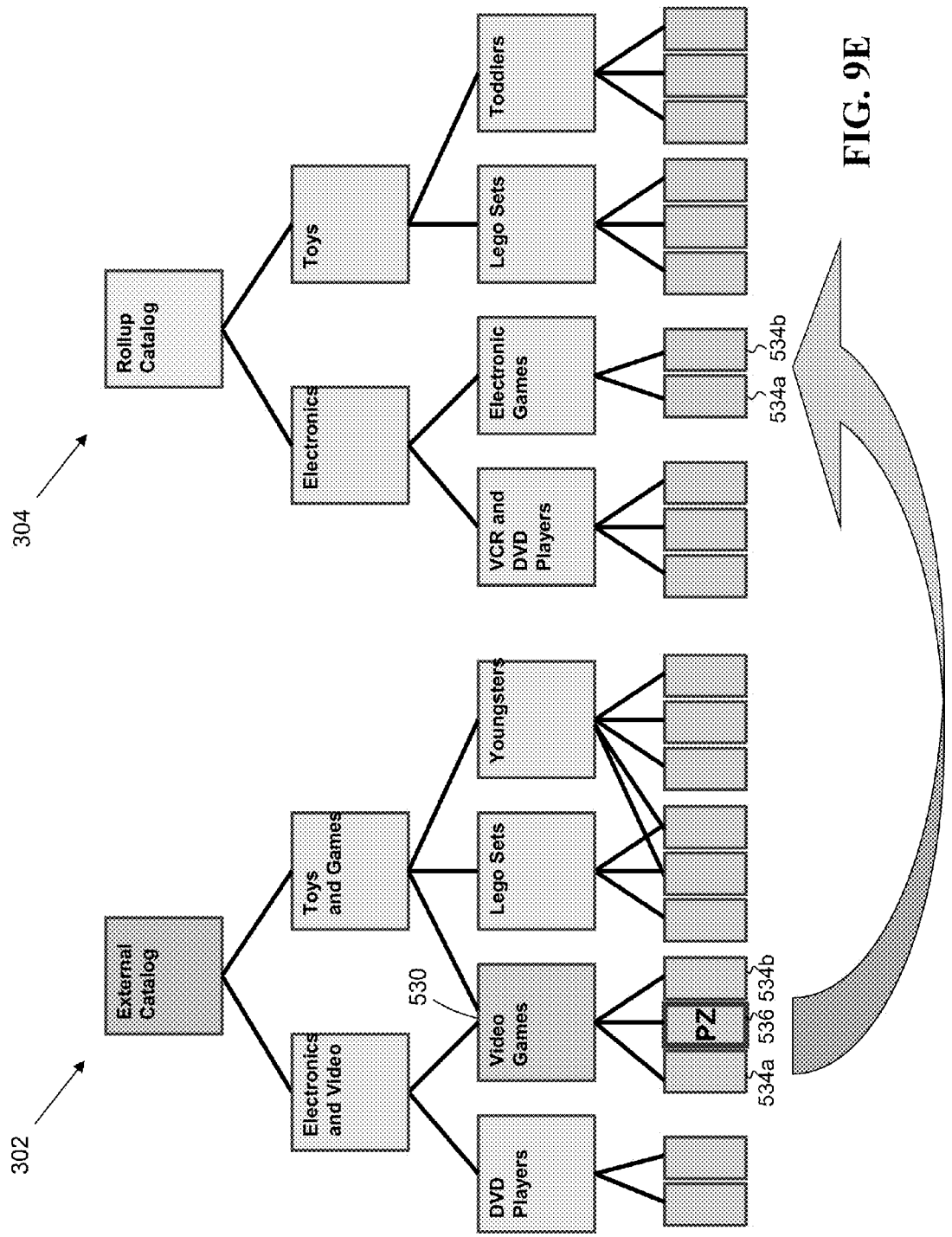

Therefore, an attempt is made to identify related nodes 534*a* and 534*b* in the target hierarchy. As shown in FIG. 9E, nodes 534*a* and 534*b* do indeed exist in the target hierarchy 304.

Figure 9F:
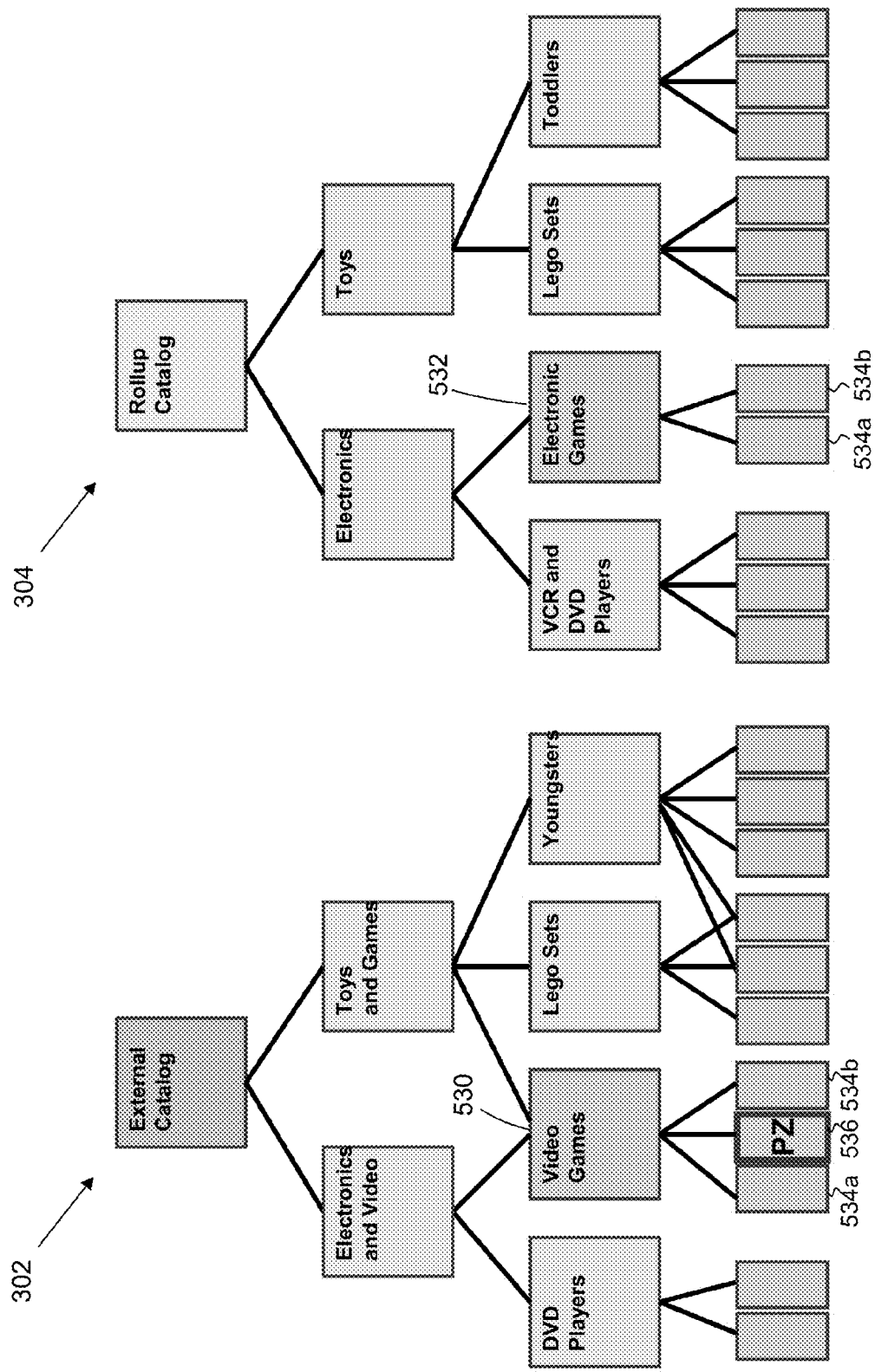

Next, an attempt is made to identify the closest parent of the related objects in a context of the target hierarchy 304. As shown in FIG. 9F, the closest parent is node 532 corresponding to the "Electronic Games" product group.

Figure 9G:
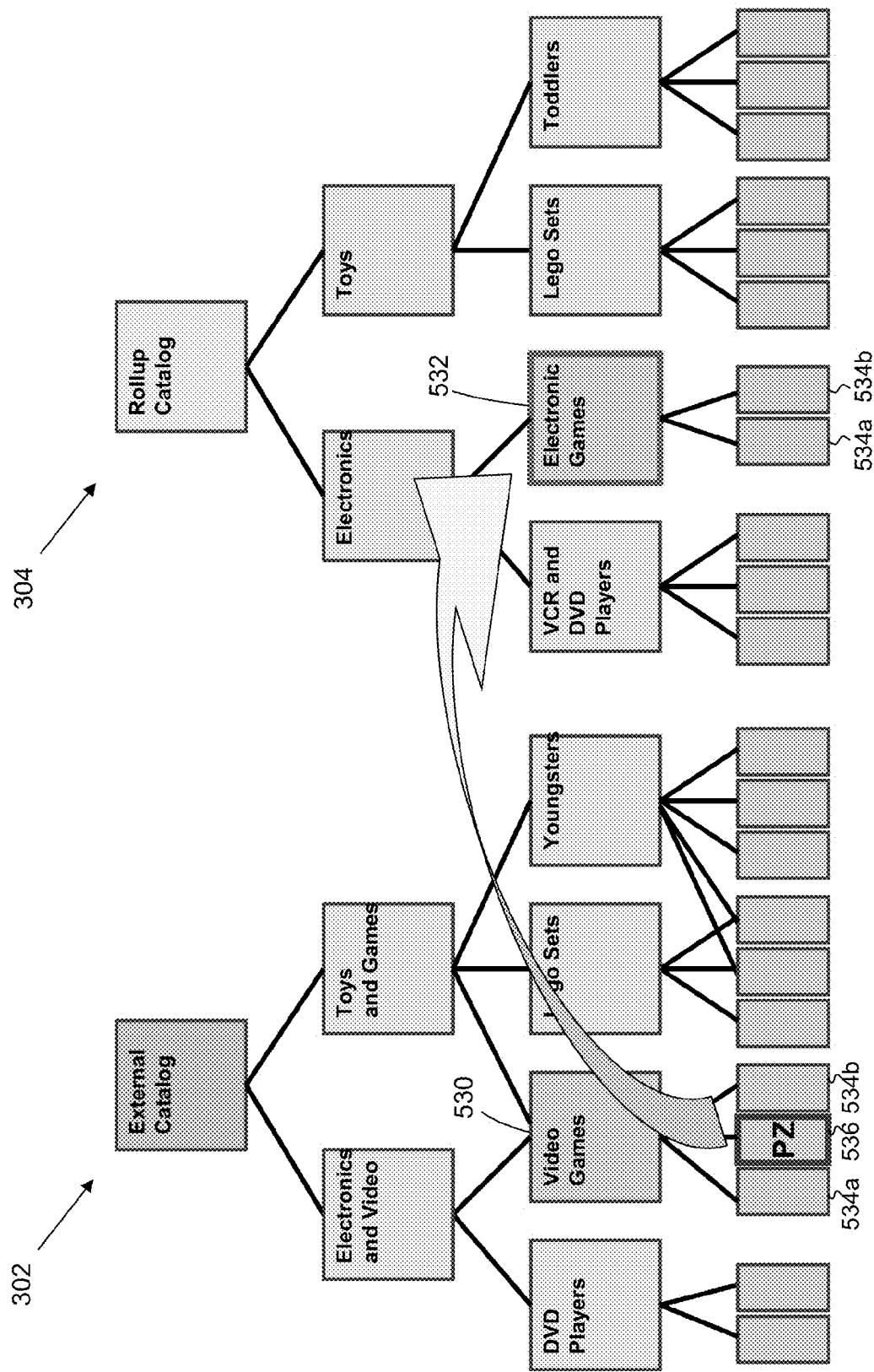

Therefore, as shown FIG. 9G, the product PZ in source hierarchy 302 can be mapped to the "Electronic Games" product group in target hierarchy 304. This mapping can be implemented despite the fact that product PZ does not actually exist anywhere in the target hierarchy 304.

Figure 10A:
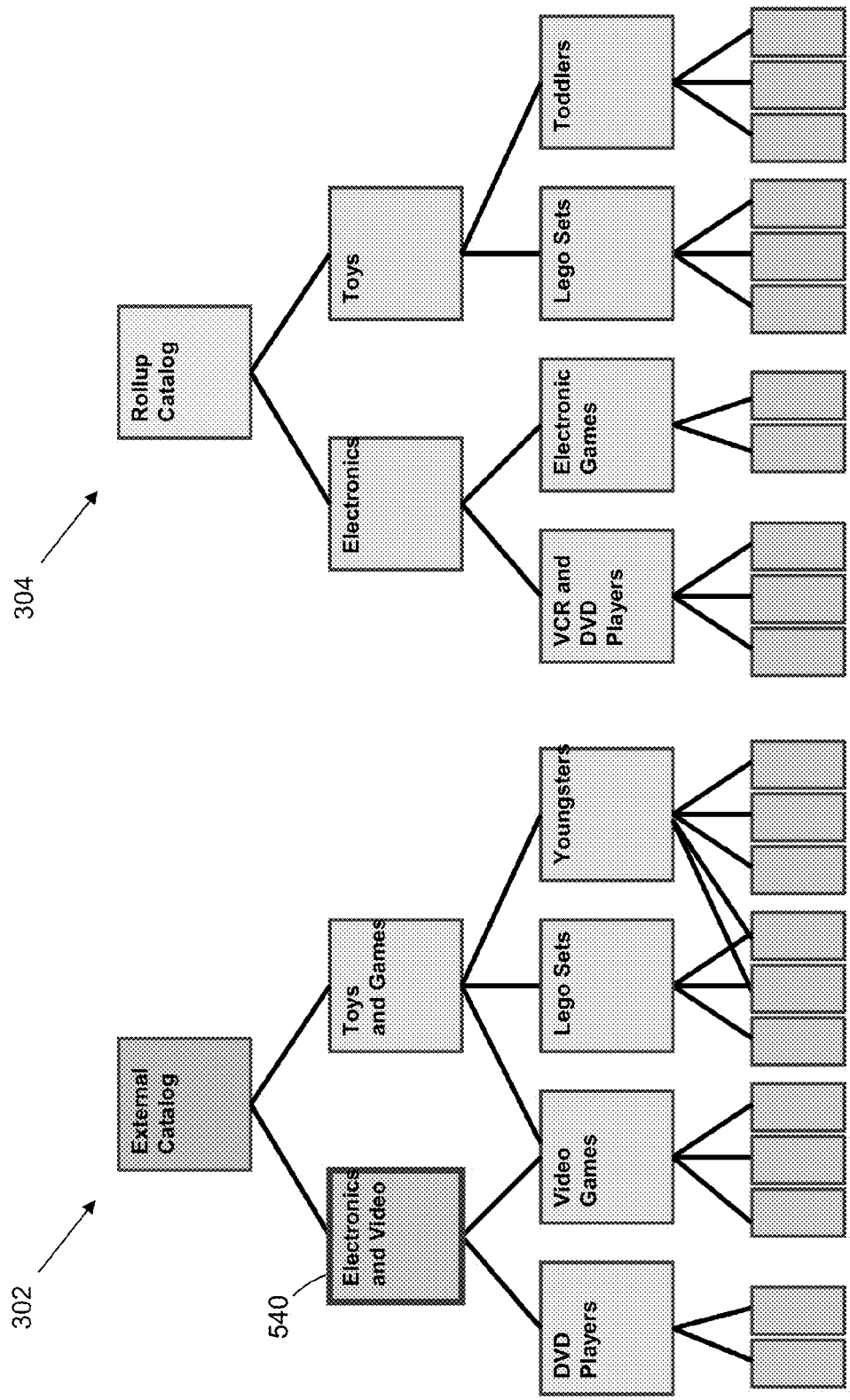
FIGS. 10A-G illustrate a scenario where the "Match By Approximation" approach is employed.

FIGS. 10A-G illustrate a scenario where the "Match By Approximation" approach is employed to address the situation where a specific product group exists in the source hierarchy 302 but does not does not exist in the target hierarchy 304. As shown in FIG. 10A, the "Electronics and Video" product group exists in the source hierarchy (at node 540). However, for purposes of this example, it is assumed that this "Electronics and Video" product group does not exist in the target hierarchy 304.

Figure 10B:
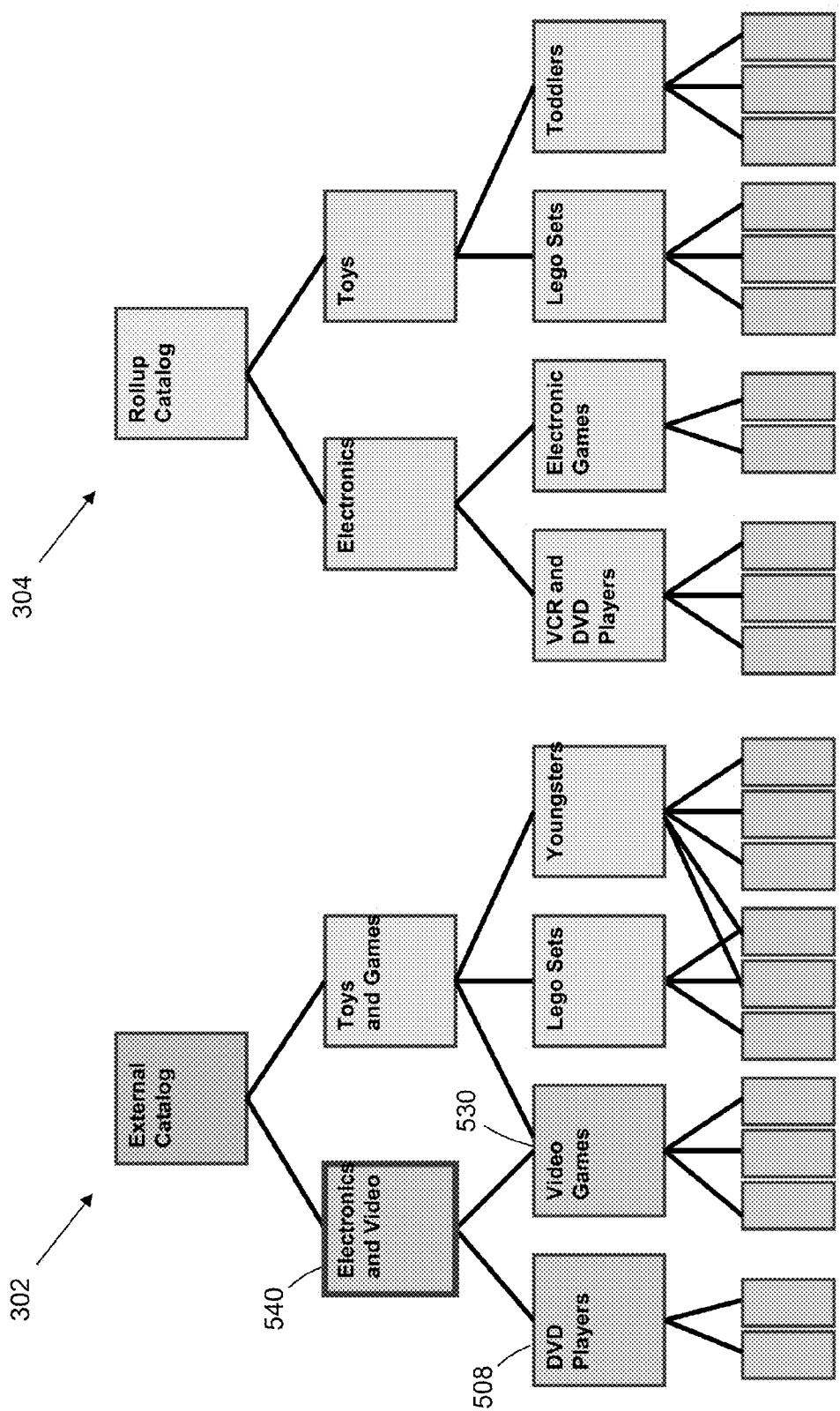

To address this situation, the "Electronics and Video" product group is analyzed to determine its contextual significance in the source hierarchy 302. As shown in FIG. 10B, an analysis confirms that the "Electronics and Video" product group at node 540 corresponds to two descendent nodes for lower hierarchical product groups, including the "DVD Players" product group at node 508 and the "Video games" product group at node 530.

Figure 10C:
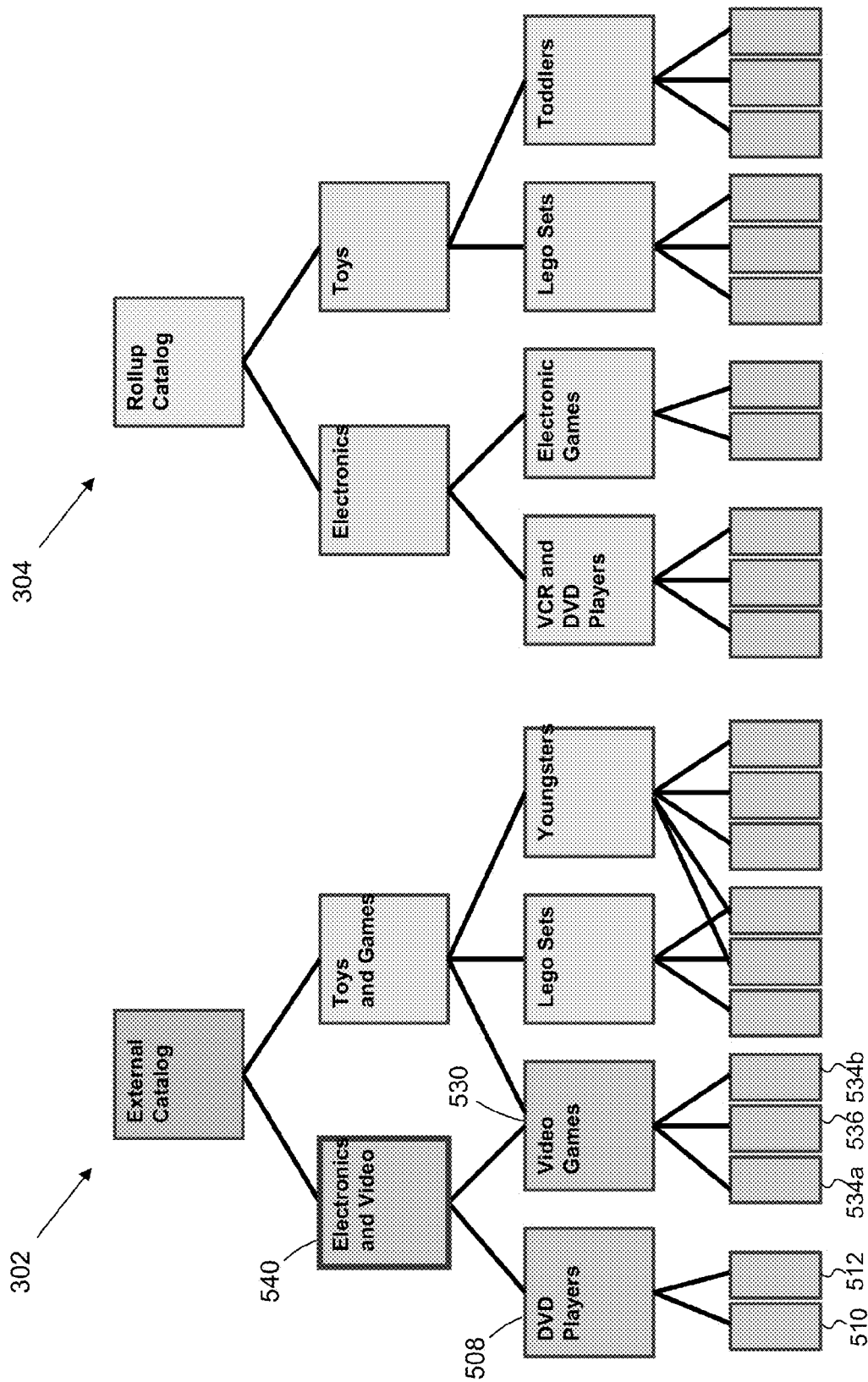

Carrying this analysis further, it can be seen that these child nodes 508 and 530 from parent node 540 also correspond to a number of leaf nodes for specific products. As indicated in FIG. 10C, node 508 corresponds to leaf nodes 510 and 512, while node 530 corresponds to leaf nodes 534*a*, 536, and 534*b*.

From this analysis, it can be seen that leaf nodes 510, 512, 534*a*, 536, and 534*b* are all hierarchically considered as descendent nodes to the node 540 corresponding to the "Electronics and Video" product group. As such, one should be able to infer a contextual significance for the "Electronics and Video" product group to the extent that these same leaf nodes exist in the target hierarchy 304.

Figure 10D:
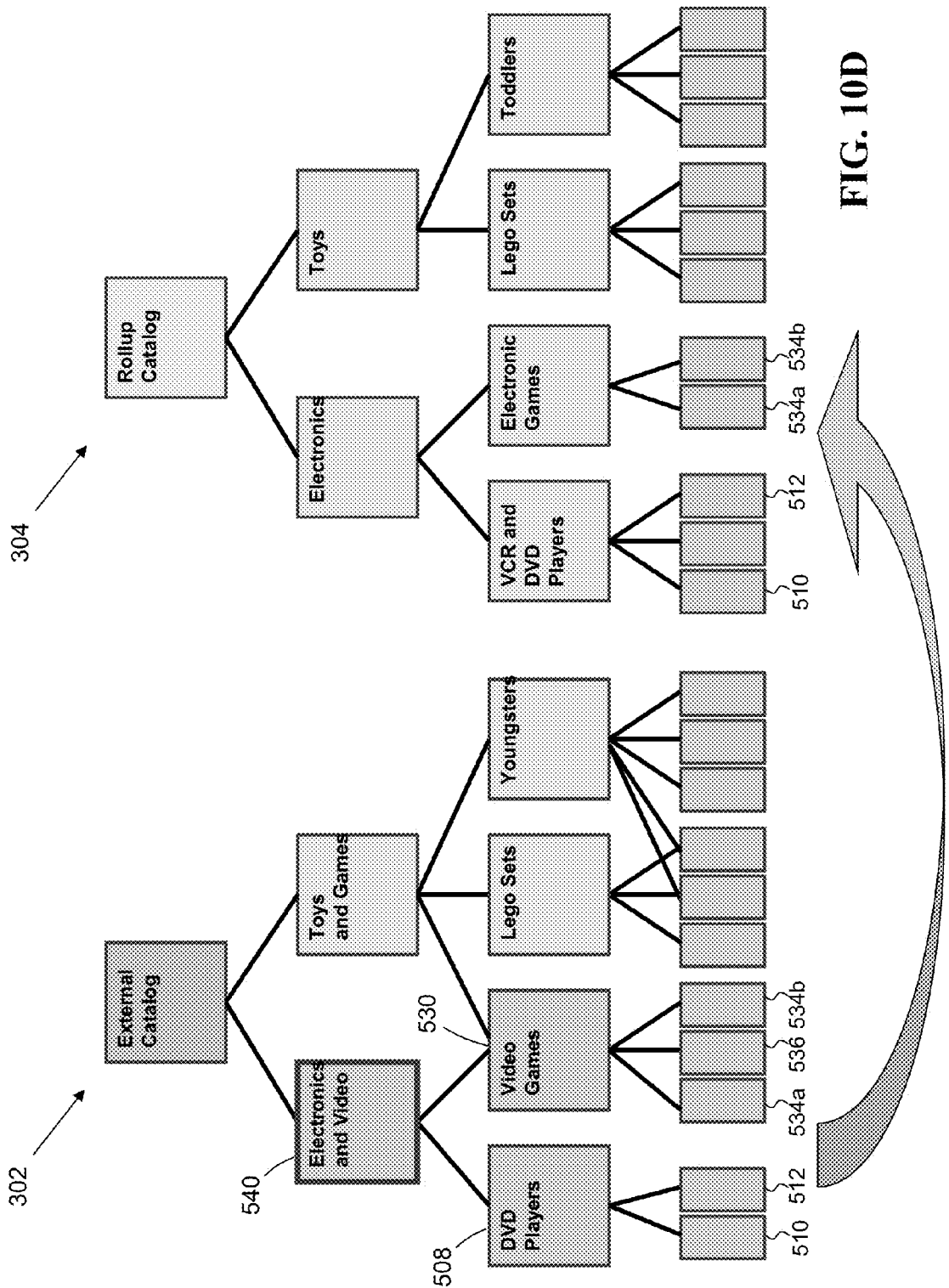

Therefore, an attempt is made to identify leaf nodes 510, 512, 534*a*, 536, and 534*b* in the target hierarchy 304. As shown in FIG. 10D, many of the leaf nodes 510, 512, 534a, 536, and 534b do exist in the target hierarchy 304. Specifically, leaf nodes 510, 512, 534a, and 534b also appear in the target hierarchy 304. It is noted that leaf node 536 does not exist in the target hierarchy 304.

Figure 10E:
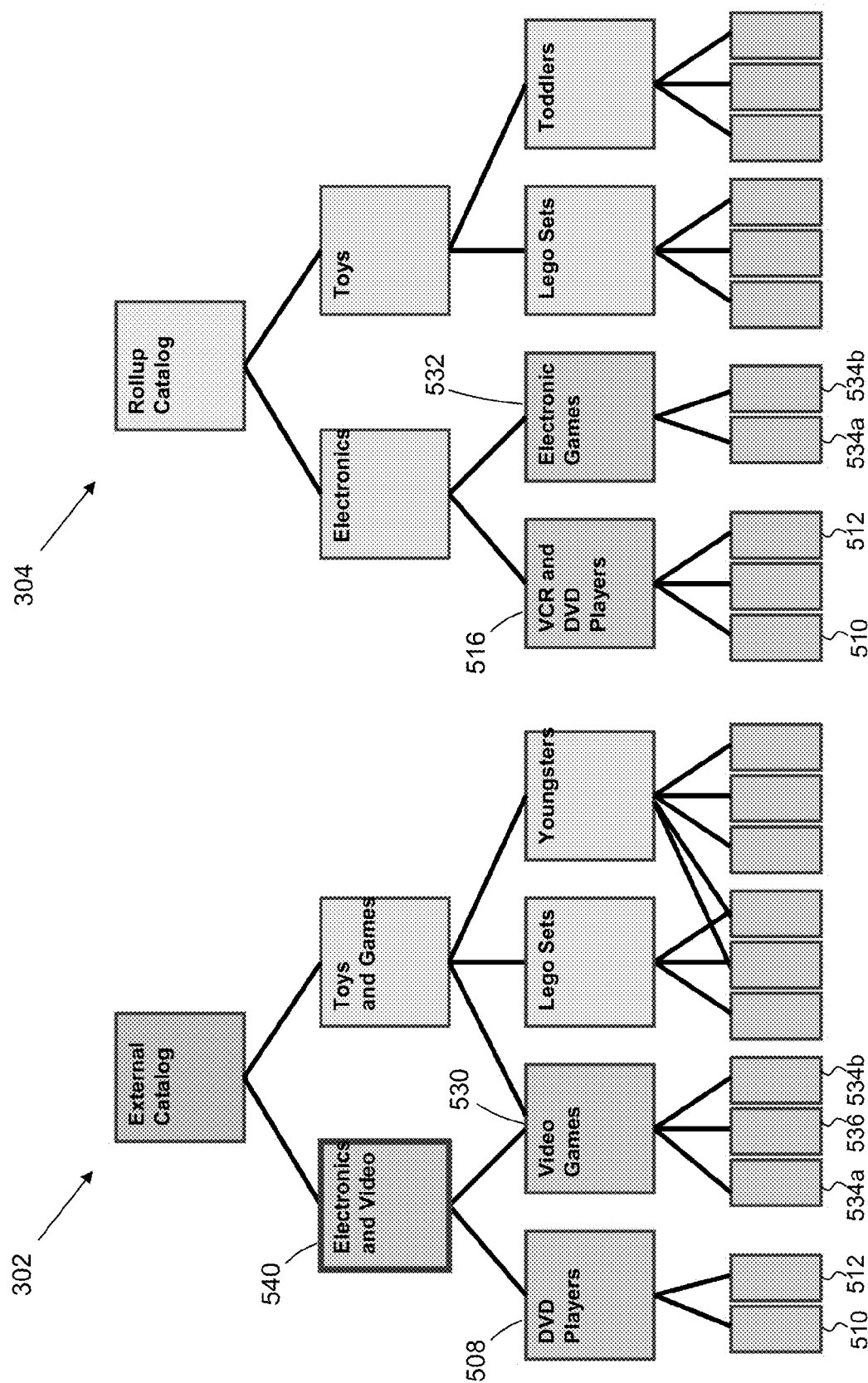

Next, an attempt is made to identify the closest common parent of the related objects in a context of the target hierarchy 304. As shown in FIG. 10E, two of the leaf nodes (nodes 510 and 512) correspond to the node 516 for the "VCR and DVD Players" product group. The other two leaf nodes (nodes 534a, and 534b) correspond to node 532 for the "Electronic Games" product group.

Figure 10F:
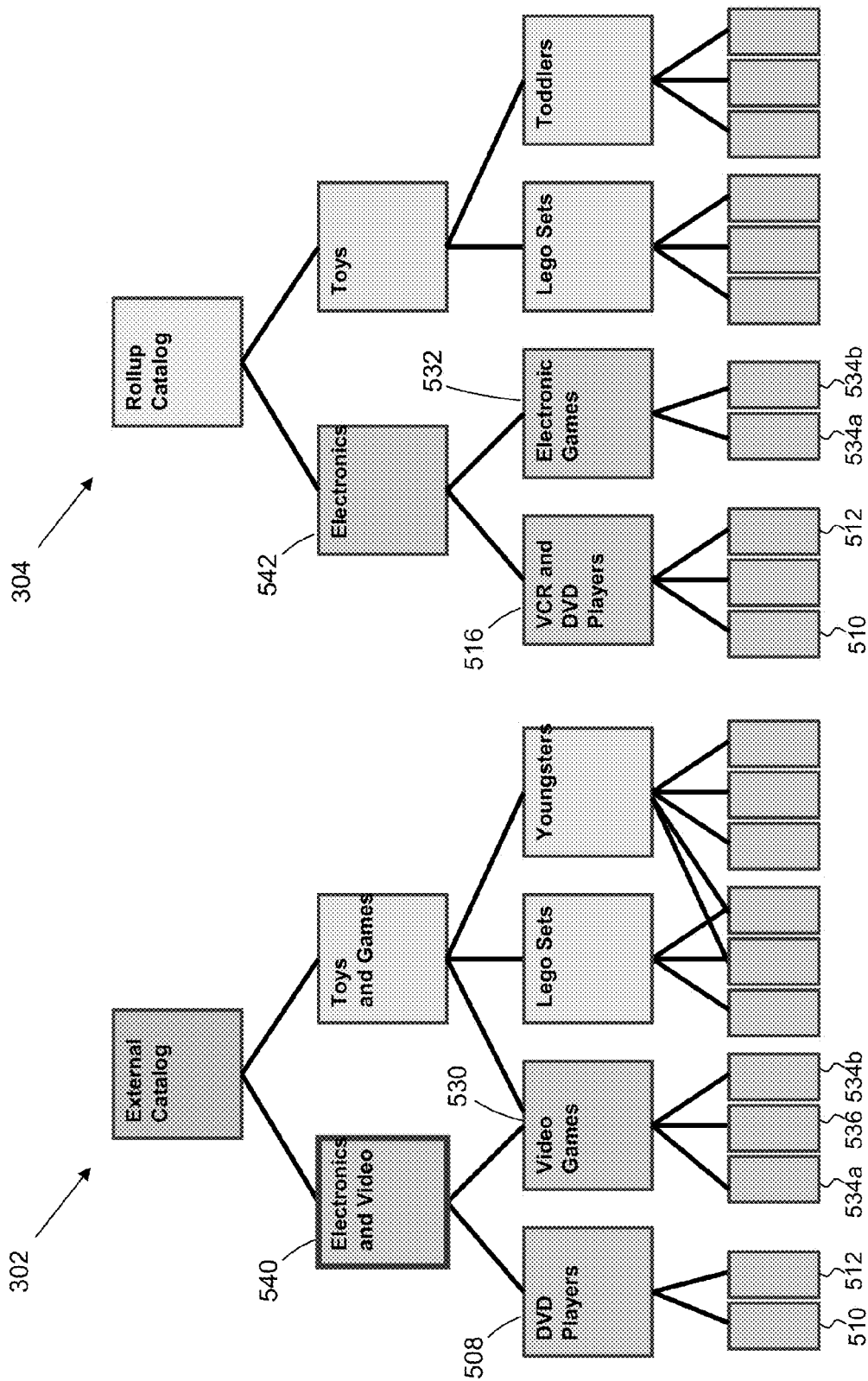
Figure 10G:
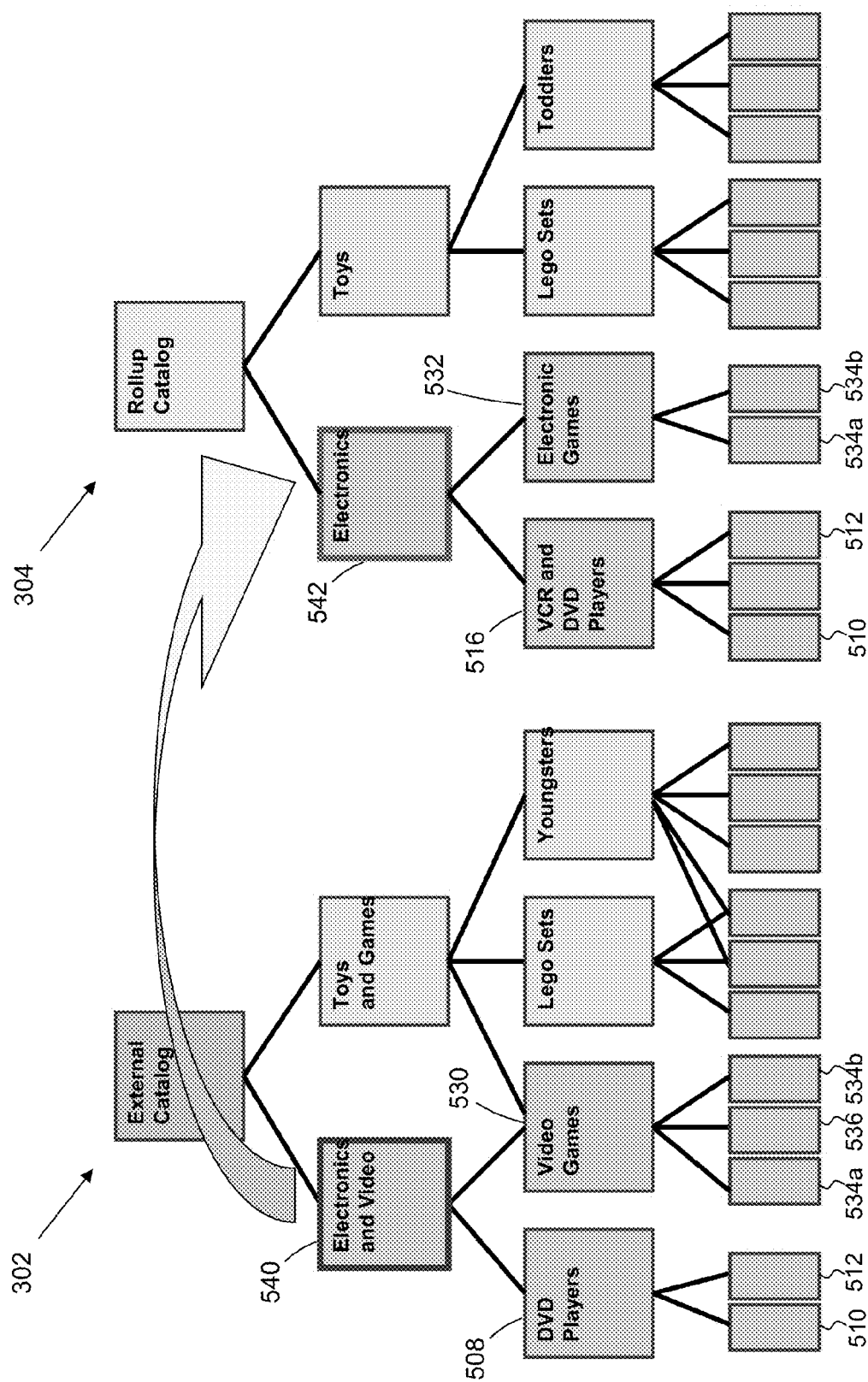

Since this analysis has not yet found a common parent for the objects, the analysis continues upwards through the hierarchy 304. As shown in FIG. 10F, a common parent node 542 can been found for node 516 ("VCR and DVD Players" product group) and node 532 ("Electronic Games" product group).

Here, the common parent node 542 corresponds to the "Electronics" product group. Therefore, as shown FIG. 10G, the "Electronics and Video" product group in source hierarchy 302 can be mapped to the "Electronics" product group in target hierarchy 304. This mapping can be implemented despite the fact that the "Electronics and Video" product group does not actually exist anywhere in the target hierarchy 304.

Figure 11A:
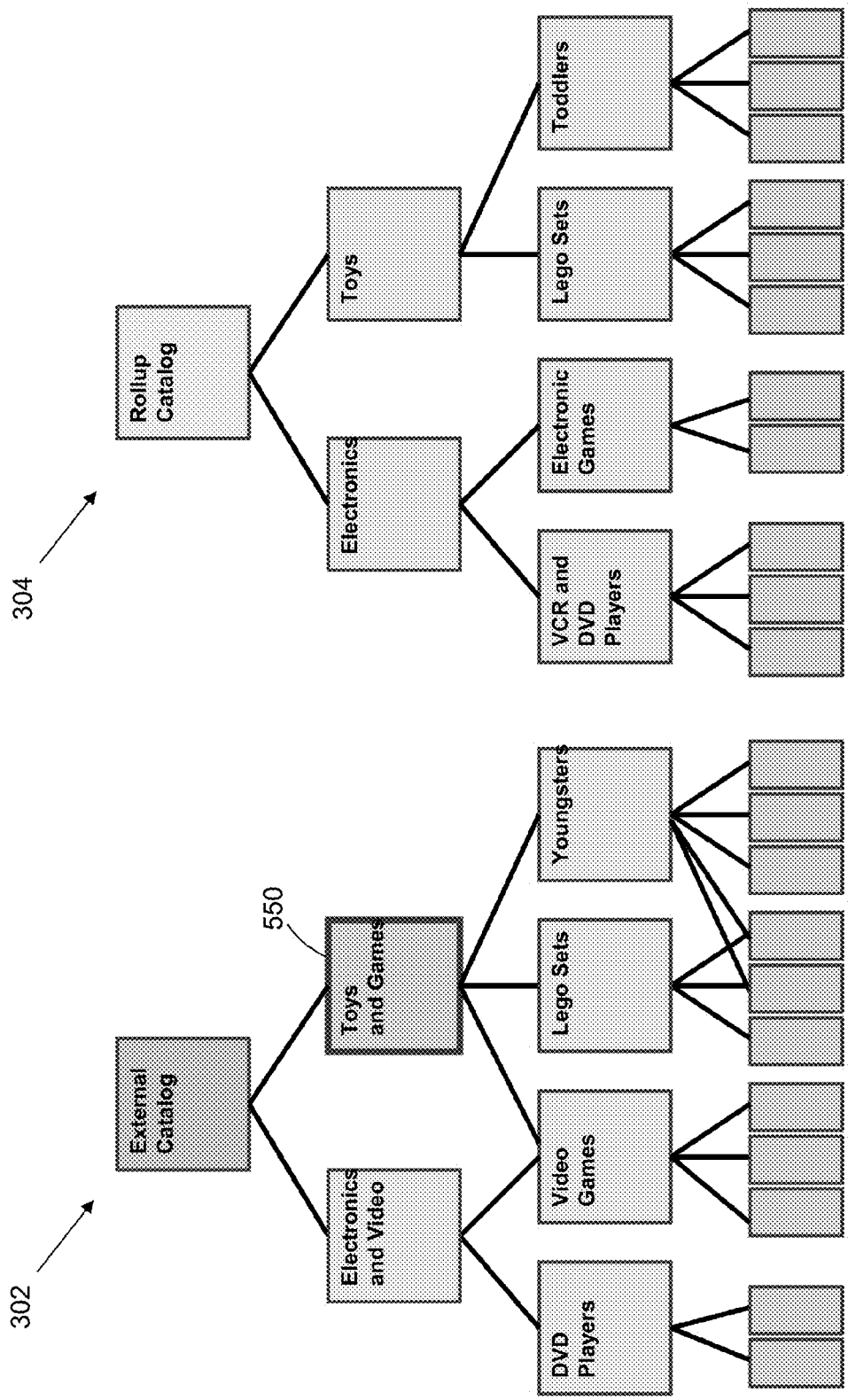
FIGS. 11A-H illustrate another example scenario where a specific product group exists in the source hierarchy but does not does not exist in the target hierarchy.

FIGS. 11A-H illustrate another example scenario where a specific product group exists in the source hierarchy 302 but does not exist in the target hierarchy 304. As shown in FIG. 11A, the "Toys and Games" product group exists in the source hierarchy (at node 550), but this high-level product group does not exist in the target hierarchy 304.

Figure 11B:
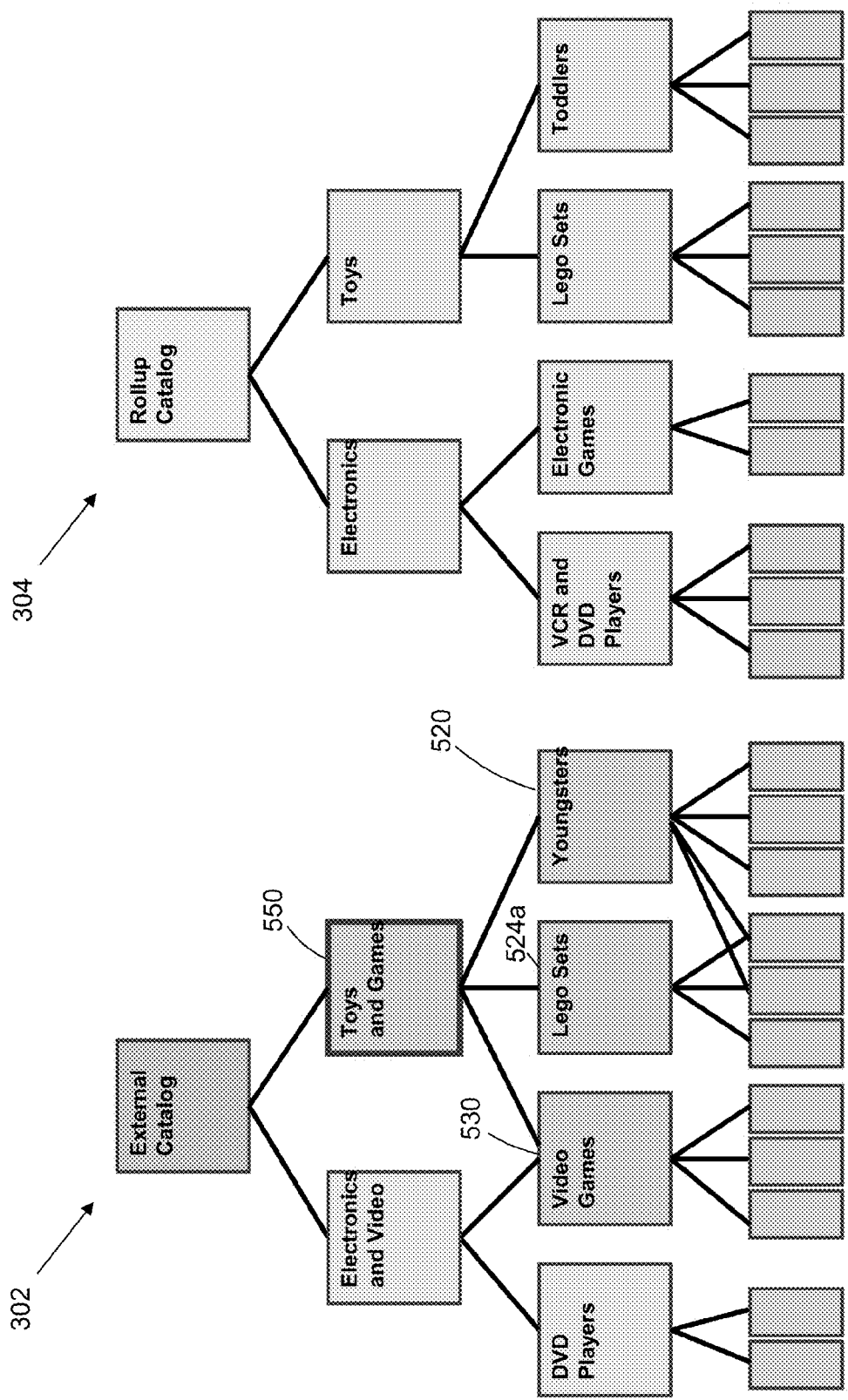

To address this situation, the node 550 corresponding to the "Toys and Games" product group is analyzed to determine its contextual significance in the source hierarchy 302. As shown in FIG. 11B, analysis is performed to identify its descendent nodes in hierarchy 302. Here, it can be seen that node 530 ("Video Games" product group), node 524 ("Lego Sets" product group), and node 520 ("Youngsters" product group) are all descendent nodes.

Figure 11C:
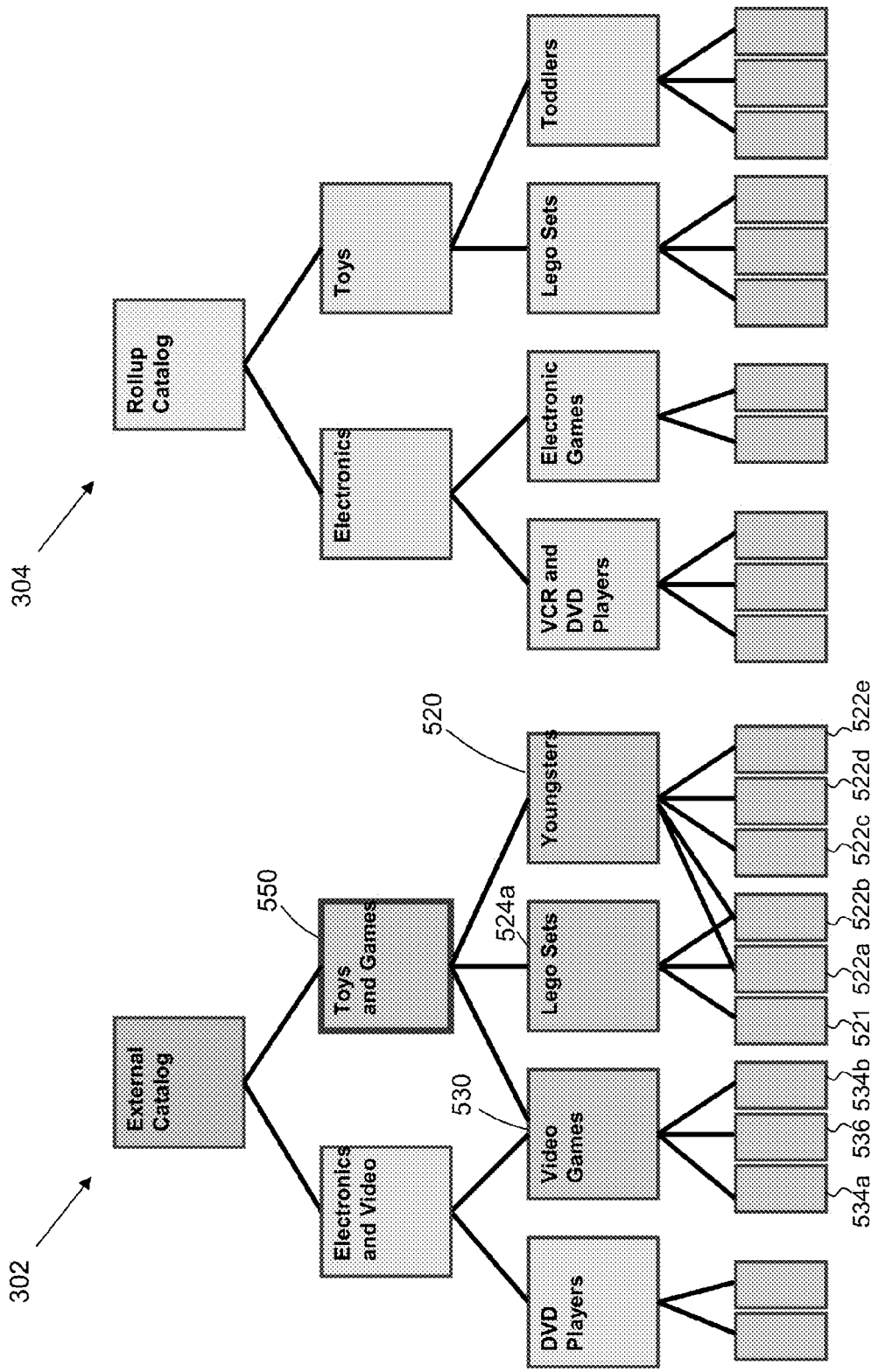

Carrying this analysis further, it can be seen that these descendent nodes 530, 524, and 520 from ancestor node 540 also correspond to a number of leaf nodes for specific products. As indicated in FIG. 11C, node 530 corresponds to leaf nodes 534a, 536, and 534b, while nodes 524 and 520 collectively correspond to leaf nodes 521, 522a-e.

Figure 11D:
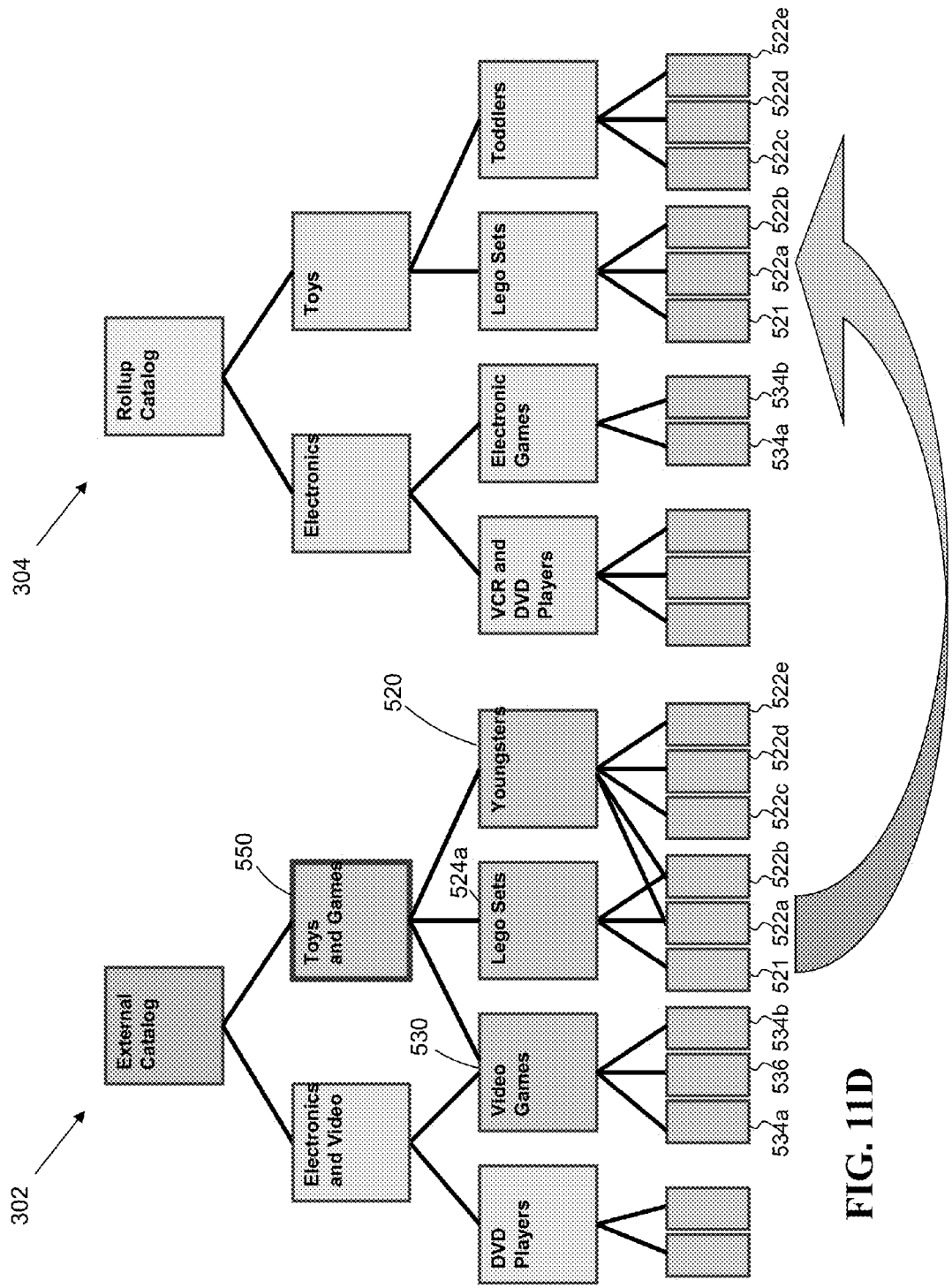

At this point, an attempt is made to identify these leaf nodes 534a, 536, 534b, 521, and 522a-e in the target hierarchy 304. As shown in FIG. 11D, many of these leaf nodes do exist in the target hierarchy 304. Specifically, leaf nodes 534a, 534b, 521, and 522a-e also appear in the target hierarchy 304. It is noted that leaf node 536 does not exist in the target hierarchy 304.

Figure 11E:
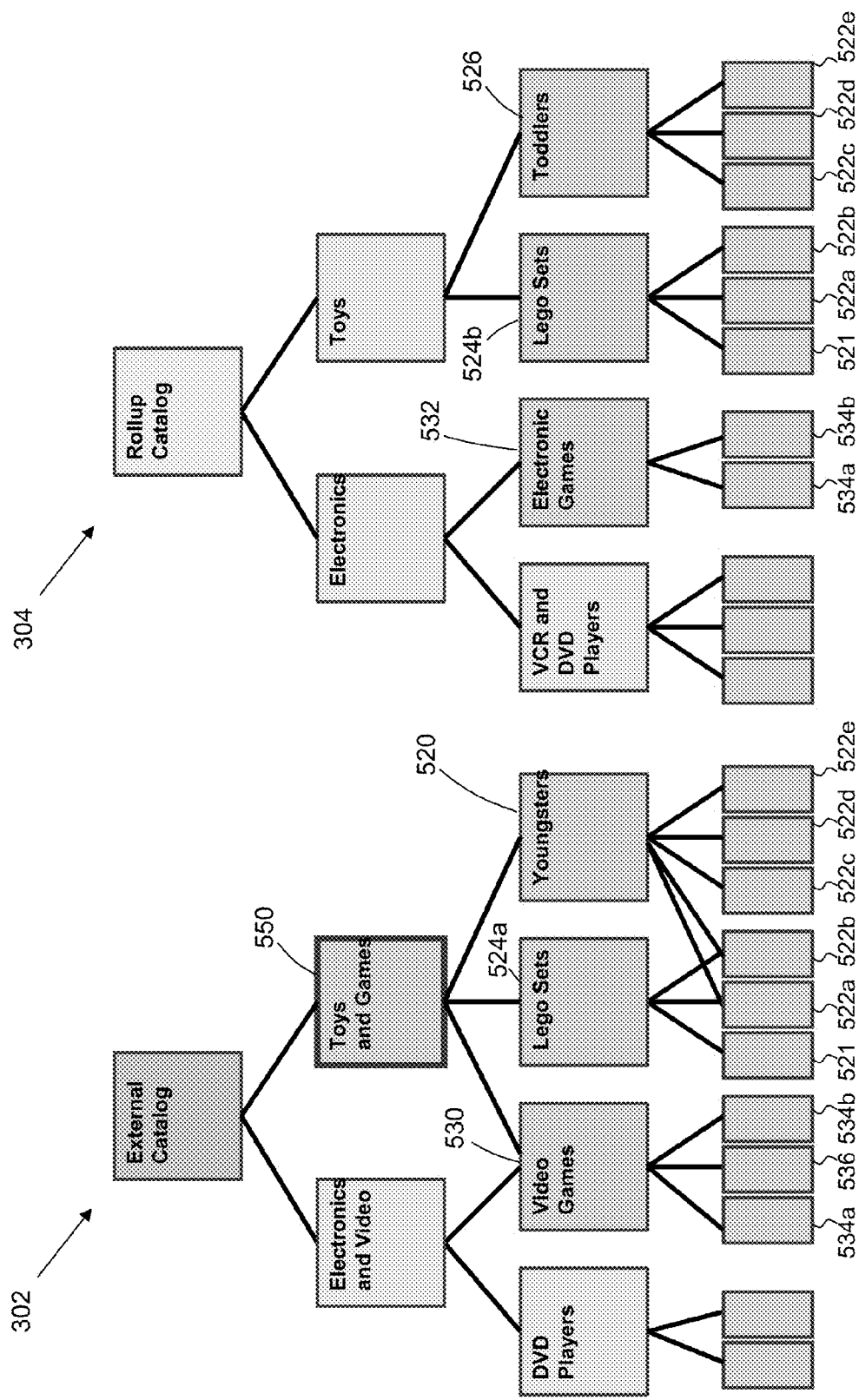

Next, an attempt is made to identify the closest common parent of the related objects in a context of the target hierarchy 304. As shown in FIG. 11E, two of the leaf nodes (nodes 534a, and 534b) correspond to node 532 for the "Electronic Games" product group. Leaf nodes 521, 522a, and 522b correspond to node 524 for the "Lego Sets" product group. Leaf nodes 522c, 5ccd, and 522e correspond to node 526 for the "Toddlers" product group.

Figure 11F:
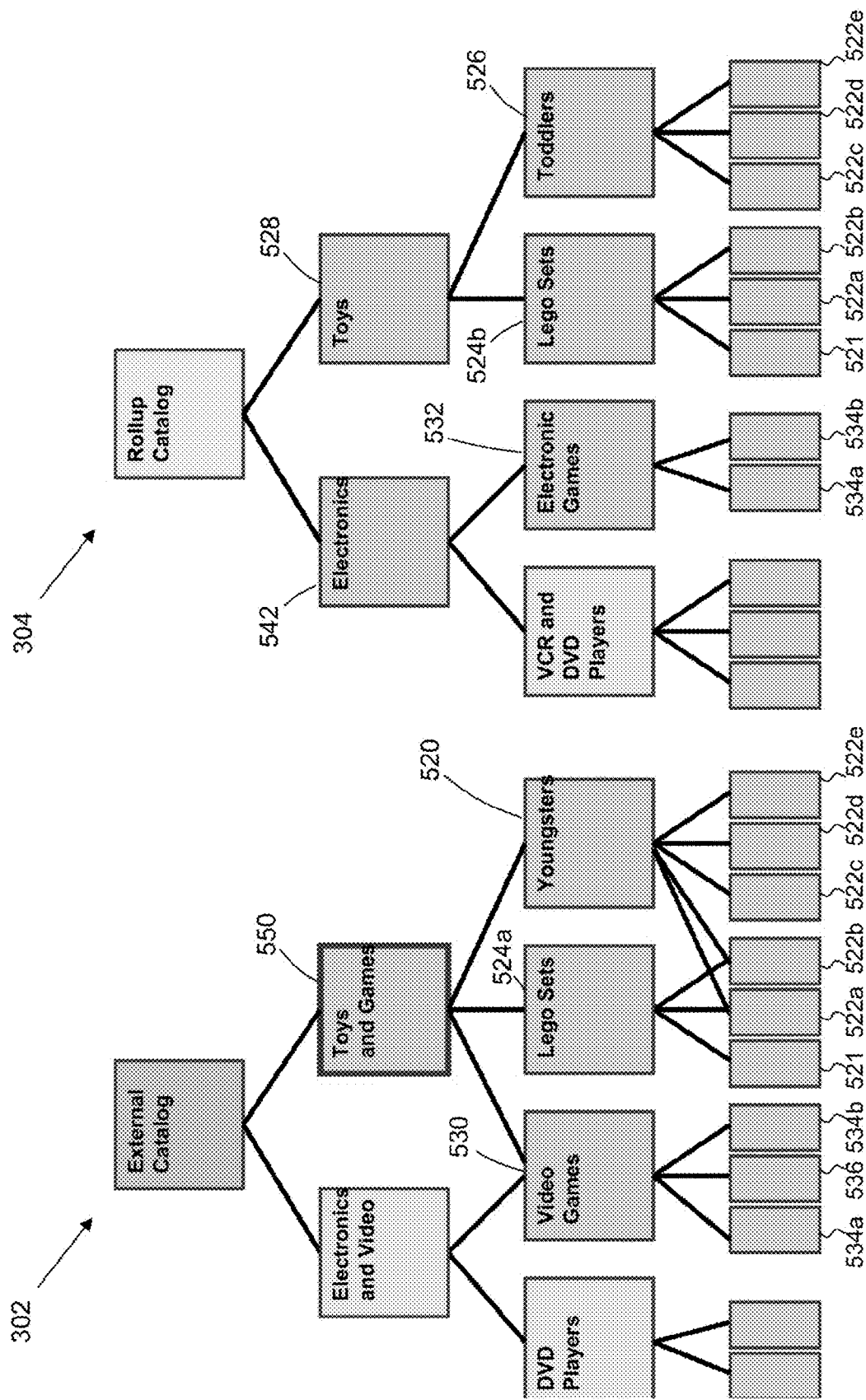

Since this analysis has not yet found a common parent for the objects, the analysis continues upwards through the hierarchy 304. As shown in FIG. 11F, a common parent does exist for two of these nodes. In particular, node 528 (for the "Toys" product group) is the parent to node 524 ("Lego Sets" product group) and node 526 ("Toddlers" product group). However, another parent node 542 ("Electronics" product group) exists relative to the node 532 for the "Electronic Games" product group. Therefore, this level of the analysis has not yet found a common parent node.

Figure 11G:
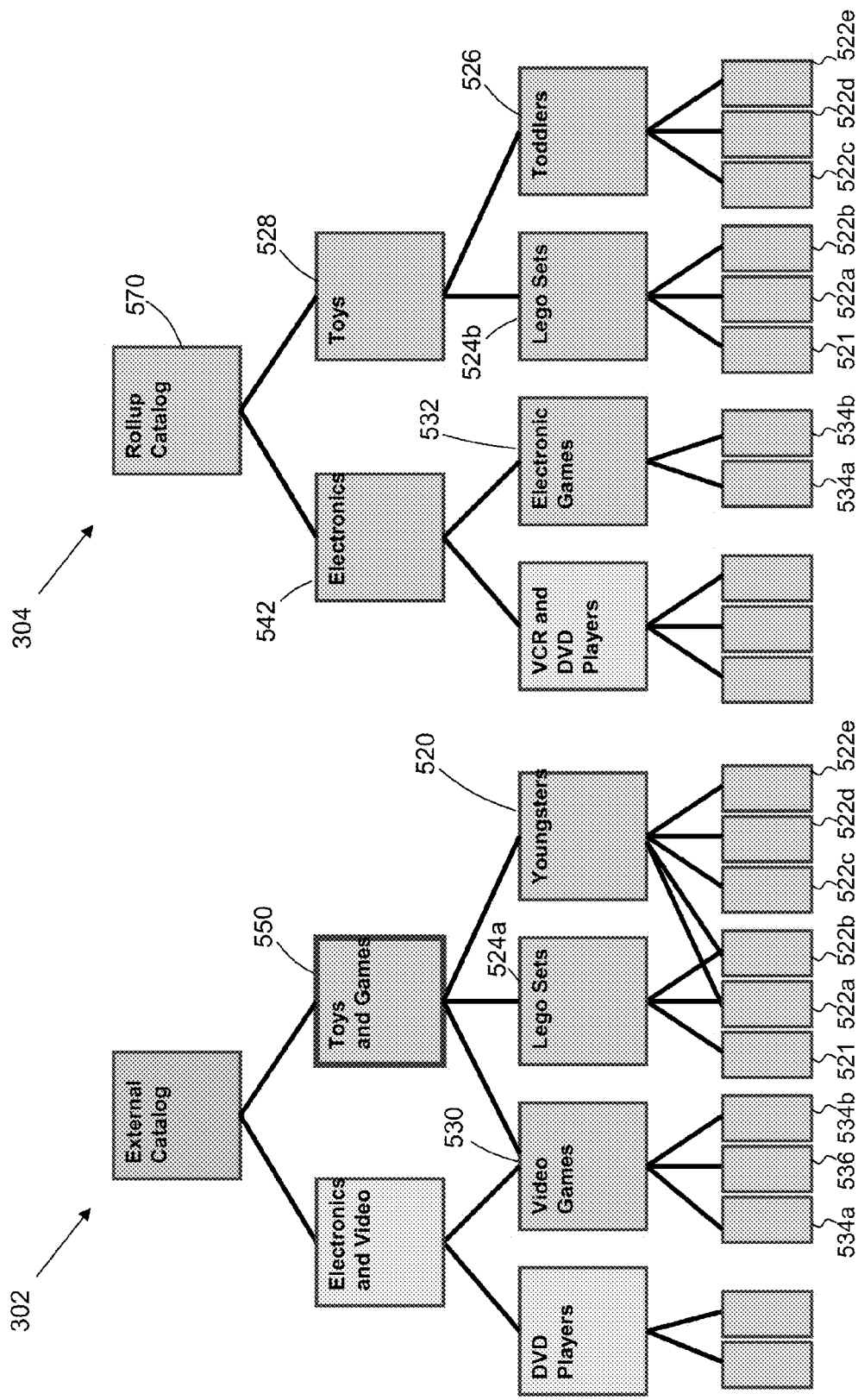
Figure 11H:
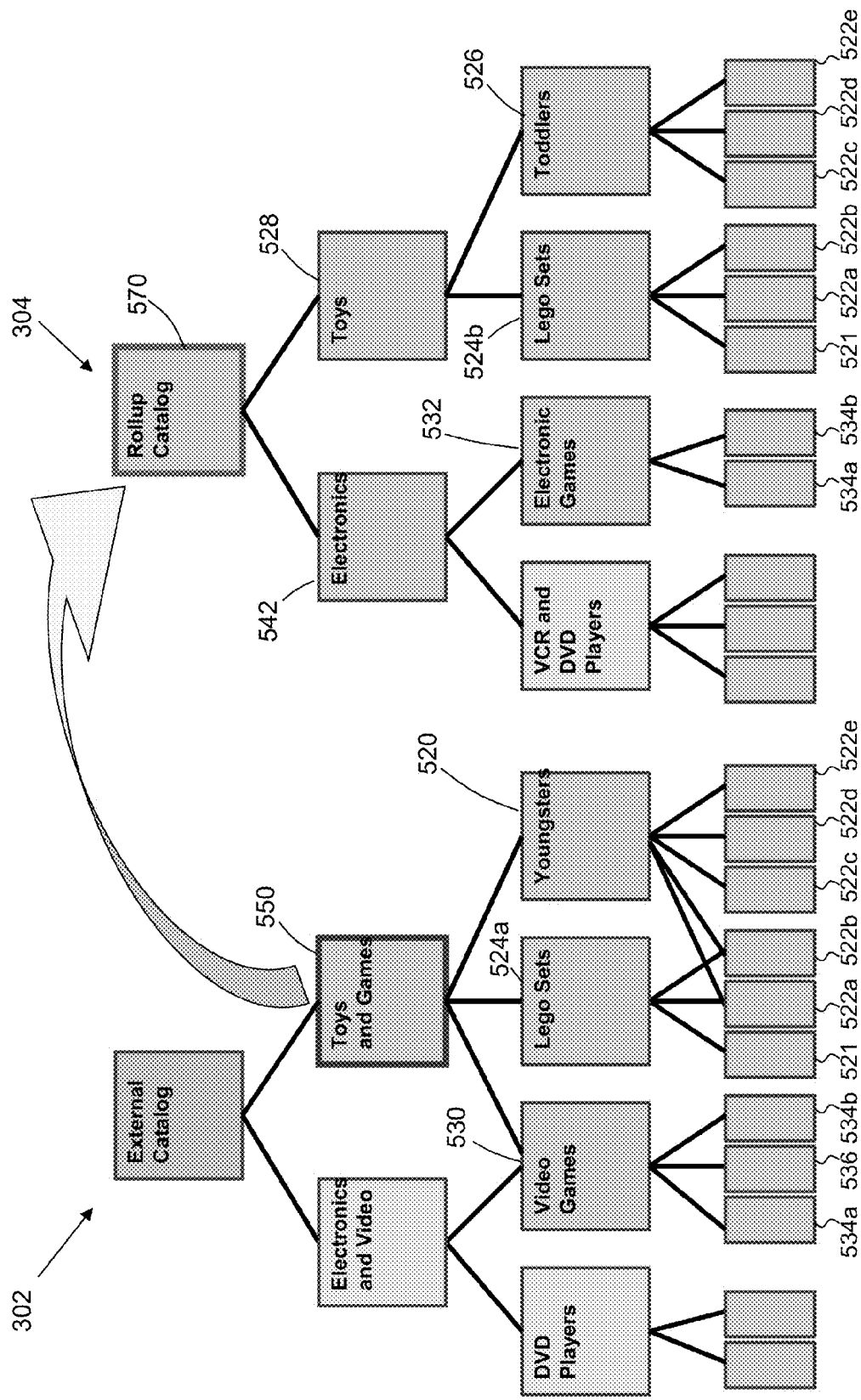

Therefore, since the analysis has not yet found a common parent for the objects, the analysis continues upwards through the hierarchy 304. As shown in FIG. 11G, the root node 570 for the rollup catalog of hierarchy 304 is the common parent node for node 542 ("Electronics" product group) and node 528 ("Toys" product group). As a result, as shown FIG. 11H, the "Toys and Games" product group in source hierarchy 302 is mapped to the top level of the roll-up catalog in the target hierarchy 304.

As previously noted, the positions of a group in a hierarchy can be defined by its paths, consisting from a chain of intermediate product groups, connecting root and descendent product group through parent child relationships. The PG parent child structure can be structured as a graph, where a child can have multiple parents and parents can belong to different hierarchies. Positions of a product in a hierarchy are also defined by its paths; a product path is a path from root product group to product's immediate PG appended by "Path" from immediate parent to this product.

Parent child relationships can be time enabled, therefore for any given time moment the graph can look different. In a no-duplication hierarchy in some embodiments, each group or product may have only one path at any given time moment. Because the PG structure can be date enabled, one can perform the aforementioned actions with regard to any specified time moment, and get back the information about effective windows for the obtained result(s). Using such services directly on runtime may not be adequate in some circumstances because: (a) those operations are time-consuming and might not perform on runtime; and (b) contextual mapping may not be implemented as a symmetric operation, and there may be a requirement to be able to find objects that map to a particular target PG, which can involve repetitively running the algorithm for existing nodes. Thus, there may be a need for a new table, which will capture the results of operations, and can be used for bidirectional lookup on runtime.

In some embodiments, the algorithm is based at least in part on independent live search of connections between 2 PGs, followed by lowest common ancestor determination on target side paths. Such a search can be performed for any given moment in time (slicing Time) using the following approach:
 1) Start by building a cumulative list of all participating source PGs (by finding all descendants of PGs, mentioned in mapping intent records for given target hierarchy);
 2) For each such source PG:
    a. First assign—Infinity value to current slicing time parameter;
    b. Execute live mapping algorithm on source and target for current slicing time;
    c. Resulting search, besides mapping value, also returns the end time for this mapping;
    d. Capture obtained mapping in database (DB);
    e. Assign obtained mapping's end date value to slicing time parameter;
    f. if slicing time parameter value is less than +Infinity repeat this sub-procedure (go to step (b));
    g. otherwise process next PG from list (go to step (2))).

This approach offers an approach that is not dependent on any existing mapping data in the system and can be executed for each pair of PGs independently.

It is noted that some performance optimizations for mapping of larger hierarchies are possible. One example approach that can be taken is to perform a bottom-up analysis. In this approach, one can process the source hierarchy, starting from mapping leaf PGs and reusing created mapping information of immediate children when moving up a level. Some advantages of this approach are that it can result in smaller resulting record sets, smaller memory footprint, and relatively simple processing logic. In some situations, this may create drawbacks such as causing multiple queries to a database and a rigid sequence of mapping actions.

An alternate approach is to perform top-down processing, where one can obtain all connections of root source PG to target and create child PG mapping records as those connections are analyzed. Advantages of this approach include the ability to implement a single query to obtain all connections. However, possible drawbacks to this approach may include a large resulting record set, unpredictable memory footprint, convoluted processing logic, and a rigid sequence of mapping actions.

The inventive approach provides a map that can be created automatically by an administrative process. The map once created can then be consumed by the consuming applications. The inventive approach also provides a service to pass the product or product group that will return the equivalent product group in the desired hierarchy.

As an example scenario, consider when a product group is re-used in two hierarchies (e.g., ID match). The product group model supports sharing of the product groups within or across the hierarchies. If the product group exists in the source and target hierarchy and its ID matches (e.g., exact match), this will imply that the product group is shared. In this situation, one can directly return the position of this product group within the target hierarchy along with other information such as depth and/or path.

In this scenario, (a) the "Depth" value provides information about how deep is the PG in a given hierarchy; (b) the "Path" value identifies the possible paths from the root to this PG; and (c) the mapping table can be used to contain this information. It is noted that if the target hierarchy is a rollup hierarchy, then the system can be implemented to provide a single entry for the map. If the target hierarchy is a sales catalog hierarchy, then there could be multiple entries.

Consider another scenario in which the Product Group is not re-used in the two hierarchies (e.g., for the contextual match approach). In situations where the ID does not match (e.g., no exact match), one possible approach is to study the content of the source product group and find a similar (close enough) product group in the target hierarchy that encompasses all the content. This process will take products of source product group and try to determine which PGs in target hierarchy may contain these products. The products may appear in multiple target PGs. In such case, the algorithm will try to deduce an ancestor of these PGs. This will result in the common ancestor PG in the target hierarchy containing the content of the source product group.

With regards to the mapping table, the mapping table will contain this information. It is noted that this approach may not guarantee the same result if run back and forth. For example, PG A maps to PG B in target hierarchy. If run in reverse, PG B may not result in map to PG A.

Another scenario is when the Product Group has no match in the target hierarchy (e.g., for the Approximate Match approach). This scenario is when the content of source PG does not exist in the target hierarchy; in such a case, one can use the parent of the source PG and its content to see if there is any map that exists in the target hierarchy. This is used if the source hierarchy is known to the algorithm.

With regards to the mapping table, the mapping table will not contain this information in some embodiments but the service can provide this if needed. In order for algorithm to consider 'approximation' option, the invoking entity (method/service) should pass the source hierarchy as part of the input.

Figure 12:
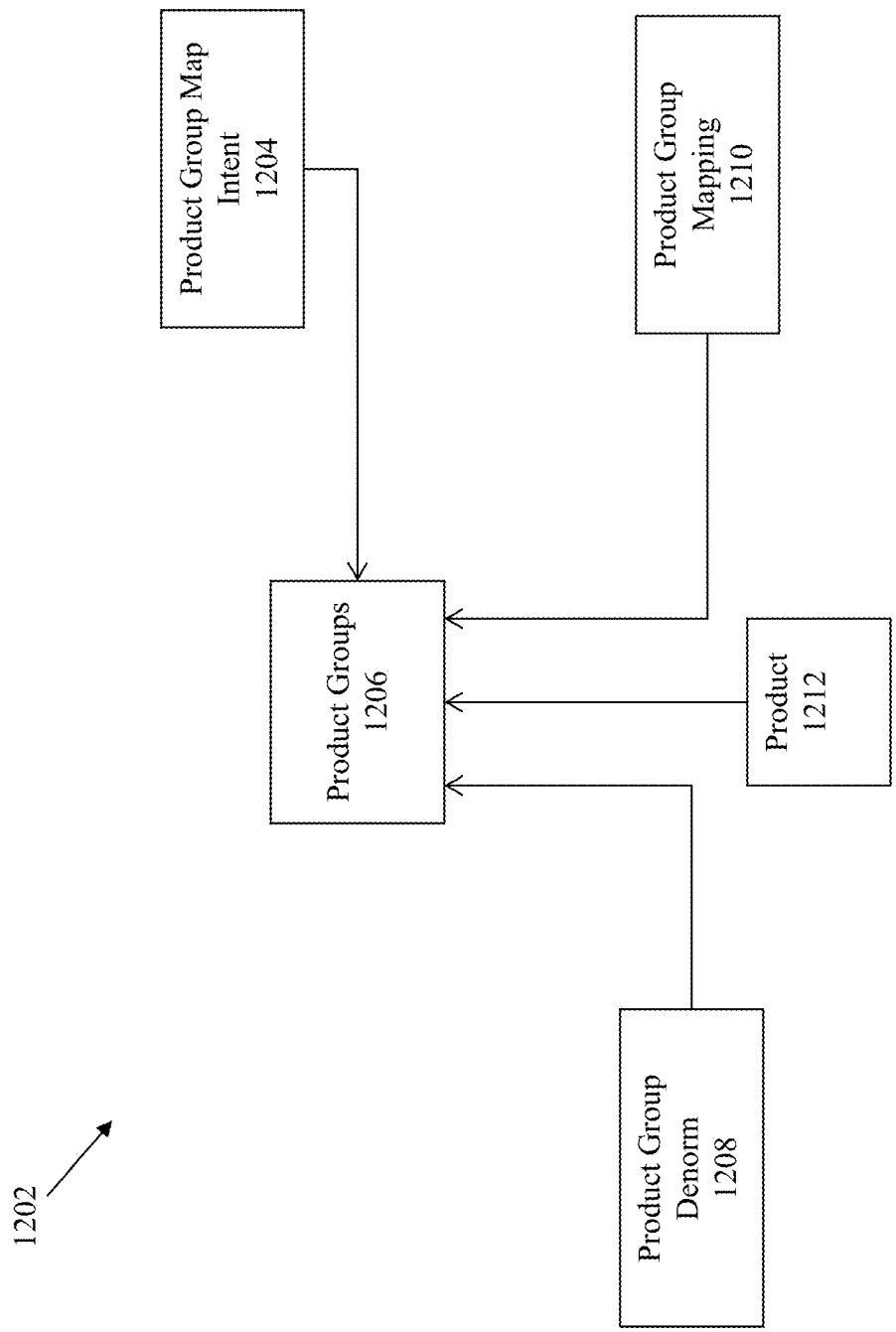
FIG. 12 illustrates a diagram of an example logical data model that can be used in some embodiments of the invention.

FIG. 12 illustrates a diagram 1202 of an example logical data model that can be used in some embodiments of the invention. The Product_Group_Map_Intent table 1204 contains records added by the administrator to identify the source and target hierarchy for mapping. This structure includes, for example, the source root ID for the source hierarchy that needs to be mapped as well as a target root ID for the target hierarchy. Status information may also be maintained in this structure.

The Product_Group_Mapping table 1210 is the table that will store the mappings. This table includes, for example, information about the source object type, source object ID, target object type, target object ID, target root ID, target path ID, target depth, and record types.

The Product_Groups table 1206 is the table that stores information about the product groups. This structure includes, for example, information about the product group IDs and a root flag. The Product table 1212 stores information about the products, e.g., product ID information. The Product_Group_Denorm table 1208 is used to store denormalization information.

The approach of the current embodiment to obtain a target group operates by taking product ID/product group ID and target hierarchy as the input and identifies the appropriate product group from the target hierarchy. If the target hierarchy is a non-duplicate hierarchy, then most likely a single PG will be returned. However, if the target is a duplicate hierarchy, then multiple PGs may be returned. The user can then decide based on the additional attributes such as path and depth of the product groups which one is most appropriate for their flow.

The approach may go through several actions to decide on the target PG. If the product ID is passed as the input, then the input criteria includes: (a) Source Object Type='Product', (b) Source Object ID={Product ID}, and (c) Target Root ID={Target Hierarchy}. The denormalization table structure 1208 is checked to see if the record exists for this product and this target hierarchy. If the record exists, then the following are obtained from the denormalization record and passed as the output: (a) Target Object Type='Product'; (b) Target Object ID={Product ID}; (c) Target Parent ID={Product group that this product is associated to}; (d) Target Depth={denorm distance}+1, where denorm distance is the distance of the PG from the root; and (e) Target Path={Path ID}. If no record is found, then the service will return false as the output.

For the case when group ID is passed, the following input criteria is used: (a) Source Object Type='Product group'; (b) Source Object ID={Product group ID}; (c) Target Root ID={Target Hierarchy}. At this point, the mapping table 1210 is checked to see if the record exists for this product group and this target hierarchy. If the record exists, then the following are obtained from the mapping table record and passed as output to the service: (a) Target Object Type='Product group'; (b) Target Object ID={Product group ID}; (c) Target Parent ID={Parent Product group}; (d) Target Depth={depth}; and (e) Target Path={Path ID}. If the record is not found, then the service will return "false" as the output.

If the instruction for 'Approximate' is passed to the service, then the service will attempt to retrieve the parent of the source PG (e.g., by using the source root ID) and will attempt to determine if there is a corresponding map exists in the mapping table. If found, it will return the target PG, else the process will be repeated again.

Therefore, what has been described above is an improved approach to implement enterprise software systems to provide product group mappings. The inventive approach provides a map that is created automatically by an admin process. The map once created can then be consumed by the consuming applications. The inventive approach also provides a service to pass the product or product group that will return the equivalent product group in the desired hierarchy.

There are numerous advantageous use cases for embodiments of the invention. For example, there are many marketing use cases that are applicable for the invention. The "sales prospecting" use case is an example of an applicable marketing use case, where embodiments of the invention can be used to: (a) enable the Sales Rep review potential deals and choose a few deals to follow through; (b) the Sales Rep can use the invention to see the potential revenue by Accounts and Product groups in a heatmap; (c) the territory manager provides a list of Accounts the Sales Rep can sell to and a list of Product Groups s/he can sell; (d) TM understands Product Rollup Hierarchy and hence will return a set of product groups from the Master Rollup Hierarchy; (e) the heat map presents the Product Groups as they appear in the selected sales catalog to the sales reps and sales managers.; (f) given the Product Groups from the Master Rollup Hierarchy, calling the mapping logic to get a list of equivalent Product Groups from the specified sales catalog.

For a "territory alignment" use case, embodiments of the invention can provide: (a) Sales Managers can review potential in each Territory they own; (b) the territory manager provides a list of Product Groups in the Sales Manager's portfolio (what his Sales Reps can sell); (c) since Territory Manager understands Master Rollup Hierarchy, the Product Groups provided by the Territory Manager will be from the Master Rollup Hierarchy; (d) the heatmap cells can be displayed based on the deal size associated with Unqualified SPE Leads, and SPE Leads can reference product groups from one or more Sales Catalogs; (e) to present the potential revenue data in terms of Rollup Hierarchy, the Product Groups from SPE Leads are mapped to equivalent product groups in the Master Rollup Hierarchy.

Numerous territory management/assignment management use cases also exist. For example, consider the "analytics" use case, where metrics can be loaded into a data warehouse based on the rollup catalog along the Product dimension. The source data for these metrics (such as opportunities and leads) reference products and product groups in the sales catalogs. Consider also the "territory assignment" use case, where an assignment manager will assign territories to accounts, leads, and opportunities. In this use case, leads and opportunities reference sales catalogs and territories reference the rollup catalog. In addition, consider the "assignment preview" use case, where during territory what-if analysis, one wishes to preview the set of accounts, opportunities, and leads that would be assigned to the territory. A reverse-lookup can be performed, to match territory Product dimension (based on rollup catalog) against leads and opportunities (based on sales catalogs). Another possible use case is the "sales prospecting dashboard" (SPD) for territory management. When SPD is embedded for territory management, the products and product groups on the dashboard will reference the rollup catalog, and the underlying data in the Revenue view (unqualified leads) will reference products and product groups from the sales catalogs.

The embodiments of the invention can also be used to implement "sales forecasting" use cases. For example, consider the "sales forecast metrics" use case, where forecasts from sales reps are loaded into a data warehouse cube as a metric and this metric is rolled up along the Product dimension based on the rollup catalog. To implement sales manager forecasting, the sales managers use the invention to view the revenue based forecasts for their territories based on the rolled up forecasts from the sales reps.

Embodiments of the invention can be provided to implement the "sales prospecting engine" (SPE) use cases. In this approach, input transactions to the engine will reference products and product groups from Sales Catalogs (in the case of opportunities). Input transactions to the engine will reference products from Rollup Catalog (in the case of orders or assets). In addition, output predictions from the engine will reference products and product groups from Sales Catalogs (in the case of unqualified leads)

System Architecture Overview

Figure 13:
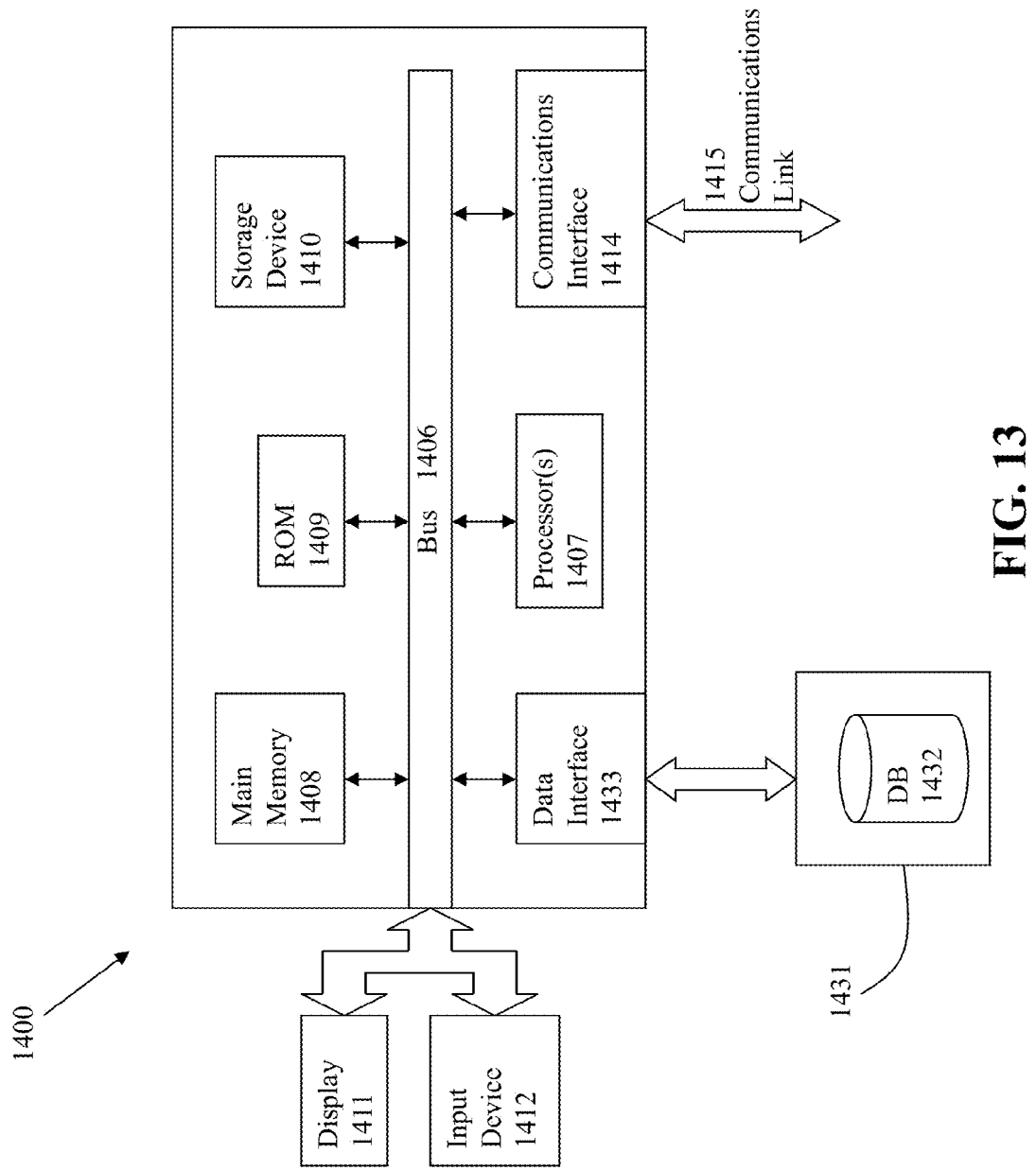
FIG. 13 shows an architecture of an example computing system with which the invention may be implemented.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method to map one or more objects of a source hierarchy associated with a first system to corresponding objects of a target hierarchy associated with a second system, comprising:
    identifying a mapping table in a database, the mapping table storing data comprising source object id, source object type, target object id, target object type, target root id, target depth, and target path id, wherein the target root id corresponds to the target hierarchy, the target depth corresponds to how deep the target ancestor node is in the target hierarchy and pertains to a distance of the target object from a root node of the target hierarchy, and the target path id corresponds to possible paths from a root node to a target ancestor;
    Identifying the one or more objects in the source hierarchy associated with the first system, the first system corresponding to an application that is internal to a server that is processing data;
    identifying the target hierarchy associated with the second system, the second system being external to the server that is processing the data, the source hierarchy and the target hierarchy comprising leaf nodes that correspond to objects of the respective hierarchy, wherein the leaf nodes represent the lowest nodes of the respective hierarchy, and the leaf nodes have an ancestor node that is a parent of the leaf nodes;
    matching the one or more objects identified in the source hierarchy to corresponding objects in the target hierarchy, the one or more objects identified in the source hierarchy correspond to one or more source object ids in the mapping table and the corresponding objects in the target hierarchy correspond to the target object ids in the mapping table;
    determining a lowest common ancestor node in the target hierarchy that corresponds to the corresponding objects in the target hierarchy that was matched, the lowest common ancestor node referring to a target ancestor node in the target hierarchy that is common to the corresponding objects of the target hierarchy that was matched and is lowest in hierarchy when compared to other target ancestor nodes that are common to the corresponding objects of the target hierarchy that was matched, the target hierarchy corresponding to a target root id and the lowest common ancestor node having an object type of a group, a target id of the target hierarchy, and a path id corresponding to possible paths from the target root id to the lowest common ancestor node;
    mapping the identified one or more objects in the source hierarchy to the determined lowest common ancestor node in the target hierarchy; and
    storing the mapping in the mapping table, wherein the mapping table is utilized for retrieval of mapping information and reverse look-up of the one or more identified objects.

2. The method of claim 1, wherein the identified one or more objects of the source hierarchy are matched to corresponding objects in the target hierarchy by matching content between the source hierarchy and the target hierarchy, wherein the source hierarchy and the target hierarchy comprises at least some content in common with the source hierarchy.

3. The method of claim 1, wherein the identified one or more objects of the source hierarchy are matched to corresponding objects in the target hierarchy by determining approximate matches to content corresponding to the source hierarchy to content corresponding to the target hierarchy, wherein at least some content is different between the source hierarchy and the target hierarchy.

4. The method of claim 3, where the approximate matches are determined by identifying a context for a first object in the source hierarchy, and performing contextual analysis to identify at least one approximate match in the target hierarchy.

5. The method of claim 1, wherein the mapping of the identified one or more objects to target hierarchy is performed by using a process comprising:
    building a cumulative list of all source ancestor nodes; and
    for each source ancestor node, assigning a time parameter and performing mapping on both source ancestor nodes and target ancestor nodes for the time parameter.

6. The method of claim 1, in which the mapping of the identified one or more objects to the target hierarchy starts from mapping the leaf nodes of the source hierarchy and reusing mapping information of child nodes when moving up in hierarchical levels of the source hierarchy.

7. The method of claim 1, wherein the mapping table further comprises source object identifiers and target object identifiers.

8. The method of claim 7, wherein the identified one or more objects of the source hierarchy are matched to corresponding objects in the target hierarchy by matching the source object identifiers to the target object identifiers.

9. A non-transitory computer readable medium having stored thereon a sequence of instructions which, when executed by a processor, causes the processor to execute a method for mapping one or more objects of a source hierarchy associated with a first system to corresponding objects of a target hierarchy associated with a second system, the method comprising:
    identifying a mapping table in a database, the mapping table storing data comprising source object id, source object type, target object id, target object type, target root id, target depth, and target path id, wherein the target root id corresponds to the target hierarchy, the target depth corresponds to how deep the target ancestor node is in the target hierarchy and pertains to a distance of the target object from a root node of the target hierarchy, and the target path id corresponds to possible paths from a root node to a target ancestor;

identifying the one or more objects in the source hierarchy associated with the first system, the first system corresponding to an application that is internal to a server that is processing data;

identifying the target hierarchy associated with the second system, the second system being external to the server that is processing the data, the source hierarchy and the target hierarchy comprising leaf nodes that correspond to objects of the respective hierarchy, wherein the leaf nodes represent the lowest nodes of the respective hierarchy, and the leaf nodes have an ancestor node that is a parent of the leaf nodes;

matching the one or more objects identified in the source hierarchy to corresponding objects in the target hierarchy, the one or more objects identified in the source hierarchy correspond to one or more source object ids in the mapping table and the corresponding objects in the target hierarchy correspond to the target object ids in the mapping table;

determining a lowest common ancestor node in the target hierarchy that corresponds to the corresponding objects in the target hierarchy that was matched, the lowest common ancestor node referring to a target ancestor node in the target hierarchy that is common to the corresponding objects of the target hierarchy that was matched and is lowest in hierarchy when compared to other target ancestor nodes that are common to the corresponding objects of the target hierarchy that was matched, the target hierarchy corresponding to a target root id and the lowest common ancestor node having an object type of a group, a target id of the target hierarchy, and a path id corresponding to possible paths from the target root id to the lowest common ancestor node;

mapping the identified one or more objects in the source hierarchy to the determined lowest common ancestor node in the target hierarchy; and storing the mapping in the mapping table, wherein the mapping table is utilized for retrieval of mapping information and reverse look-up of the one or more identified objects.

10. The computer readable medium of claim 9, wherein the identified one or more objects of the source hierarchy are matched to corresponding objects in the target hierarchy by matching content between the source hierarchy and the target hierarchy, wherein the source hierarchy and the target hierarchy comprises at least some content in common with the source hierarchy.

11. The computer readable medium of claim 9, wherein the identified one or more objects of the source hierarchy are matched to corresponding objects in the target hierarchy by determining approximate matches to content corresponding to the source hierarchy to content corresponding to the target hierarchy, wherein at least some content is different between the source hierarchy and the target hierarchy.

12. The computer readable medium of claim 11, where the approximate matches are determined by identifying a context for a first object in the source hierarchy, and performing contextual analysis to identify at least one approximate match in the target hierarchy.

13. The computer readable medium of claim 9, wherein the sequence of instructions further comprises instructions which, when executed by the processor causes the processor to execute the method for mapping of the identified one or more objects to target hierarchy is performed by using a process comprising building a cumulative list of all source ancestor nodes; and for each source ancestor node, assigning a time parameter and performing mapping on both source ancestor nodes and target ancestor nodes for the time parameter.

14. The computer readable medium of claim 9, in which the mapping of the identified one or more objects to the target hierarchy starts from mapping the leaf nodes of the source hierarchy and reusing mapping information of child nodes when moving up in hierarchical levels of the source hierarchy.

15. The computer readable medium of claim 9, wherein the mapping table further comprises source object identifiers and target object identifiers.

16. The computer readable medium of claim 15, wherein the identified one or more objects of the source hierarchy are matched to corresponding objects in the target hierarchy by matching the source object identifiers to the target object identifiers.

17. A system, comprising:

a processor;

a memory comprising computer code executed using the processor, in which the computer code implements any actions of identifying a mapping table in a database, the mapping table storing data comprising source object id, source object type, target object id, target object type, target root id, target depth, and target path id, wherein the target root id corresponds to a target hierarchy, the target depth corresponds to how deep the target ancestor node is in the target hierarchy and pertains to a distance of the target object from a root node of the target hierarchy, and the target path id corresponds to possible paths from a root node to a target ancestor node, identifying one or more objects in a source hierarchy associated with a first system, the first system corresponding to an application that is internal to a server that is processing data, identifying the target hierarchy associated with a second system, the second system being external to the server that is processing the data, the source hierarchy and the target hierarchy comprising leaf nodes that correspond to objects of a respective hierarchy, wherein the leaf nodes represent the lowest nodes of the respective hierarchy, and the leaf nodes have an ancestor node that is a parent of the leaf nodes, matching the one or more objects identified in the source hierarchy to corresponding objects in the target hierarchy, the one or more objects identified in the source hierarchy correspond to one or more source object ids in the mapping table and the corresponding objects in the target hierarchy correspond to the target object ids in the mapping table, determining a lowest common ancestor node in the target hierarchy that corresponds to the corresponding objects in the target hierarchy that was matched, the lowest common ancestor node referring to a target ancestor node in the target hierarchy that is common to the corresponding objects of the target hierarchy that was matched and is lowest in hierarchy when compared to other target ancestor nodes that are common to the corresponding objects of the target hierarchy that was matched, the target hierarchy corresponding to a target root id and the lowest common ancestor node having an object type of a group, a target id of the target hierarchy, and a path id corresponding to possible paths from the target root id to the lowest common ancestor node, mapping the identified one or more objects in the source hierarchy to the determined lowest common ancestor node in the target hierarchy, and storing the mapping in the mapping table, wherein the mapping table is utilized for retrieval of mapping information and reverse look-up of the one or more identified objects.

18. The system of claim 17, wherein the identified one or more objects of the source hierarchy are matched to corresponding objects in the target hierarchy by matching content between the source hierarchy and the target hierarchy, wherein the source hierarchy and the target hierarchy comprises at least some content in common with the source hierarchy.

19. The system of claim 17, wherein the identified one or more objects of the source hierarchy are matched to corresponding objects in the target hierarchy by determining approximate matches to content corresponding to the source hierarchy to content corresponding to the target hierarchy, wherein at least some content is different between the source hierarchy and the target hierarchy.

20. The system of claim 19, where the approximate matches are determined by identifying a context for a first object in the source hierarchy, and performing contextual analysis to identify at least one approximate match in the target hierarchy.

21. The system of claim 17, wherein the memory further comprises computer code to implement building a cumulative list of all source ancestor nodes, and for each source ancestor node, assigning a time parameter and performing mapping on both source ancestor nodes and target ancestor nodes for the time parameter.

22. The system of claim 17, in which the mapping of the identified one or more objects to the target hierarchy starts from mapping the leaf nodes of the source hierarchy and reusing mapping information of child nodes when moving up in hierarchical levels of the source hierarchy.

23. The system of claim 17, wherein the mapping table further comprises source object identifiers and target object identifiers.

24. The system of claim 23, wherein the identified one or more objects of the source hierarchy are matched to corresponding objects in the target hierarchy by matching the source object identifiers to the target object identifiers.

25. The method of claim 1, further comprising:
when more than one lowest common ancestor node of the target hierarchy is determined, selecting one of the more than one lowest common ancestor node to select based at least in part on user input, wherein the leaf nodes of the respective hierarchy correspond to products of the respective system, and the ancestor nodes of the respective hierarchy correspond to product groups to which the products in the leaf nodes belong, and wherein the determined lowest common ancestor node of the target hierarchy corresponds to an equivalent product group of the identified one or more objects of the source hierarchy, wherein the mapping table comprises a table structure that includes fields for source object information and target object information,
implementing a configuration of tables to store the mapping table, the configuration of tables comprising a map intent table, a product groups table, a product table, and a product group denormalization table, the map intent table storing records identifying the source hierarchy and the target hierarchy, the product groups table storing information about the product groups, the product table storing information about the products in the product groups of the source hierarchy and the target hierarchy, and a product denormalization table to store denormalization information, wherein the mapping table is utilized by the second system to determine the equivalent product group of the second system, and wherein the configuration of tables comprises date information of the one or more mappings;
determining whether the source hierarchy comprises duplicative objects or hierarchies, wherein the denormalization table is utilized to determine whether the duplicative objects or hierarchies exist;
utilizing a service to pass the source hierarchy as input in order to determine the lowest common ancestor node of the target hierarchy;
if there is no match between the one or more identified objects of the source hierarchy and corresponding objects of the target hierarchy, performing matching between a particular ancestor node of the one or more identified objects, and target ancestor nodes of the target hierarchy;
assigning a time parameter for each mapping stored in the mapping table, the time parameter used to retrieve results from the mapping table; and
displaying the equivalent product group of the target hierarchy through a display device.

26. The method of claim 1, wherein the mapping table comprises a table structure that includes fields for source object information and target object information, wherein the target object information comprises a target depth, the target depth referring to a distance of the target object from a root node of the target hierarchy.

27. The method of claim 1, wherein the leaf nodes of the respective hierarchy refer to products associated with the respective system.

28. The method of claim 27, wherein the ancestor node of the respective hierarchy corresponds to a product group to which the products associated with the leaf nodes belong.

29. The method of claim 1, wherein the mapping table is used by the second system to retrieve results of the matching between the one or more objects of the source hierarchy to the determined lowest common ancestor node of the target hierarchy, wherein the retrieved results are passed as output to determine an equivalent product or product group of the target hierarchy.

30. The method of claim 1, wherein the lowest common ancestor node of the target hierarchy provides access to all the corresponding objects of the target hierarchy that are matched to the one or more objects of the source hierarchy.

31. The method of claim 1, further comprising:
when more than one lowest common ancestor node of the target hierarchy is determined, selecting one of the more than one lowest common ancestor node to select based at least in part on user input, wherein the leaf nodes of the respective hierarchy correspond to products of the respective system, and the ancestor nodes of the respective hierarchy correspond to product groups to which the products in the leaf nodes belong, and wherein the determined lowest common ancestor node of the target hierarchy corresponds to an equivalent product group of the identified one or more objects of the source hierarchy, wherein the mapping table comprises a table structure that includes fields for source object information and target object information, wherein the target object information comprises a target depth, the target depth referring to a distance of the target object from a root node of the target hierarchy;
implementing a configuration of tables to store the mapping table, the configuration of tables comprising a map intent table, a product groups table, a product table, and a product group denormalization table, the map intent table storing records identifying the source hierarchy and the target hierarchy, the product groups table storing information about the product groups, the product table storing information about the products in the product groups of the source hierarchy and the target hierarchy, and a product denormalization table to store denormalization information, wherein the mapping table is utilized for timely retrieval of mapping information, wherein the mapping table is utilized for reverse look-up of the one or more identified objects, and wherein the mapping table is utilized by the second system to determine the equivalent product group of the second system, and wherein the configuration of tables comprises date information of the one or more mappings;

determining whether the source hierarchy comprises duplicative objects or hierarchies, wherein the denormalization table is utilized to determine whether the duplicative objects or hierarchies exist;

utilizing a service to pass the source hierarchy as input in order to determine the lowest common ancestor node of the target hierarchy;

if there is no match between the one or more identified objects of the source hierarchy and corresponding objects of the target hierarchy, performing matching between a particular ancestor node of the one or more identified objects, and target ancestor nodes of the target hierarchy;

assigning a time parameter for each mapping stored in the mapping table, the time parameter used to retrieve results from the mapping table; and displaying the equivalent product group of the target hierarchy through a display device.

\* \* \* \* \*

UNITED STATES PATENT AND TRADEMARK OFFICE
CERTIFICATE OF CORRECTION

PATENT NO. : 9,922,303 B2
APPLICATION NO. : 14/015560
DATED : March 20, 2018
INVENTOR(S) : Chikovani et al.

It is certified that error appears in the above-identified patent and that said Letters Patent is hereby corrected as shown below:

In the Drawings

On sheet 3 of 47, in FIG. 1C, under Reference Numeral 160, Line 1, delete "Hierarchy160" and insert -- Hierarchy 160 --, therefor.

On sheet 3 of 47, in FIG. 1C, under Reference Numeral 162, Line 1, delete "Hierarchy162" and insert -- Hierarchy 162 --, therefor.

On sheet 3 of 47, in FIG. 1C, under Reference Numeral 164, Line 2, delete "mapped164" and insert -- mapped 164 --, therefor.

On sheet 3 of 47, in FIG. 1C, under Reference Numeral 166, Line 1, delete "possible166" and insert -- possible 166 --, therefor.

In the Specification

In Column 1, Line 20, delete "14/ 015,553," and insert -- 14/015,553, --, therefor.

In Column 7, Line 43, after "hierarchy" insert -- . --.

In Column 9, Line 60, delete "5ccd," and insert -- 522d, --, therefor.

In Column 10, Line 64, delete "(2)))." and insert -- (2)). --, therefor.

In Column 14, Line 21, after "leads)" insert -- . --.

Signed and Sealed this
Fourth Day of September, 2018

Andrei Iancu
*Director of the United States Patent and Trademark Office*

CERTIFICATE OF CORRECTION (continued)
U.S. Pat. No. 9,922,303 B2

In the Claims

In Column 20, Lines 59-61, in Claim 31, after "information," delete "wherein the target object information comprises a target depth, the target depth referring to a distance of the target object from a root node of the target hierarchy;".

In Column 21, Lines 6-9, in Claim 31, after "utilized" delete "for timely retrieval of mapping information, wherein the mapping table is utilized for reverse look-up of the one or more identified objects, and wherein the mapping table is utilized".